US005742860A

United States Patent [19]
Matsuzaki et al.

[11] Patent Number: 5,742,860
[45] Date of Patent: Apr. 21, 1998

[54] INSTANT CAMERA

[75] Inventors: Minoru Matsuzaki; Kazunori Mizokami, both of Hachioji; Yuta Sato, Hino; Yoshitaka Naito, Ome; Fumio Tomikawa, Chofu; Masaharu Hamada, Hachioji, all of Japan

[73] Assignee: Olympus Optical Co., Ltd, Tokyo, Japan

[21] Appl. No.: 334,547

[22] Filed: Nov. 3, 1994

[30] Foreign Application Priority Data

Nov. 4, 1993 [JP] Japan ................. 5-275592
Nov. 26, 1993 [JP] Japan ................. 5-297060

[51] Int. Cl.⁶ .............. G03B 17/02; G03B 17/50; G03B 29/00; G03B 15/03
[52] U.S. Cl. .............. 396/420; 396/535; 396/540; 396/30; 396/176
[58] Field of Search ............... 354/81, 86, 149, 354/11, 288, 83

[56] References Cited

U.S. PATENT DOCUMENTS

| | | | |
|---|---|---|---|
| 3,987,466 | 10/1976 | Murray, Jr. | 354/83 |
| 4,069,490 | 1/1978 | Graham et al. | 354/83 |
| 4,153,362 | 5/1979 | Dietz et al. | 354/293 |
| 4,166,683 | 9/1979 | Ito et al. | 354/192 |
| 4,174,164 | 11/1979 | Friedman et al. | 354/86 |
| 4,245,903 | 1/1981 | Hazama et al. | 354/86 |
| 4,545,661 | 10/1985 | Hamaguchi et al. | 354/86 |
| 4,666,275 | 5/1987 | Tamamura | 354/126 |
| 4,723,140 | 2/1988 | Whiteside et al. | 354/86 |
| 4,757,335 | 7/1988 | Muryoi et al. | 354/82 |
| 4,772,902 | 9/1988 | Inoue et al. | 354/82 |
| 4,819,016 | 4/1989 | Leonard et al. | 354/82 |
| 5,132,800 | 7/1992 | Wada et al. | 358/209 |
| 5,218,391 | 6/1993 | Kanai et al. | 354/86 |
| 5,227,822 | 7/1993 | Takahashi et al. | 354/82 |

FOREIGN PATENT DOCUMENTS 2-127631  5/1990  Japan .
5-72621   3/1993  Japan .

*Primary Examiner*—Safet Metjahic
*Assistant Examiner*—Daniel Chapik
*Attorney, Agent, or Firm*—Louis Weinstein

[57] ABSTRACT

A camera according to the present invention has an arrangement that a film is discharged to a side toward a subject after a picture has been taken, the instant camera comprising a grip portion formed on a right portion of a camera body when viewed in a normal photography state and from a position of a photographer operating the camera, an optical system disposed on a left portion of the camera body when viewed from the said position of the photographer and including at least a photographing lens, and a film cartridge loading portion which is capable of loading a film cartridge into a position between the grip portion of the camera body and the optical system in such a manner that an exposure surface of the film accommodated in the film cartridge faces the optical system.

60 Claims, 41 Drawing Sheets

FIG.32A
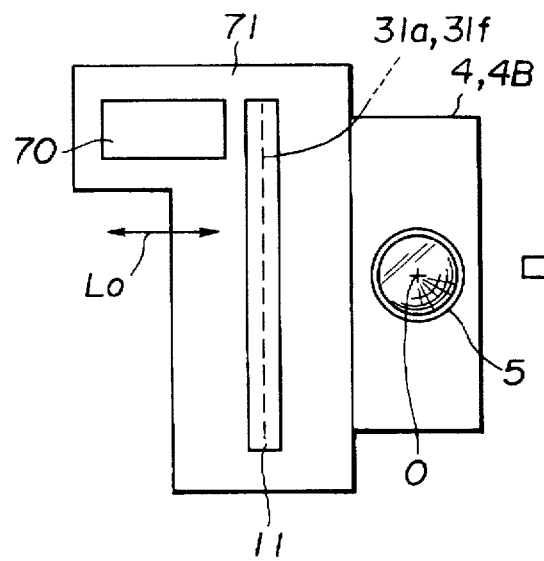
FIG.32B
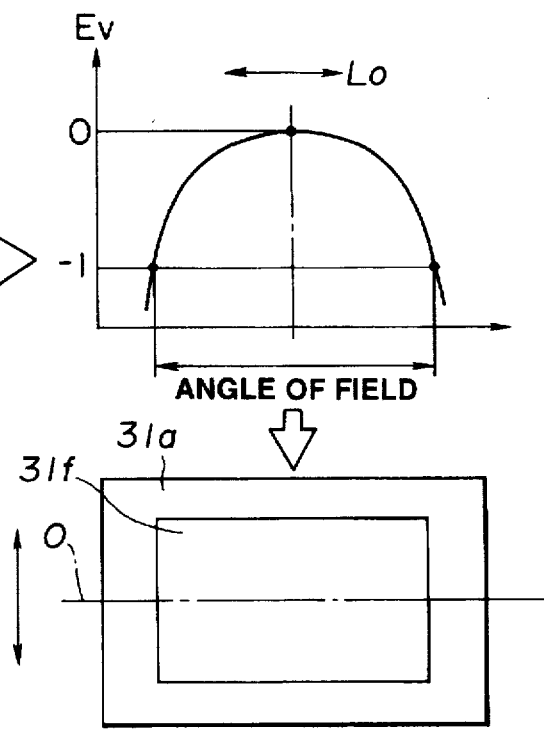
FIG.32C
FIG.33
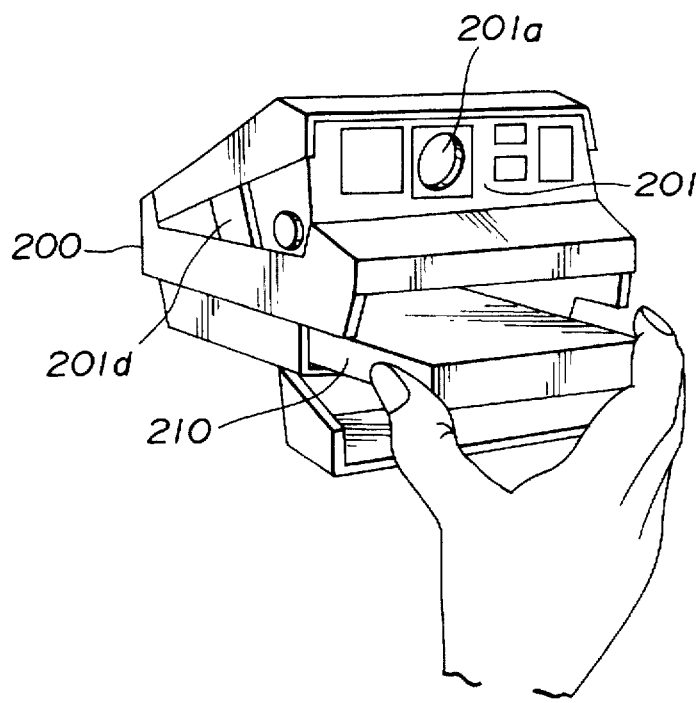

INSTANT CAMERA

BACKGROUND OF THE INVENTION

1. Field of the Invention

This invention relates to an instant camera, and more particularly to a layout of an instant camera.

2. Related Art Statement

Hitherto, a conventional instant camera of a self-development type, that uses an instant film for forming an image on the side thereof which faces a subject, has a camera body 200 in which a film cartridge 210 can be loaded horizontally in a normal photographing state in such a manner that the exposure sides of the films face upwards as shown in FIG. 33 which is a perspective view of the instant camera. An optical-system block 201 composed of a shutter unit including at least a photographing lens 201a and a reflecting mirror and so forth is disposed on the film cartridge 210 in such a manner that the optical-system block 201 can be folded or the same is, as shown in FIG. 34, fixed.

A camera of the foregoing type is structured such that the camera can be stably held and permits the use of two hands of a photographer to hold the camera in order to prevent undesirable shake of the camera when photography is performed. In a case where a picture is taken by the instant camera having the foregoing layout while turning the direction by an angular degree of 90° from the normal photography, a photographer is able to take a picture very naturally at either of the two orientations, respectively shown in FIGS. 35 and 36.

On the other hand, a folding-type instant camera has an arrangement that a locking member 201d (see FIG. 33) provided for the optical-system block 201 for the purpose of maintaining the standby state for performing the photography is operated when the optical-system block 201 of the instant camera is suspended from the accommodated state and thus a standby state for performing the photography is realized as illustrated in a perspective view shown in FIG. 37. Thus, the undesirable movement of the optical-system block 201 occurring due to gripping force of a user who holds the instant camera can be prevented.

Furthermore, the folding-type camera has an arrangement that a shutter unit 205A including a photographing lens 205 and a mirror 207 for reflecting light of the subject are folded from photographing state S1 to folded state S2 as shown in FIG. 38. When the shutter unit 205A and the reflecting mirror 207 are folded, the shutter unit 205A is brought into the state S2 in which the same is accommodated in a film cartridge 210 while being made diagonal with respect to the film cartridge 210. On the other hand, the camera of the type having the optical-system block that is disposed while being always fixed as shown in FIG. 34, has an arrangement that the shutter unit 205A and the reflecting mirror 207 are accurately fixed at the positions in the state S1 with respect to an uppermost film placed in the film cartridge 210.

Although the structure that the positional relationship between the shutter unit 205A and the mirror 207 for reflecting light of the subject is fixed as described above exhibits excellent total positional accuracy of the optical-system elements as compared with those of the movable type, the size of the camera is always enlarged excessively enlarged.

Another structure arranged as shown in FIGS. 39 and 40 has been disclosed to reduce the size of the camera in the folded state by employing an arrangement that a shutter unit 225A can be rotated into a direction toward the reflecting surface of the mirror for reflecting light of the subject so as to revolve the optical axis of the lens into a direction designated by an arrow d by about an angular degree of 90°.

In the foregoing camera, a lens unit 225A including a photographing lens 225 is supported by a camera body 221 through a nodal point Pa, the lens unit 225A being supported by a link 226 through a nodal point Pb. The link 226 is supported by a support member 228 of a reflecting mirror 227 supported by a camera body 221 through a nodal point Pc. Note that the shutter unit 225A is, by a support member 229, stood erect at a position, at which the photography can be performed, in the standby state for the photography as shown in FIG. 39.

A data imprinting unit for an instant camera disclosed in Japanese Patent Laid-Open No. 5-72621 is arranged to imprint data by a structure in which a data imprinting optical system 231, an electronic circuit board 233 for imprinting data and a coin-shaped battery 234 respectively shown in FIG. 41 are disposed on the outside of the range of a photographing optical system 232 including a shutter mechanism for the instant camera and a reflecting mirror for reflecting light from a subject.

In the foregoing apparatus, data is imprinted while discharging the exposed film after a picture has been taken by causing a light emitting device 235 provided for the purpose of imprinting data to emit light several times at intervals that correspond to the film feeding speed after the film has been discharged from a film cartridge 236.

A data imprinting unit for a conventional instant camera arranged as shown in FIGS. 42A and 42B has an arrangement that an optical axis of a data imprinting optical system 248 including a light emitting device 247 is disposed adjacent to a photographing optical system 246 to face a reflecting mirror 249. Simultaneously with or after taking a picture, the light emitting device 247 is caused to light one time so that data is imprinted on a film 243.

However, the foregoing conventional instant camera having the arrangement that the portion for receiving the film cartridge is disposed in parallel to the horizontal surface involves an excessive enlargement of the shape of the camera in the horizontal direction at the time of performing photography. In the case where the camera has a large size as described above, the camera body cannot easily be held by one hand.

Accordingly, the instant camera must securely be held by the two hands of the photographer as shown in FIG. 43 in order to stably take a picture.

However, the foregoing method of holding the instant camera causing the two hands of the photographer to hold the instant camera does not permit the photographer, for example, who has an item of luggage in one hand thereof, to perform the photography. It raises a limitation for the photographer to take a good picture at a perfect moment in the case where the instant camera has a finder 201b, an operation switch 201c and so forth that are disposed on the rear side of the camera body as shown in FIG. 37, the instant camera must be held in such a manner that the lower portion of the camera body 200 is held by the two thumbs of the photographer and the top surface of the instant camera is held by the other fingers of the same because the thumbs cannot be used to grip the rear side of the instant camera.

Therefore, the foregoing holding method results in that two sides F of an operator are caused to open as shown in FIG. 44 that is a view illustrating a photographing state. Thus, the instant camera cannot stably be held although the same is held by the two hands. What is worse, the camera cannot easily be held in the manner shown in FIG. 44 and the photographer is easily tired in the photographing operation.

In a case of the folding camera, the width of a camera body 210 must be widened to newly form individual grip portions 210a as shown in FIG. 45 in order to prevent rise of a necessity for a photographer to grip a folding and movable portion disposed diagonally as shown in FIG. 37. Thus, there has been a problem that the ease of gripping the folding-type camera can be improved only when the camera has a large size.

Furthermore, the movement of the optical-system block occurring due to the gripping force must be prevented by providing the locking member 201d (see FIG. 33) for maintaining the standby state to lock the standby state after the camera has been opened. Therefore, a problem arises in that the camera cannot smoothly be folded by a single operation and thus a complicated operation is required.

In the case of the camera of the type that is always fixed from the state suspended from the folded state to the folded state in order to prevent change in the positional relationship (angle α) between the shutter unit 205A and the mirror 207 for reflecting light of a subject as shown in FIG. 38, the shutter unit 205A has been caused to be folded while being made diagonal at the time of the accommodation.

This leads to a fact that the size is excessively enlarged by projection amount C of the shutter unit 205A as compared with the arrangement of a shutter unit 205A' and a mirror 207' as shown in FIG. 46 in which the shutter unit 205A' is accommodated while being straightened as much as possible with respect to the film cartridge 210. Therefore, problems arise in that accommodation cannot efficiently be performed and the size of the folded camera cannot be reduced satisfactorily.

Although the camera arranged as shown in FIGS. 39 and 40 enables the thickness to be reduced at the time of folding the camera as shown in FIG. 40, the necessity of disposing a stroboscope unit or the like onto the upper surface of the shutter unit 225A prevents further reduction in the size in the horizontal direction. In addition, an excessively large number of rotational nodal points, that is, seven rotational nodal points Pa, Pb, Pc, Pd, Pe, Pf and Pg, are required to realize the desired rotative movement relationship between the shutter unit 225A and the mirror 227 for reflecting light of a subject. Furthermore, the positions of the nodal points are dispersed excessively to obtain a desired accuracy in the optical system. What is worse, a problem is raised in that the optical performance deteriorates.

In the case where a picture is taken while turning the direction by an angular degree of 90° from the normal photographing direction, the photographer must perform the photography while always recognizing the attitude of the camera in such a manner that the stroboscope unit is positioned in the upper position. Thus, a very complicated operation is required and a risk is raised in that a taken picture encounters a failure due to generation of shadow caused from stroboscope light.

The conventional camera comprising the data imprinting optical system, which is disposed as disclosed in Japanese Patent Laid-Open No. 5-72621, involves the following problems.

The apparatus of the type comprising the data imprinting optical system 231 and so forth that are disposed on the outside of the photographing optical system 232 as shown in FIG. 41 requires a space for elements necessitated for imprinting data, thus causing the size of the camera to be enlarged excessively.

The foregoing-type camera causes the hand of the photographer to obstruct the discharging movement of the film from the grip portion. Therefore, the direction, in which the film is discharged, must be changed by, for example, the curved surface of a film guide wall 230 in order to prevent the foregoing obstruction. If data is arranged to be imprinted on the curved surface in order to save space, data is caused to be imprinted onto a curved film in a state where the film speed is unstable. As a result, advanced technical arrangements, such as maintaining the depth of the optical system, accurate detection of the film speed and the like, are required. Thus, there arises a problem in that the system of the data imprinting unit becomes too complicated.

Since imprinting of data is performed on the outside of the film cartridge 236, the film cannot easily be flattened at the position at which data is imprinted as compared with imprinting of data performed in the film cartridge. Therefore, ideal conditions for the imprinting operation cannot easily be provided.

The method of imprinting data adapted to the conventional instant camera arranged as shown in FIG. 42A in which the data imprinting optical system 248 is disposed adjacent to the photographing optical system 246 and data reflected by the reflecting mirror 249 involves an excessively long back focus. Thus, the size of the data imprinting optical system 248 cannot easily be reduced.

Furthermore, the necessity for the light emitting device 247 to imprint all data items by one light emission operation causes the size of the light emitting device 247 to be enlarged. Since a portion of the shutter mechanism of the shutter unit is disposed in the portion in which the data imprinting optical system is disposed, the enlargement of the sizes of the optical system and the light emitting device raises a problem in that the space for the shutter unit cannot easily be obtained. It leads to a fact that a problem arises in that the size of the shutter unit is undesirably enlarged.

Since a portion on the surface of the film that is suitable to imprint data is usually limited to a diagonal-line portion shown in FIG. 42B and a light beam of the data imprinting optical system 248 is generated at a position away from the photographing optical system 246 before the light beam is reflected by the reflecting mirror 249, it is very difficult to imprint data onto the ideal position in the diagonal-line portion of the film while causing the light beam to be substantially perpendicular to the exposure surface of the film. There arises a risk that the quality of the taken picture deteriorates due to distortion of the imprinted characters.

A structure has been disclosed in Japanese Patent Laid-Open No. 5-72621 that has an arrangement that two means for detecting the leading portion of the film, such as photoreflectors, are provided for an instant camera of a type using sheet films to detect the moving speed of the sheet film and data or the like is imprinted during the movement of the sheet film.

In Japanese Patent Laid-Open No. 2-127631, a structure has been disclosed that has an arrangement that the amount of rotation of rollers, which are in contact with a roll film, is detected; the distance of the movement of the film is calculated from the result of the detection; and data, such as date, is imprinted in synchronization with the movement of the film.

However, the structure disclosed in Japanese Patent Laid-Open No. 5-72621 encounters dispersion of intervals between imprinted data (figures) items and deterioration in the quality if the film moving speed becomes nonuniform during the data imprinting operation.

The structure disclosed in Japanese Patent Laid-Open No. 2-127631 involves a necessity that the rollers serving as the film movement amount detection means must be always in contact with the film. If the rollers and the film are not always in contact with each other from the moment a picture is taken to a moment data, such as date, is imprinted, the position of the picture plane on the film cannot be recognized. Therefore, the disposition of the rollers has been limited in order to detect the amount of the movement.

In a case where the foregoing structure is adapted to a conventional instant camera of a type that uses sheet films (instant films), disposition of rollers that are brought into contact with the sheet film at the time of taking a picture raises a risk of vignetting of the photographed image.

OBJECTS AND SUMMARY OF THE INVENTION

A first object of the present invention is to reduce the size of an instant camera while maintaining the photographing performance.

A second object of the present invention is to provide an information imprinting unit of a camera which is capable of accurately imprinting information onto a film during travel of the film while necessitating only a simple structure.

Briefly, an instant camera according to the present invention has an arrangement that a film is discharged to a side toward a subject after a picture has been taken, the instant camera comprising:

a grip portion formed on a right portion of a camera body when viewed in a normal photography state and from a photographer;

an optical system disposed on a left portion of the camera body when viewed from the photographer and including at least a photographing lens; and a film cartridge loading portion which is capable of loading a film cartridge into a position between the grip portion of the camera body and the optical system in such a manner that an exposure surface of the film accommodated in the film cartridge faces the optical system.

These as well as other objects and advantages of the present invention will become further apparent from the following detailed explanation.

BRIEF DESCRIPTION OF THE DRAWINGS

FIG. 32A is a front view which illustrates the instant camera according to the modification shown in FIG. 31;

FIG. 32B is a graph showing the distribution of stroboscope light of the instant camera according to the modification shown in FIG. 31;

FIG. 32C is a view showing the exposure surface of the film for the instant camera according to the modification shown in FIG. 31;

FIG. 33 is a perspective view which illustrates a conventional instant camera;

DETAILED DESCRIPTION OF THE PREFERRED EMBODIMENTS

Preferred embodiments of the present invention will now be described with reference to the drawings.

An instant camera according to a first embodiment of the present invention is a self-development-type camera that takes a picture in such a manner that an optical-system block is moved upwards to a standby position for the photography.

FIGS. 1 to 4 respectively are a front view, a right side view, a bottom view and a reverse view of the instant camera according to this embodiment in a state where an optical-system block 4 is positioned at an accommodated position (4A) when viewed from the position of a subject. FIGS. 5 to 9 respectively are a front view, a right side view, a lower view, a reverse view and a left side view of the instant camera in a state where the optical-system block 4 is rotated and moved upwards from the accommodated position (4A) to be brought into a photography standby position (4B) when viewed from the position of the subject.

Figure 10:
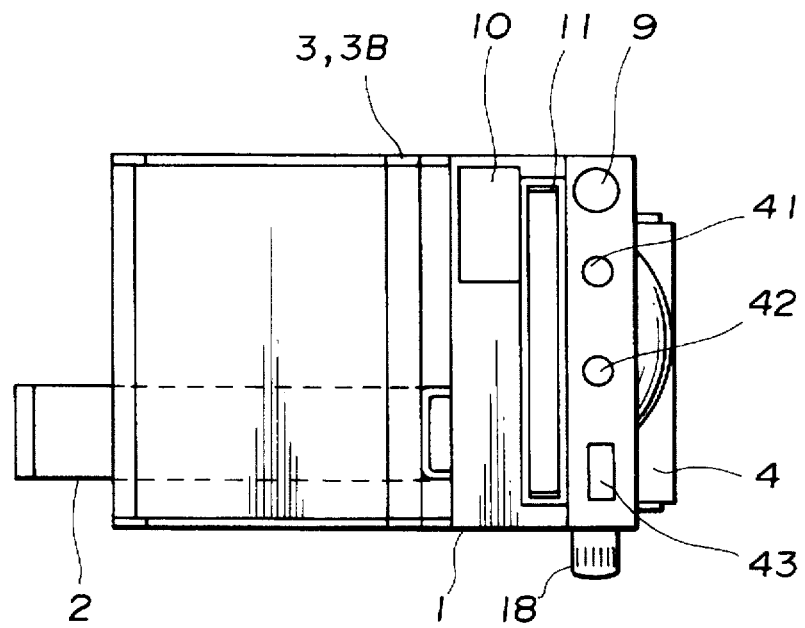
FIG. 10 is a front view which illustrates the state where a film cartridge loading portion of the instant camera according to the first embodiment is in a loaded state.
Figure 11:
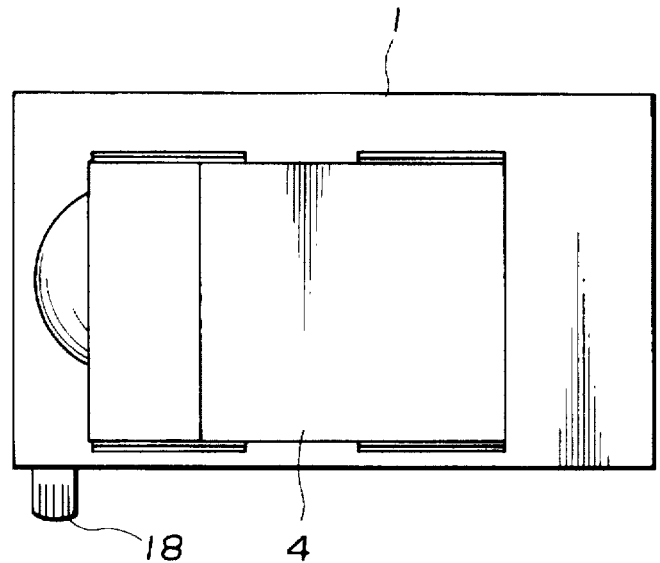
FIG. 11 is a right side view which illustrates the state where a film cartridge loading portion of the instant camera according to the first embodiment is in the loaded state.
Figure 12:
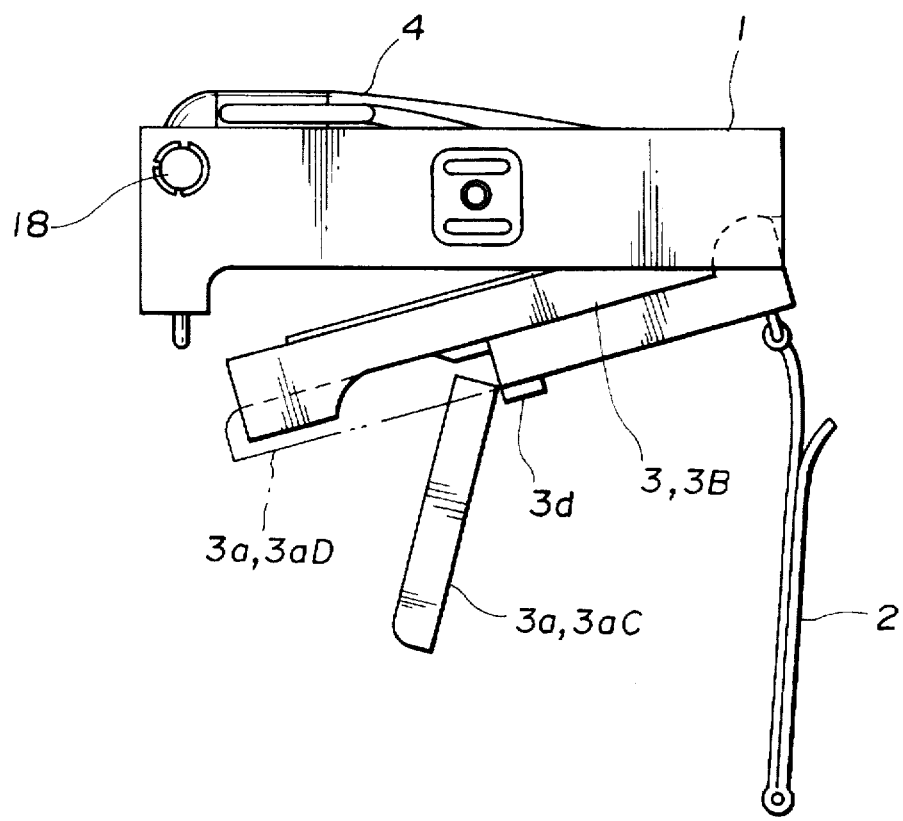
FIG. 12 is a bottom view which illustrates the state where the film cartridge loading portion of the instant camera according to the first embodiment is in the loaded state.
Figure 13:
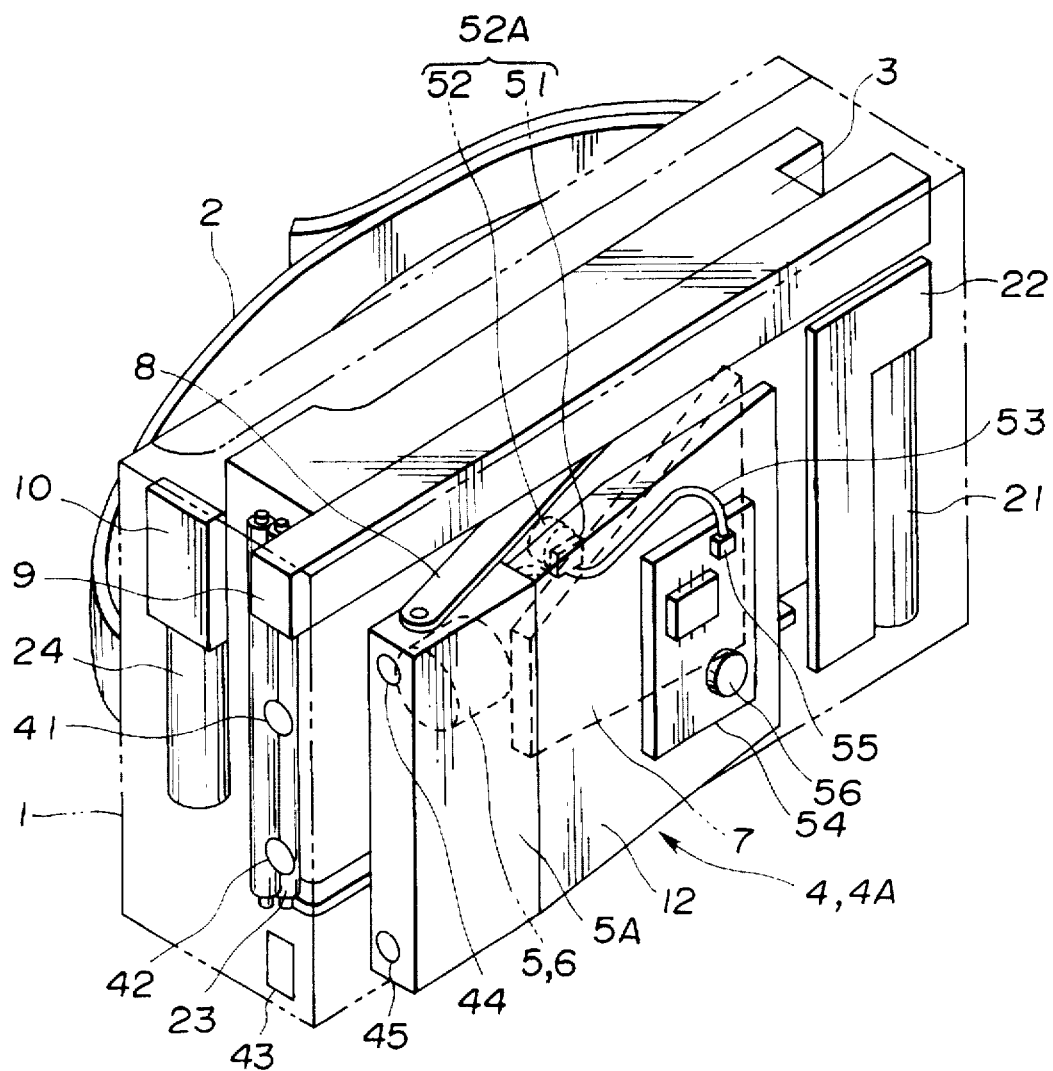
FIG. 13 is a perspective view which illustrates the state where the optical-system block of the instant camera according to the first embodiment is accommodated.
Figure 14:
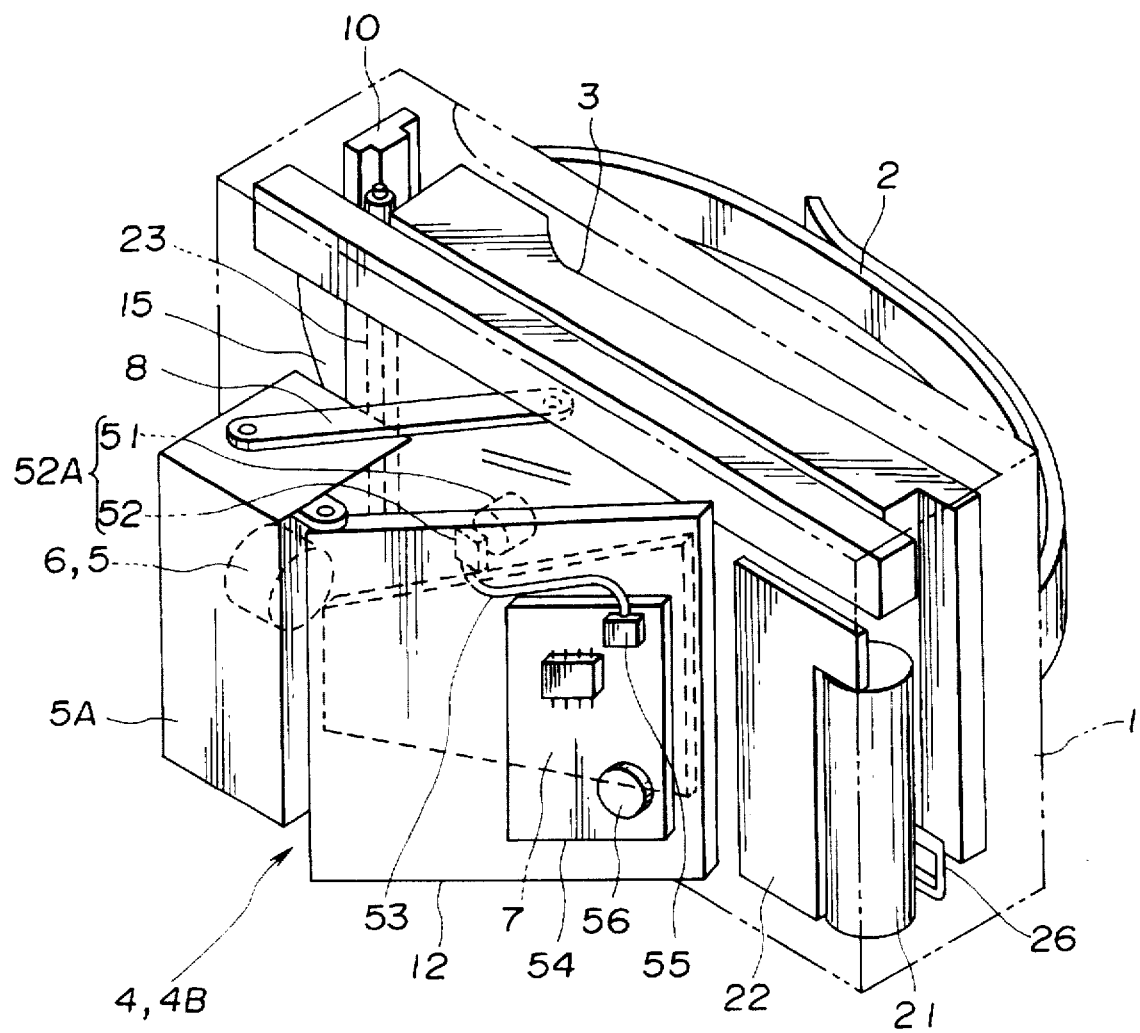
FIG. 14 is a perspective view which illustrates the optical-system block of the instant camera according to the first embodiment in a photography standby state.

FIGS. 10 to 12 respectively are a front view, a right side view and a bottom view of a state where a film cartridge loading portion 3 is rotated to a loading position (3B) at which a film cartridge 31 can be loaded and a loading portion cover 3a is rotated from a loading position (3aD) to an opened position (3aC) when viewed from the position of the subject. FIGS. 13 and 14 are perspective projection views which illustrate disposition of internal elements in a state where the instant camera according to this embodiment is accommodated and in a standby state for photography.

Figure 1:
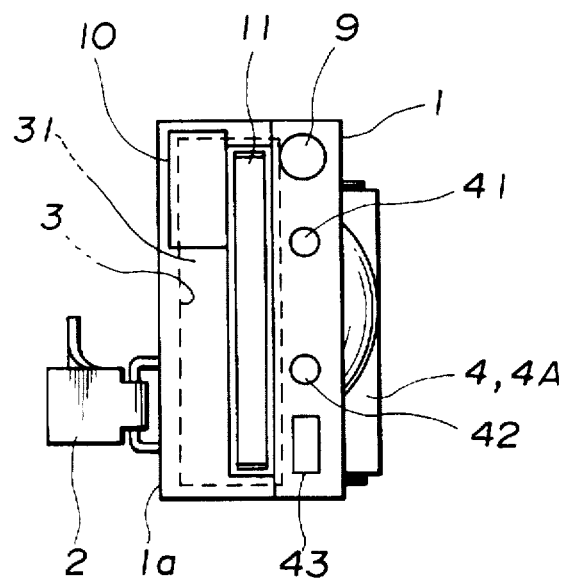
FIG. 1 is a front view which illustrates a state where an optical-system block of an instant camera according to a first embodiment of the present invention is accommodated.
Figure 2:
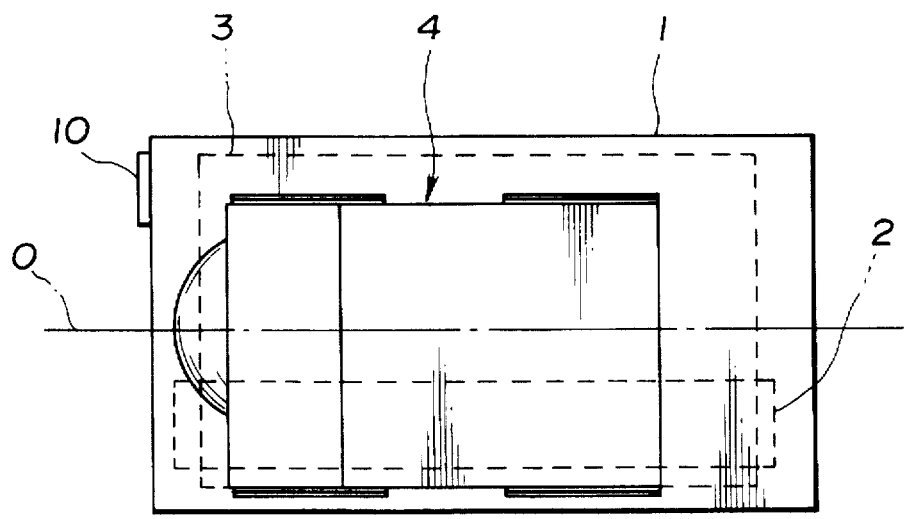
FIG. 2 is a right side view which illustrates the state where the optical-system block of the instant camera according to the first embodiment is accommodated.
Figure 27:
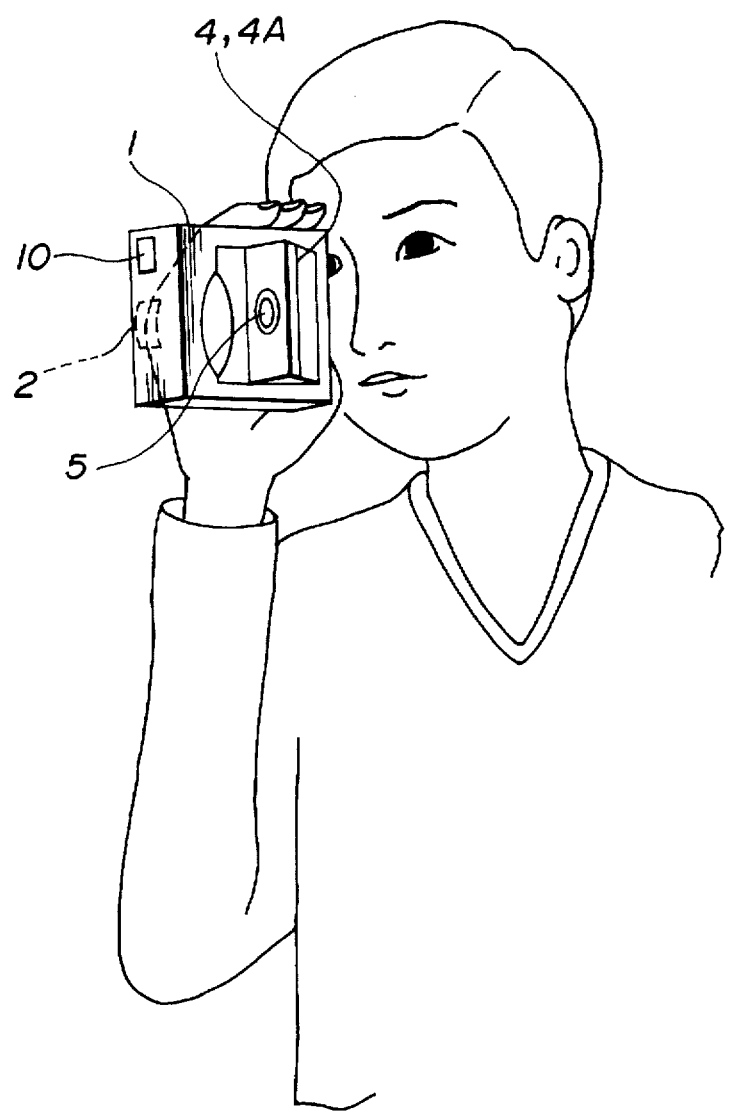
FIG. 27 is a perspective view which illustrates a state where a camera body is held while being stood erect which is a usual photographing state for the instant camera according to the first embodiment.

A camera body 1 of the camera according to this embodiment has the film cartridge loading portion 3 in the left portion thereof shown in FIG. 1 when viewed from the position of a subject, that is, in the right portion when viewed from a position of a photographer in a normal photographing state shown in FIG. 27. Furthermore, the camera body 1 has the optical-system block 4 that can be moved to the photography standby position (4B) when it is moved upwards to the right portion that faces the film cartridge loading portion 3, that is, to the left portion when viewed from the position of the photographer. The left surface of the camera body 1 shown in FIG. 1, on which the film cartridge loading portion 3 is formed, is disposed, that is, the right portion of the same when viewed from the position of the photographer, is made to be a grip surface 1a.

A hand strap 2 extending in parallel to optical axis O is fastened onto the grip surface 1a. The film cartridge 31 is loaded into the film cartridge loading portion 3 in such a manner that the film cartridge 31 is made to run parallel to the grip surface 1a and the surface of the film to be exposed to light opposes the grip surface 1a.

Figure 15:
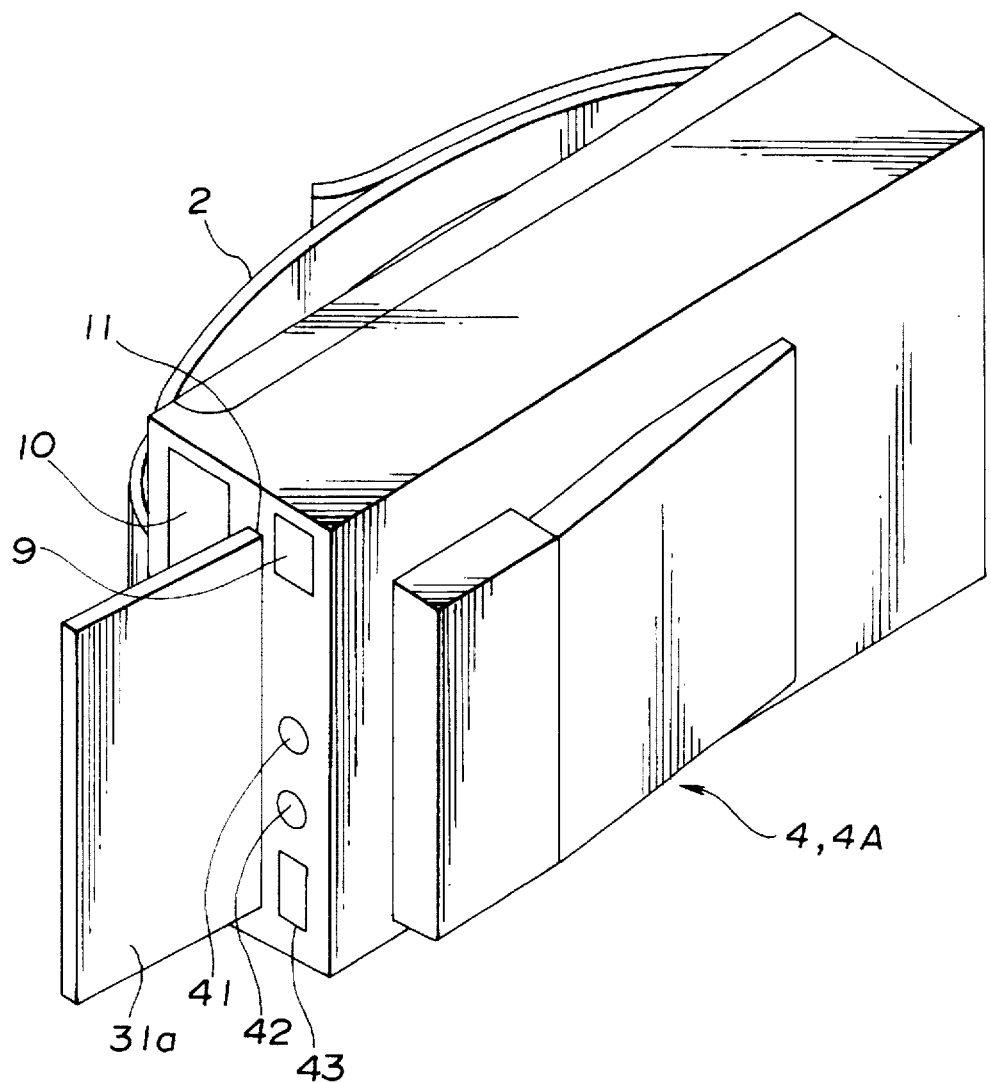
FIG. 15 is a perspective view which illustrates a state of the instant camera according to the first embodiment where a photographed film is discharged.

As shown in FIG. 1, a stroboscope unit 10 is disposed in the left portion of the upper front portion of the camera body 1, that is, in the upper right portion when viewed from the position of the photographer. A finder 9 having an elongated shape is disposed rearwards on the left of the stroboscope unit 10. An external photometric sensor 41, a self-timer LED 42 and a remote control receiving sensor 43 are disposed below the finder 9. In the central portion of the front surface of the camera body 1, a film discharge port 11, through which a photographed film is discharged, is formed. Thus, a film 31a, on which a picture has been taken, is discharged to the front surface of the camera body 1 as shown in FIG. 15 which is a perspective view of a camera state where a film is discharged.

Figure 4:
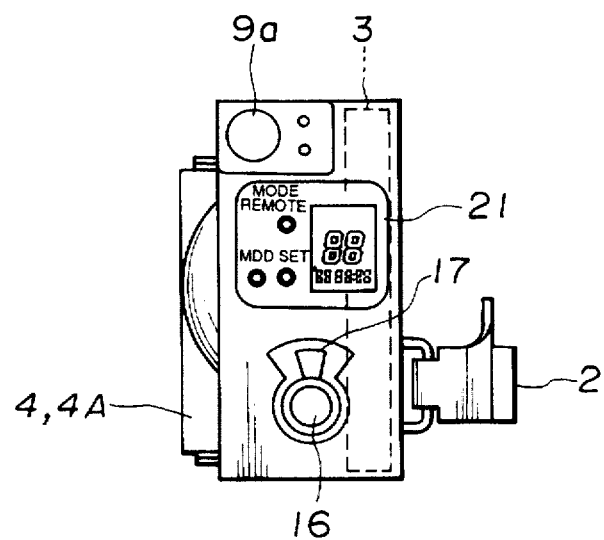
FIG. 4 is a reverse view which illustrates the state where the optical-system block of the instant camera according to the first embodiment is accommodated.
Figure 5:
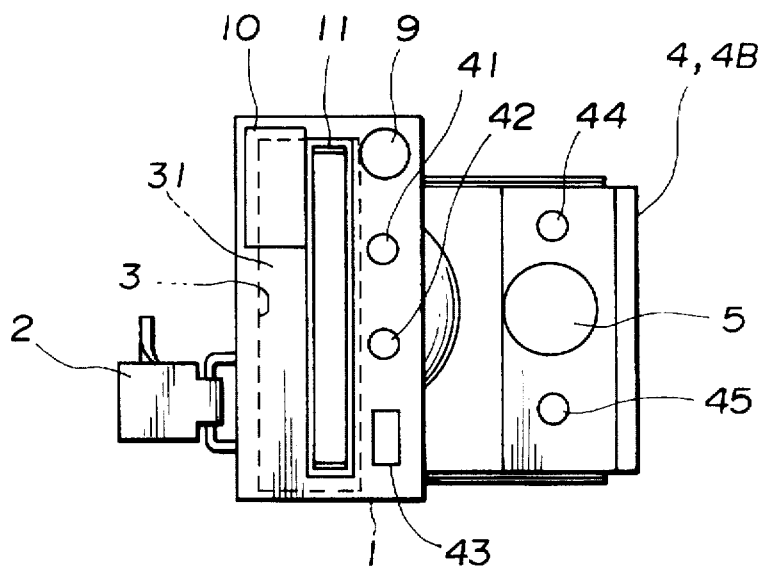
FIG. 5 is a front view which illustrates the optical-system block of the instant camera according to the first embodiment in a photography standby state.
Figure 6:
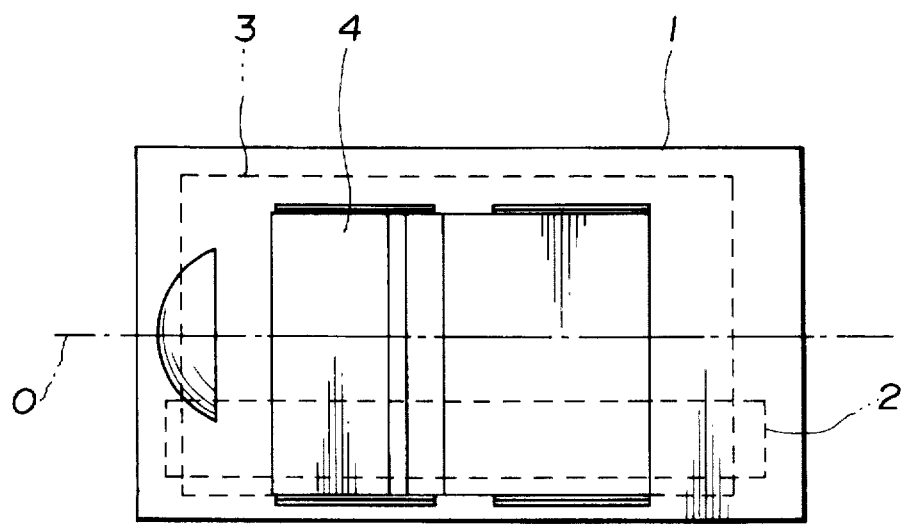
FIG. 6 is a right side view which illustrates the optical-system block of the instant camera according to the first embodiment in the photography standby state.
Figure 7:
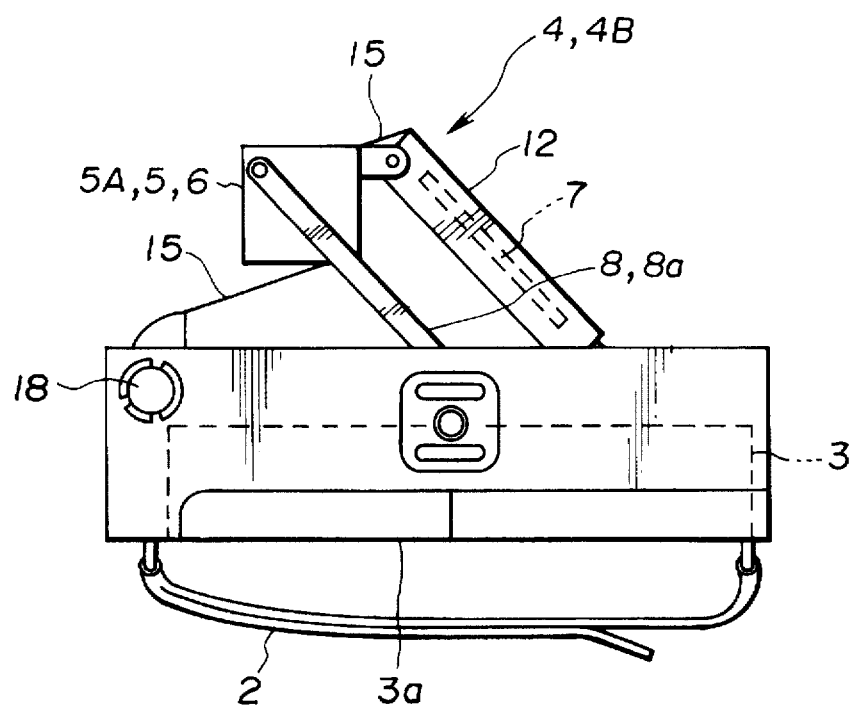
FIG. 7 is a bottom view which illustrates the optical-system block of the instant camera according to the first embodiment in the photography standby state.
Figure 8:
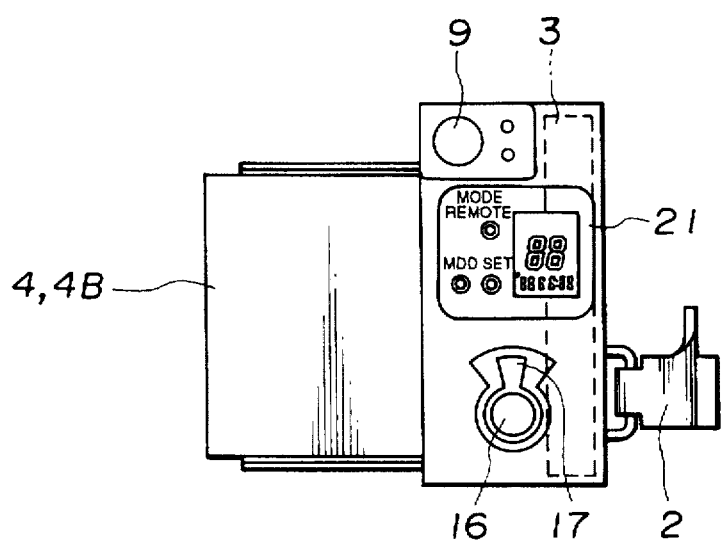
FIG. 8 is a reverse view which illustrates the optical-system block of the instant camera according to the first embodiment in the photography standby state.
Figure 9:
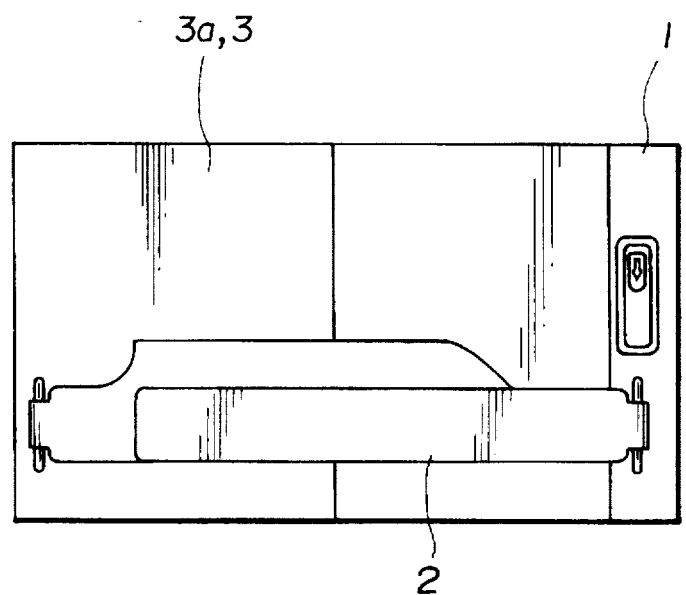
FIG. 9 is a left side view which illustrates the optical-system block of the instant camera according to the first embodiment in the photography standby state.

A finder ocular portion 9a is disposed in the upper portion of the rear surface of the camera body 1 as shown in FIG. 4. A release button 16 and a locking suspension lever 17 for suspending a state where the optical-system block 4 is locked at the accommodated position so as to bring the camera into a photography standby state and as well as having a power-supply switch function are disposed in the lower portion of the foregoing rear surface in such a manner that the release button 16 and the locking suspension lever 17 can be operated by the finger of the hand that is holding the grip. Furthermore, a display portion 21 is disposed in the central portion of the rear surface.

The optical-system block 4, as shown in FIGS. 13 and 14, comprises a shutter unit 5A having a photographing lens 5, a shutter mechanism 6, an AF light emitting sensor 44 and a light receiving sensor 45, a reflecting mirror 7, a light shielding rubber member (to be described later), and a data imprinting optical system 52A (to be described later with reference to FIGS. 13 and 14).

The optical-system block 4 is urged through a link member 8a that composes a link mechanism 8 to be described later so as to be moved upwards in the direction of the surface of the film in the film cartridge loading portion 3. When the locking suspension lever 17 is operated, the state where the shutter unit 5A and the camera body 1 are locked is suspended so that the optical-system block 4 is moved upwards from the accommodated position (4A) shown in FIG. 13 which is a perspective view to the photography standby position (4B) shown in FIG. 14 which is a perspective view by the urging force of a spring 61 to be described later with reference to FIG. 16.

Figure 16:
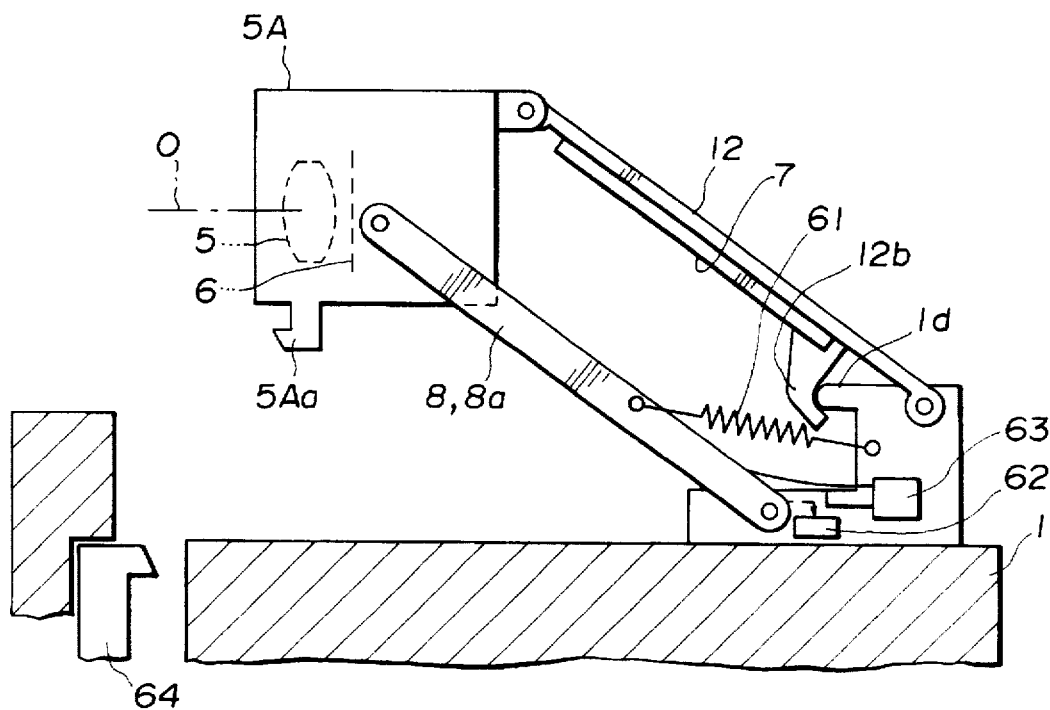
FIG. 16 illustrates an operation state of a link mechanism for operating the optical-system block of the instant camera according to the first embodiment to be performed in the photography standby state.
Figure 17:
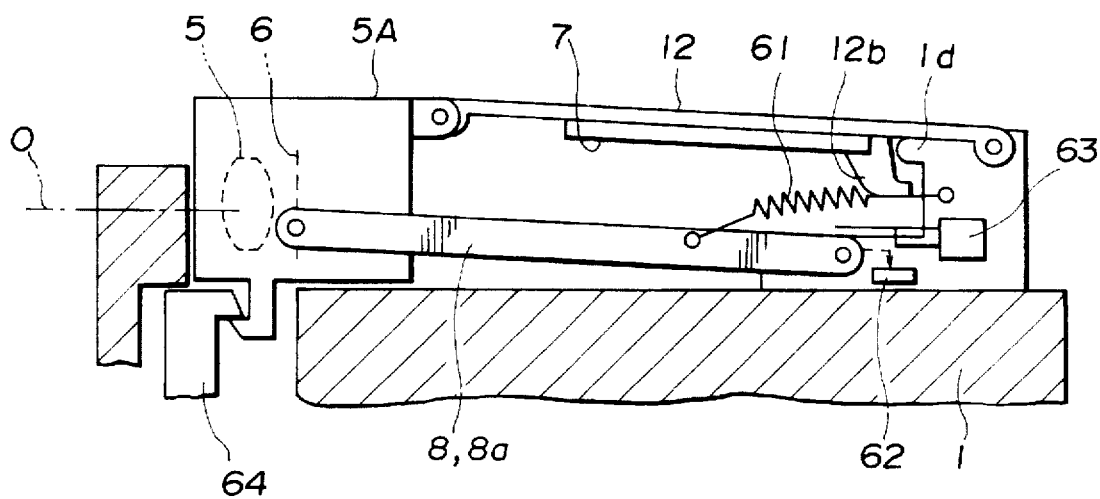
FIG. 17 illustrates an operation state of the link mechanism for operating the optical-system block of the instant camera according to the first embodiment to be performed in the accommodated state.

FIGS. 16 and 17 are diagrams which schematically illustrate the operation of the link mechanism 8 for rotating the optical-system block 4 including the shutter unit 5A between the photography standby position (4B) and the accommodated position (4A). As shown in FIGS. 16 and 17, the link mechanism 8 is a parallel and four-nodal-point link mechanism that comprises a portion for supporting the camera body 1, a reflecting mirror support member 12, the shutter unit 5A and the link member 8a. The link mechanism 8 movably supports the shutter unit 5A that composes a portion of the link mechanism 8 so that the shutter unit 5A is moved from the photography standby position (4B) to the accommodated position (4A) or in the contrary direction while maintaining constant the direction of the optical axis of the shutter unit 5A when the link member 8a is rotated.

Note that the relative angle made between the shutter unit 5A and the reflecting mirror 7 is changed during the movement of the shutter unit 5A.

The link mechanism 8 is urged into the standby direction by the spring 61 through the link member 8a. At the photography standby position (4B), the reflecting mirror support member 12 is brought into contact with a body stopper 1d through a contact portion 12b of the reflecting mirror support member 12 so that it is positioned. Therefore, undesirable looseness does not take place between the shutter unit 5A and the reflecting mirror support member 12 at the photography standby position (4B) so as to be accurately brought to the photography standby position (4B).

Mechanical shock taking place when the reflecting mirror support member 12 is brought into contact with the stopper 1d at the time of the rotation to the photography standby position (4B) can be absorbed by a damper 62 that acts in synchronization with the link member 8a. Furthermore, a status detection switch 63 for detecting the photography standby state is provided so that the status detection switch 63 is operated to realize a photography inhibited state if something is brought into contact with the optical-system block 4 at the time of the photography.

When the optical-system block 4 is rotated from the photography standby position (4B) to the accommodated position (4A), the optical-system block 4 can easily be moved to and folded at the accommodated position (4A) by directly pushing the rear side of the optical-system block 4 by the hand without the necessity of suspending locking or the like because no member is used to lock the optical-system block 4 at the photography standby position (4B).

In the foregoing accommodated state, the optical-system block 4 comprising the shutter unit 5A and the reflecting mirror support member 12 is secured in the accommodated position (4A) in such a manner that a claw 5Aa of the shutter unit 5A is locked to a locking claw 64 formed on the camera body 1. When the photography standby state is realized, the foregoing locking suspension lever 17 slides the locking claw 64 to suspend locking between the shutter unit 5A and the locking claw 64. Thus, the photography standby state is realized.

As described above, the rotating operation realized by the four-nodal-point link mechanism 8 enables the shutter unit 5A to cause the stopper 1d to act at an adequate photography standby position so as to accurately bring the optical-system block 4 to a photographing position as shown in FIGS. 16 and 17. As a result, the size of the instant camera in a folded state can efficiently be reduced while maintaining the optical performance. Furthermore, the photography standby operation and the folding operation can be performed very easily by only one hand.

In the foregoing photography standby state, the optical-system block 4 and the film cartridge 31 are light-shielded by a light shielding rubber member 15. The light shielding rubber member 15 can be efficiently folded between the film cartridge loading portion 3 and the reflecting mirror 7 in a state where the optical-system block 4 is accommodated as will be described with reference to FIG. 19.

Figure 18:
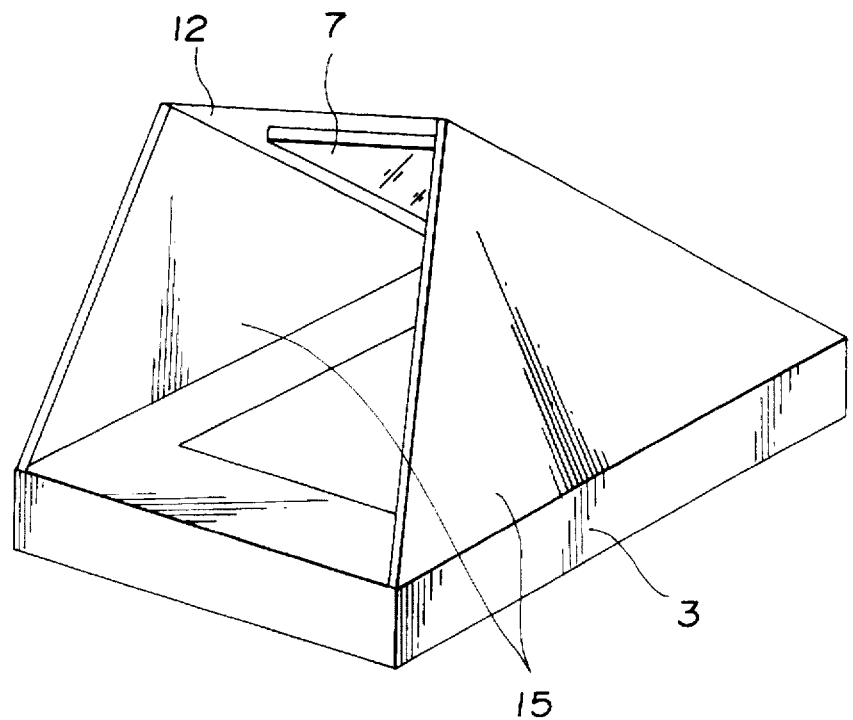
FIG. 18 is a perspective view which illustrates states of a mirror for reflecting light of a subject and a light shielding rubber when the instant camera according to the first embodiment is in the photography standby state.
Figure 19:
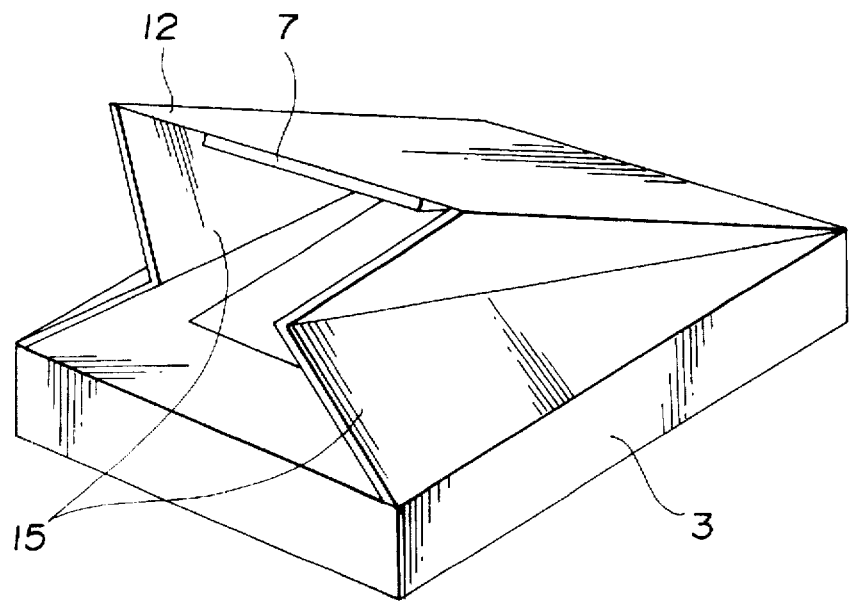
FIG. 19 is a perspective view which illustrates states of the mirror for reflecting light of the subject and the light shielding rubber when the instant camera according to the first embodiment is in the accommodated state.

FIGS. 18 and 19 illustrate the subject light beam reflecting mirror 7 and the light shielding rubber member 15 of the optical-system block 4 in the photography standby state and the accommodated state in such a manner that FIG. 18 shows the photography standby state and FIG. 19 shows the accommodated state.

Figure 20:
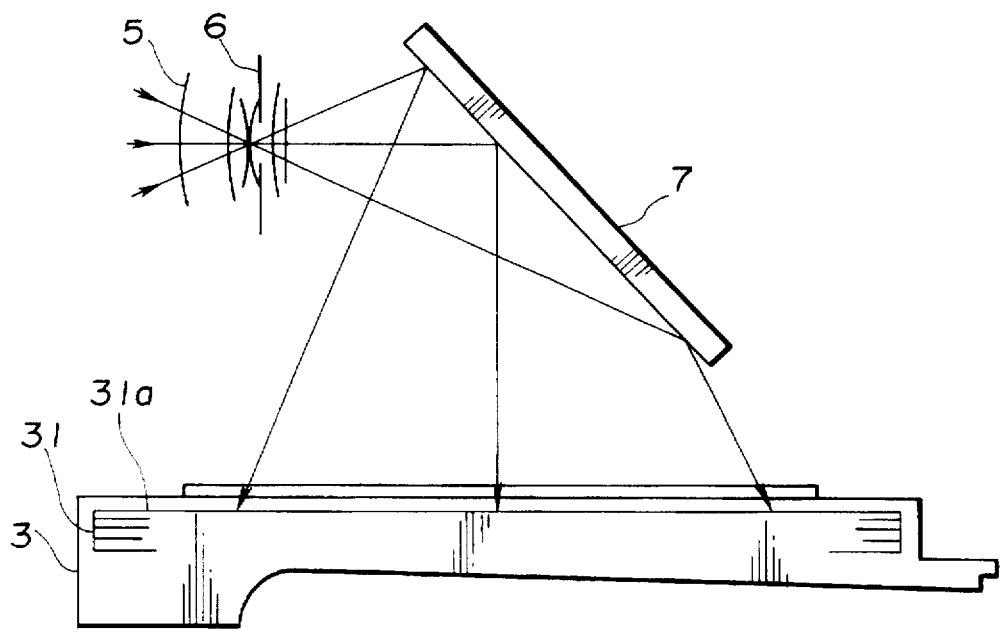
FIG. 20 illustrates an optical path for photographing light in the optical-system block of the instant camera according to the first embodiment.

FIG. 20 illustrates an optical path of the photographing optical system realized by the optical-system block 4, in which the data imprinting optical system is omitted from illustration. When the shutter of the shutter mechanism 6 is opened in a state where the optical-system block 4 is at the photography standby position (4B) as shown in FIG. 20, light of a subject introduced through the photographing lens 5 is reflected by the reflecting mirror 7 and then imaged on an exposure surface of the uppermost film 31a in the film cartridge 31 accommodated in the film cartridge loading portion 3. Thus, photography is performed.

Figure 21:
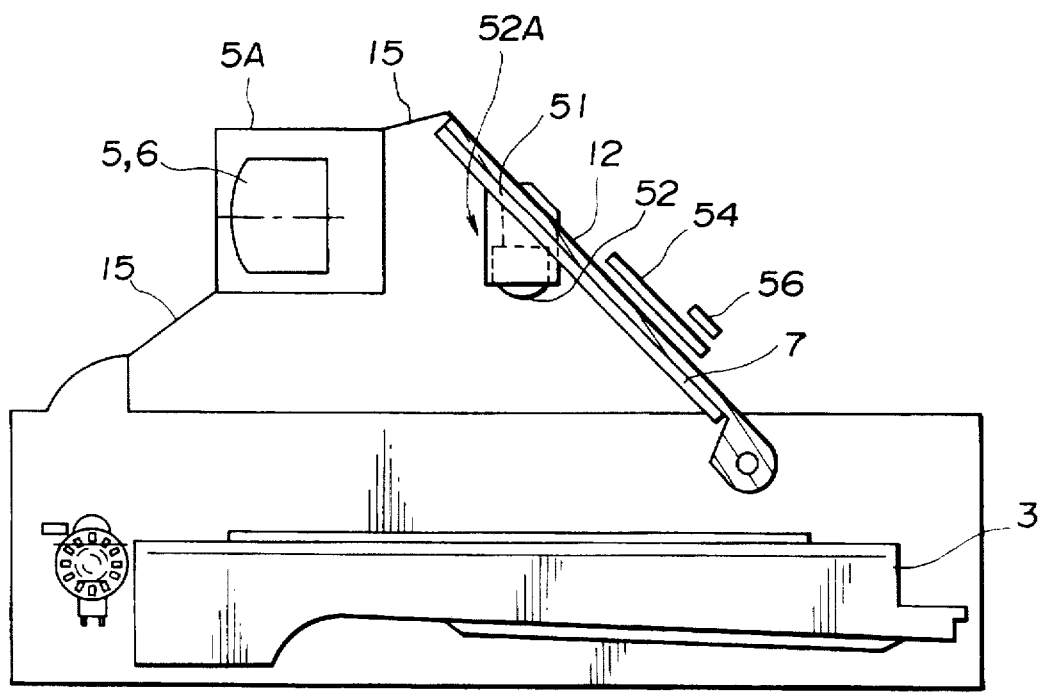
FIG. 21 illustrates the optical-system block including a data imprinting optical system of the instant camera according to the first embodiment in the photography standby state.
Figure 22:
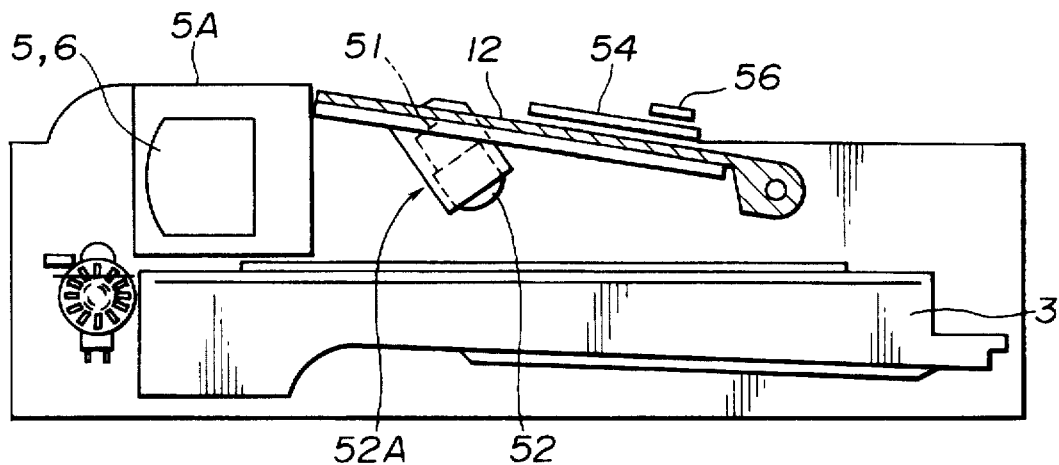
FIG. 22 illustrates the optical-system block including the data imprinting optical system of the instant camera according to the first embodiment in the accommodated state.

FIGS. 21 and 22 illustrate the external shape of the instant camera according to this embodiment and its internal structure including the data imprinting optical system, in which the photography standby state and the accommodated state, in which the shutter unit 5A is folded, are illustrated. As a result of the structure above, the data imprinting optical system can be accommodated between the film cartridge 31 and the reflecting mirror support member 12 even in the state where the instant camera is folded.

Referring to FIGS. 21 and 22, reference numeral 5A represents the shutter unit including the photographing lens 5. Reference numerals 51 and 52 respectively represent a data imprinting LED and the data imprinting optical system that compose a data imprinting optical portion 52A. In order to prevent light leakage from the side portion of the reflecting mirror 7 and from a portion in the vicinity of the shutter unit 5A, the light shielding rubber member 15 is disposed.

Figure 23:
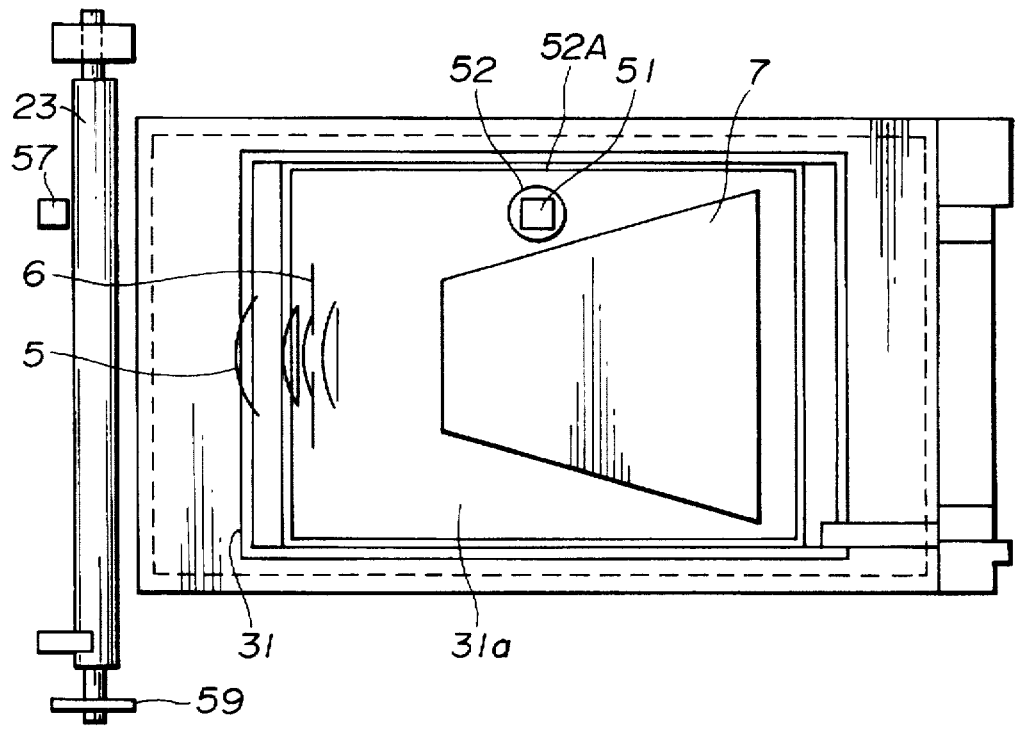
FIG. 23 is a side view which illustrates the optical-system block including the data imprinting optical system of the instant camera according to the first embodiment.
Figure 24:
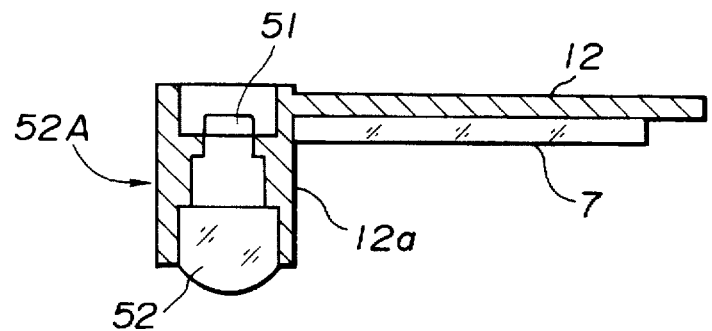
FIG. 24 is a cross sectional view which illustrates a portion including the data imprinting optical system of the instant camera according to the first embodiment.

The data imprinting optical portion 52A comprising the data imprinting LED 51 and the data imprinting optical system 52 is, as shown in FIG. 23 which is a side view, supported beside the reflecting mirror 7 by a data imprinting portion holding member 12a that is formed integrally with the reflecting mirror support member 12 as shown in FIG. 24 which is a cross sectional view. By integrally forming the data imprinting portion holding member 12a and the reflecting mirror support member 12 with each other as described above, the cost can be reduced and the accuracy of the optical system can be improved.

As shown in FIGS. 21 and 22 or FIGS. 13 and 14, a data imprinting electric circuit board 54 and a coin battery 56 for counting time are disposed on the reverse side of the reflecting surface of the reflecting mirror 7. The data imprinting LED 51 and the data imprinting electric circuit board 54 disposed in the data imprinting portion are connected to each other by a flexible printed circuit board 53 through a connector 55 disposed on the data imprinting electric circuit board 54 (See FIG. 13).

Figure 25:
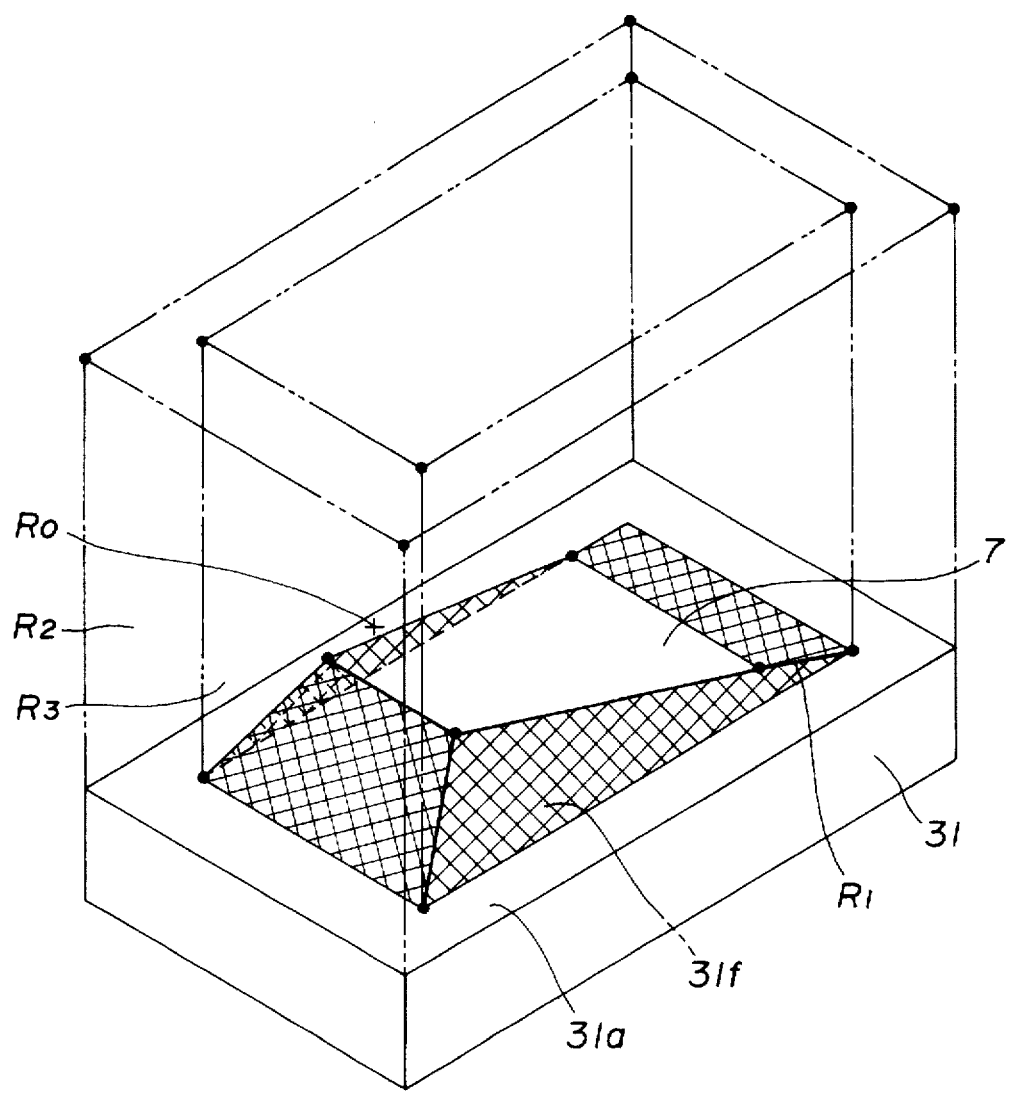
FIG. 25 is a perspective view which illustrates a range for disposing the data imprinting optical system of the instant camera according to the first embodiment.

The data imprinting optical portion 52A is disposed at position R0 which is on the outside of optical path range R1 through which light of a subject is reflected by the reflecting mirror 7 and allowed to reach an exposure surface 31f of the film 31a, which is in a projected space R2 in which the film cartridge 31 is projected toward the reflecting mirror 7 and which is in a projected space R3 in which the foregoing exposure surface is projected toward the reflecting mirror 7, as shown in FIG. 25.

The data imprinting optical portion 52A imprints data in such a manner that light of data supplied by the data imprinting LED 51 is imaged on the exposure surface 31f of the film 31a through a data imprinting imaging lens 52 so that data is imprinted.

Figure 3:
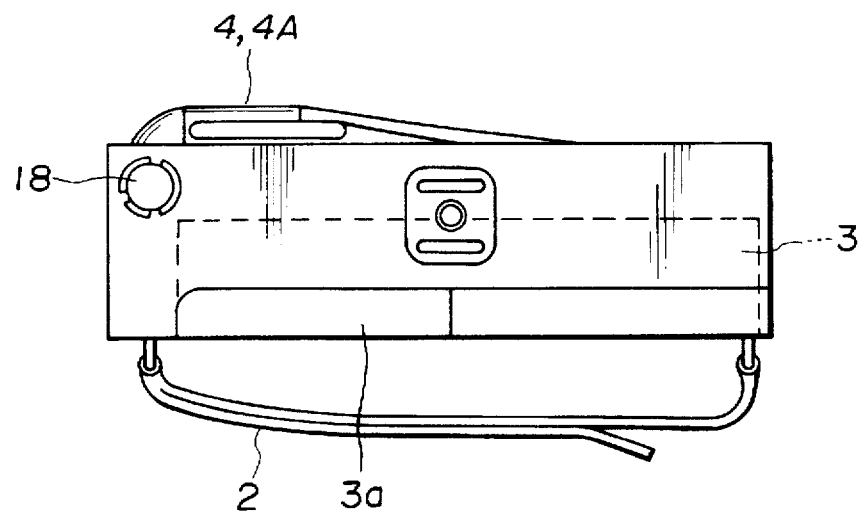
FIG. 3 is a bottom view which illustrates the state where the optical-system block of the instant camera according to the first embodiment is accommodated.

As shown in FIGS. 1, 3 and the like, the hand strap 2 is disposed on the grip surface 1a of the camera body 1 at a position adjacent to the center position of the opening operation of the loading portion cover 3a on the camera body 1 in such a manner that the hand strap 2 strides the loading portion cover 3a in the film cartridge loading portion 3. At least either end of the hand strap 2 can easily be connected/disconnected to and from the camera body 1 or the loading portion cover 3a or the center of the hand strap 2 can be separated. The length of the hand strap 2 can be adjusted arbitrarily.

When the film cartridge 31 is loaded or unloaded, either end of the hand strap 2 is removed from the camera body 1 as shown in FIGS. 10 and 12 before the film cartridge loading portion 3 is rotated to the loading position (3B) shown in FIG. 12. Thus, the film cartridge 31 can be loaded or unloaded. Then, the film cartridge loading portion 3 is closed and the hand strap 2 is connected to the original position in the camera body 1. Thus, loading or unloading of the film cartridge 31 is completed.

Figure 26:
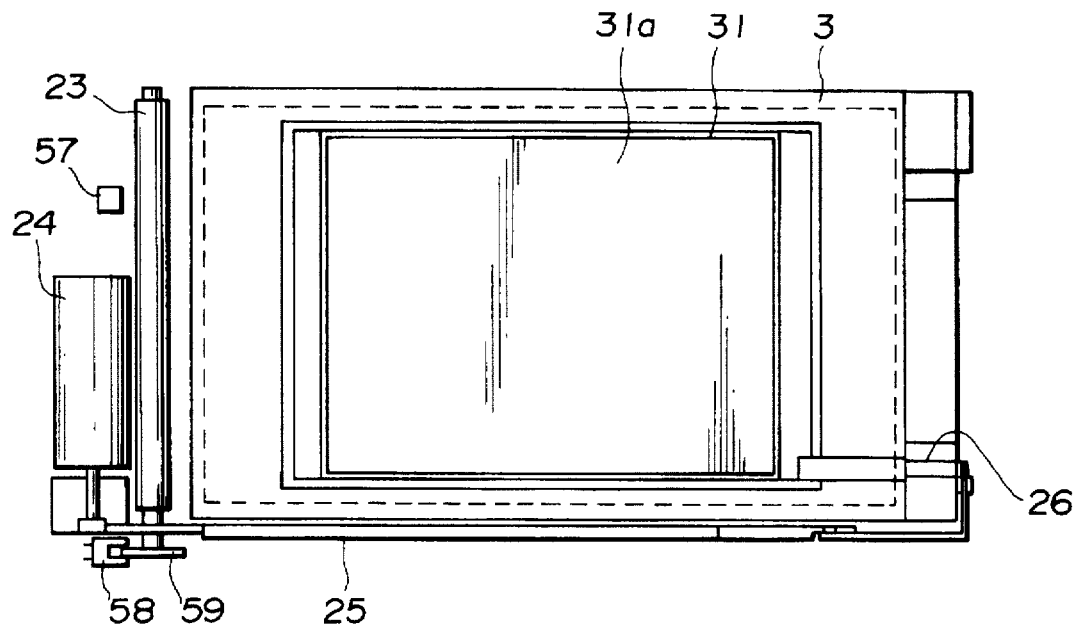
FIG. 26 illustrates the disposition of a film discharge mechanism of the instant camera according to the first embodiment.

FIG. 26 illustrates the structure of a film discharging mechanism portion in the vicinity of the film cartridge loading portion 3 in the camera body 1.

Whenever a picture has been taken, the photographed films 31a are, one by one, discharged through the discharge port 11 formed in the front surface of the camera body 1 as shown in FIG. 15. The discharging mechanism and operation will now be described in detail. After a picture has been taken, a DC motor 24 is rotated, the rotations being, through a gear train 25 including a cam gear, transmitted to a film pick 26 disposed in the rear of the gear train 25. As a result of the operation performed by the film pick 26, only one film 31a at the uppermost position of the film cartridge 31 is introduced into a spread roller 23 disposed in front of the film cartridge 31.

The DC motor 24 also rotates the spread roller 23 so that a developer is dispersed on the surface of the introduced film 31a, on which a picture has been taken. Thus, the film 31a is, after the photography, discharged through the discharge port 11 through a film light shielding film (not shown).

As shown in FIG. 26, an impeller 59 is integrally secured to the spread roller 23, the rotations of the impeller 59 being detected by a photointerrupter 58. The amount of the rotations of the spread roller 23, that is, the quantity of the film 31a that has been moved, is detected by means of pulse signals transmitted by the photointerrupter 58. A photoreflector 57 is disposed on the discharge side of the spread roller 23 so as to detect the moment the leading portion of the discharged film 31a reaches a reference position away from the spread roller 23.

When the photointerrupter 58 has detected a predetermined amount of rotation of the spread roller 23, which corresponds to the discharge of one film 31a, after photography of one frame has been completed and the photoreflector 57 has detected the moment the film 31a has reached the foregoing reference position, the rotation of the DC motor 24 is stopped. Simultaneously with or after the detection of the moment the film 31a has reached the reference position, the photointerrupter 58 generates a predetermined pulse. In synchronization with the pulse emitted by the photointerrupter 58, the data imprinting LED 51 is caused to emit light several times so that data is imprinted.

The spread roller 23 must be periodically cleaned in order to prevent an adverse influence acting on the film surface due to adhesion of dust or the like. If the cleaning operation is performed through a door disposed on the front surface of the camera body 1, there is a risk of getting an electric shock because the stroboscope unit 10 is disposed in the upper portion of the front surface. Therefore, an arrangement that cleaning is performed from the front portion of the camera body 1 cannot be employed.

In this embodiment, a structure is employed in which cleaning can be performed while avoiding the stroboscope unit 10. When the cleaning operation is performed, a cover locking mechanism 3d is, as shown in FIG. 12, operated so as to realize a state in which the loading portion cover 3a of the film cartridge loading portion 3 is opened to the opened position (3aC).

In synchronization with the foregoing operation in terms of the mechanism, an operation knob 18 connected to the spread roller 23 is projected over the outer surface of the camera body 1 as shown in FIGS. 10 and 11. Simultaneously, the linkage of the gear between the DC motor 24 and the spread roller 23 is suspended. Then, a cotton swab or the like is inserted through an opening formed in the loading portion cover 3a so that cleaning is performed while operating the operation knob 18 to rotate the spread roller 23.

As described above, the cleaning mechanism according to this embodiment enables the spread roller 23 to be cleaned satisfactorily without risk of an electric shock.

Although this embodiment has the arrangement that the operation knob 18 is projected in synchronization with the operation for opening the loading portion cover 3a, the operation knob 18 may be projected by an individual operation.

Other electric elements for the instant camera according to this embodiment are, as shown in FIGS. 13 and 14 which are perspective views, disposed in such a manner that a capacitor 21 for the stroboscope unit 10 and a main circuit board 22 are disposed in the rear portion of the camera body 1.

The photographing operation to be performed by the thus-structured instant camera according to this embodiment will now be described.

When the film cartridge 31 is loaded into the camera body 1, the film cartridge loading portion 3 is moved upwards to the loading position (3B) to bring the cartridge loading portion cover 3a to a first opened position (3aD) as shown in FIGS. 10 and 12. Then, the film cartridge 31 is loaded and the film cartridge loading portion 3 is accommodated in the camera body 1. Then, the cartridge loading portion cover 3a is closed to complete the operation for loading the film cartridge 31.

Figure 29:
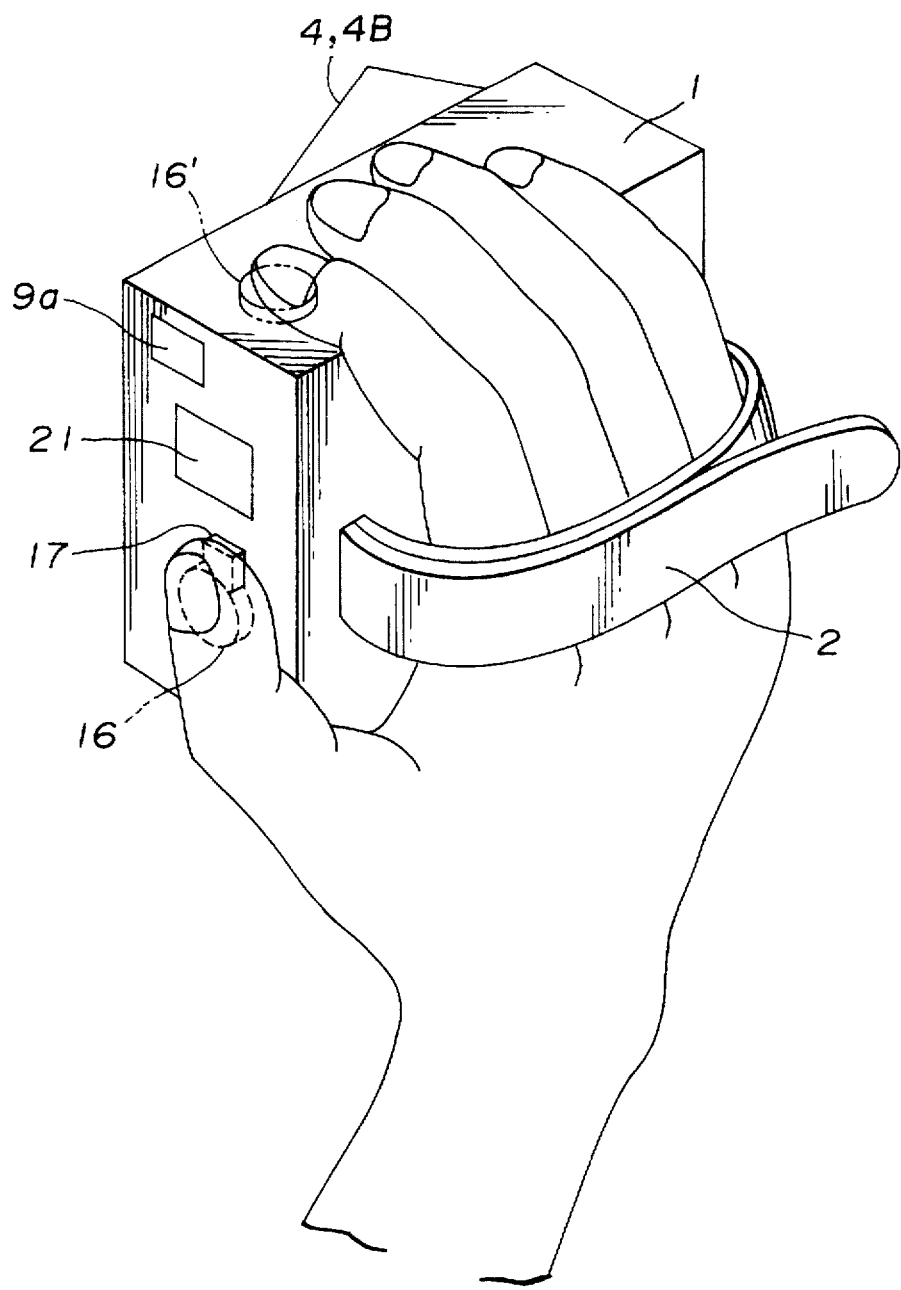
FIG. 29 is a perspective view which illustrates a state where a release switch and a locking suspension lever are operated in a state where the instant camera according to the first embodiment is held.

When a picture is taken, the camera is held as shown in FIG. 29 which is a perspective view. Then, the locking suspension lever 17 is operated by the finger so that the optical-system block 4 in the accommodated state shown in FIGS. 1 and 4 is brought into the photography standby state shown in FIG. 5.

Figure 28:
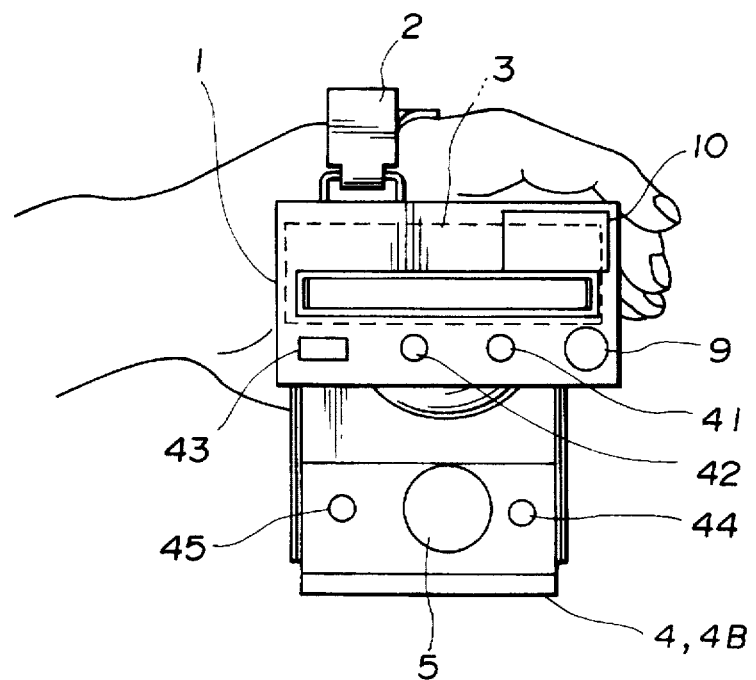
FIG. 28 illustrates a photographing state where the camera body of the instant camera according to the first embodiment is held horizontally.

The state of holding the camera at the time of the photography may be a state where the camera body 1 is stood erect or a state where the same is laid down. FIG. 27 shows a state where the camera body 1 is stood erect at the time of the photography, the foregoing state being made to be a normal photography state. In the normal photography state, a horizontally-long picture can be taken. FIG. 28 shows a state where the camera body 1 is laid down horizontally at the time of the photography. In either case, the camera body 1 can be gripped securely by only the right hand through the hand strap 2 (i.e. the thumb). Furthermore, one finger of the hand, that is gripping the camera body 1, is allowed to operate the release button 16 and the locking suspension lever 17, which also serves as the power switch, as shown in FIG. 29. Thus, all photographing operations can be performed by a single hand.

As a modification, a release button 16' may be disposed in the upper portion of the camera body 1 shown in FIG. 29, the release button 16' being operated by the forefinger or the like.

The camera according to this embodiment inevitably realizes the state of holding the camera at the time of the photography such that the stroboscope unit 10 disposed in the front surface of the camera is positioned higher than the photographing lens 5. Therefore, the subject is irradiated with stroboscope light from an upper position and thus eliminating generation of a shadow by the stroboscope light. In addition, a sufficiently long distance can be maintained from the optical axis of the photographing system to the stroboscope unit 10. Thus, red-eye phenomenon can be prevented and therefore a satisfactory picture can be taken.

Since the camera body 1 cannot be held upside down with respect to the state of holding shown in FIG. 28 by an ordinary state of holding, a subject is not irradiated with light emitted by the stroboscope unit 10 from a lower position. Therefore, the photographer is able to take a picture with stroboscope light without the necessity of recognizing the position of the stroboscope unit 10. Thus, photography can be performed without a failure occurring due to shadow caused by stroboscope light.

The spread roller 23 is cleaned in such a manner that the film cartridge loading portion cover 3a is opened and the spread roller 23 is rotated at the time of the cleaning operation performed by using the cotton swab as described above. In a state where the spread roller 23 is cleaned, the operation knob 18 for rotating the spread roller 23 is projected; and the gear connection between the DC motor 24 and the spread roller 23 is suspended. Therefore, the spread roller 23 can be rotated by the operation knob 18 and thus the spread roller 23 can be cleaned very easily. Since the hand does not come in contact with the stroboscope unit 10 disposed in the front surface of the camera body 1, any electrical risk does not arise and, therefore, the spread roller 23 can be cleaned safely.

As described above, the instant camera according to this embodiment has the arrangement that the film cartridge loading portion 3 is disposed in the portion including the grip 1a; and the optical-system block 4 comprising the photographing lens 5, the shutter mechanism 6 and the reflecting mirror 7 is disposed in the portion opposing the grip portion 1a. Therefore, the stroboscope unit 10 can be disposed at a position at which generation of the red-eye phenomenon and that of shadow of stroboscope light can be prevented at the time of the photography by using stroboscope light.

Since relatively heavy elements, such as the spread roller 23 and the film cartridge 31, are concentrically disposed in the portion including the grip 1a therefore the center of gravity of the instant camera is positioned adjacent to the grip 1a. As a result, the instant camera can be held easily by a single hand as shown in FIGS. 27 and 28.

Since the optical-system block 4 is disposed to oppose the grip portion 1a, a structure that the optical-system block 4 can be folded easily so as to be accommodated can be employed. Therefore, the camera body 1 can be folded compactly at the time of carrying the instant camera.

Since the optical-system block 4 is disposed to oppose the grip portion 1a, the instant camera can be held by a single hand and the necessity of holding the portion including the optical-system block 4 in the photography standby state can be eliminated. Thus, no locking mechanism for maintaining the optical-system block 4 at the photography standby state is required and therefore the folding operation can be performed easily.

The instant camera according to this embodiment has no mechanism for locking the optical-system block 4 at the photography standby state as described above. If the optical-system block 4 is undesirably moved due to the touch of the hand with the optical-system block 4, a signal supplied by the detection switch 63 that detects the movement of the optical-system block 4 is used to inhibit the photography. Thus, the instant camera according to this embodiment enables reliable photography to be performed.

The conventional instant camera shown in, for example, FIG. 33 causes the photographer to take a picture in such a manner that the stroboscope unit 10 is positioned upwards while always recognizing the direction of the instant camera in order to prevent generation of shadow due to stroboscope light. Therefore, problems arise in that the complicated operation is required and a failure in photography due to the shadow of stroboscope light easily takes place.

However, the instant camera according to this embodimentand comprising the stroboscope unit 10 disposed on the upper front surface of the portion including the grip 1a enables the photographer to take a picture without a necessity of recognizing the position of the stroboscope unit 10 realized due to the attitude of the instant camera in order to prevent the generation of shadow of stroboscope light and that of the red-eye phenomenon in both cases where the normal photography shown in FIG. 27 is performed and the photography in which the camera direction is turned is performed as shown in FIG. 28.

Even if a picture turned by an angular degree of 90° as shown in FIG. 28 with respect to the normal photography state shown in FIG. 27 is taken, the camera body 1 is held in such a manner that the stroboscope unit 10 is naturally positioned upwards. Therefore, a picture freed from shadow generated due to stroboscope light can be taken.

Figure 30A:
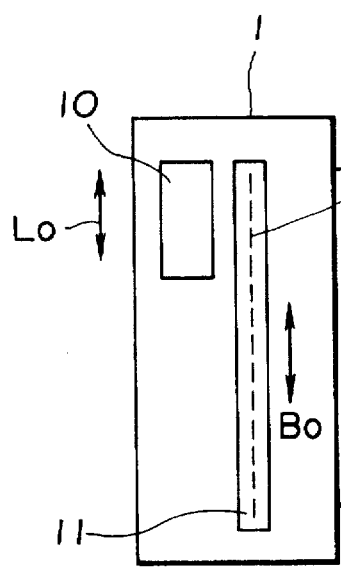
FIG. 30A is a front view which illustrates the instant camera according to the first embodiment.
Figure 30B:
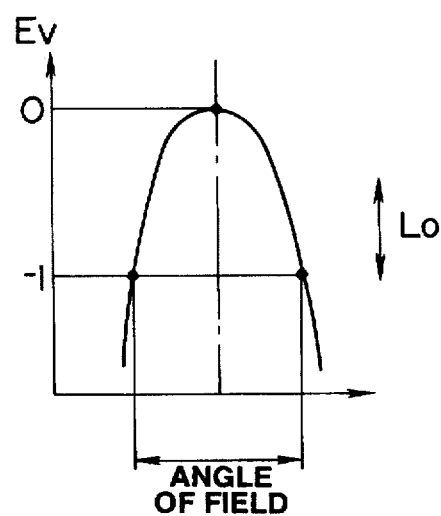
FIG. 30B is a graph showing the distribution of stroboscope light of the instant camera shown in FIG. 30A.
Figure 30C:
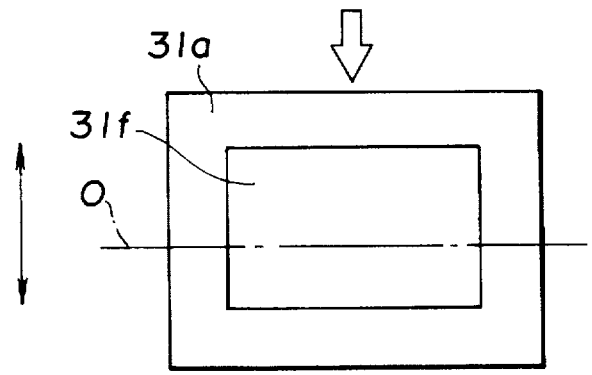
FIG. 30C is a view showing the exposure surface of the film for the instant camera shown in FIG. 30A.

FIG. 30A is a front view which illustrates the instant camera according to this embodiment. FIG. 30B is a graph showing the distribution of stroboscope light of the instant camera according to this embodiment, and FIG. 30C is a view showing the exposure surface of the film for the instant camera according to this embodiment. FIGS. 30A, 30B and 30C being related to one another in terms of the direction of holding. Lengthwise direction L0 in which the stroboscope unit 10 is disposed is made to be in parallel to a direction of the exposure surface 31f of the film 31a. In the instant camera according to this embodiment, the lengthwise direction of the film 31a runs parallel to the photographing optical axis O.

Therefore, the width of angle of field that causes the EV-value to be, for example, −1 is shorter than the lengthwise length of the film exposure surface 31f and, therefore, irradiation with stroboscope light is unsatisfactory because of the distribution characteristics of stroboscope light.

Figure 31:
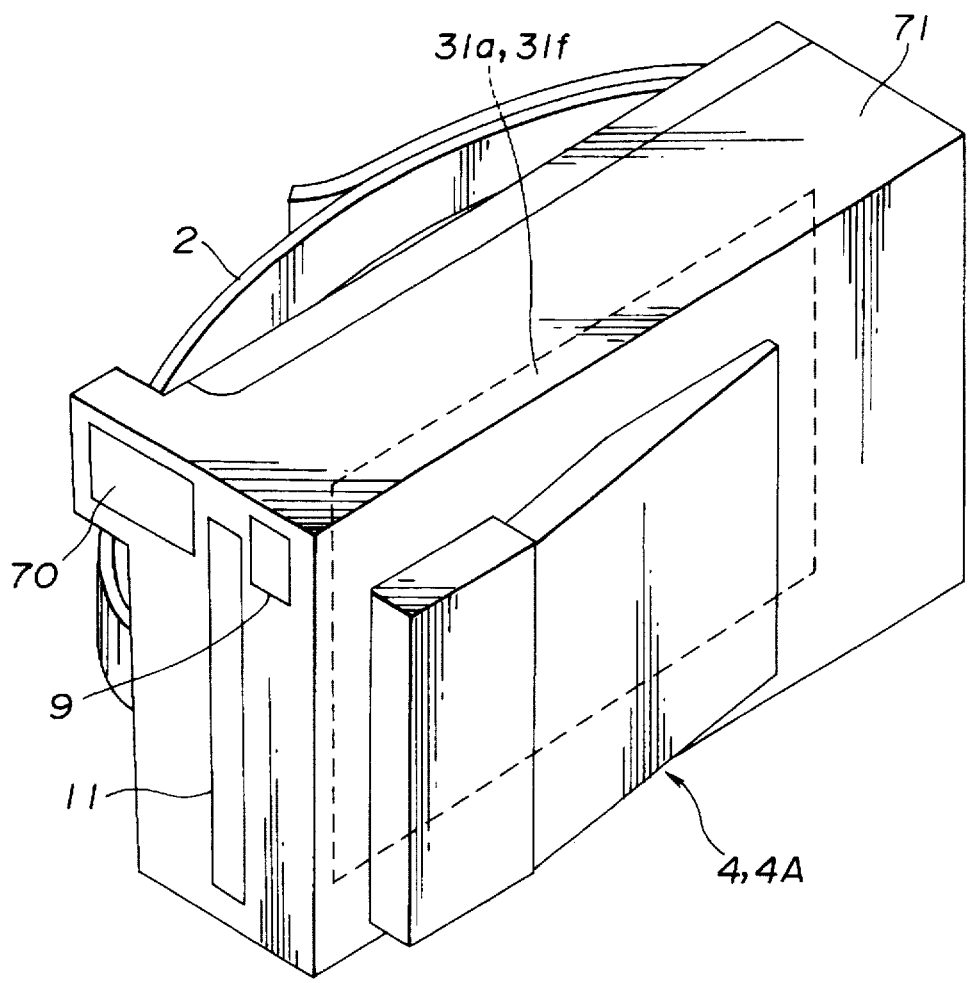
FIG. 31 is a perspective view which illustrates a modification of the instant camera according to the first embodiment in which the lengthwise direction of a stroboscope unit is disposed horizontally.
Figure 34:
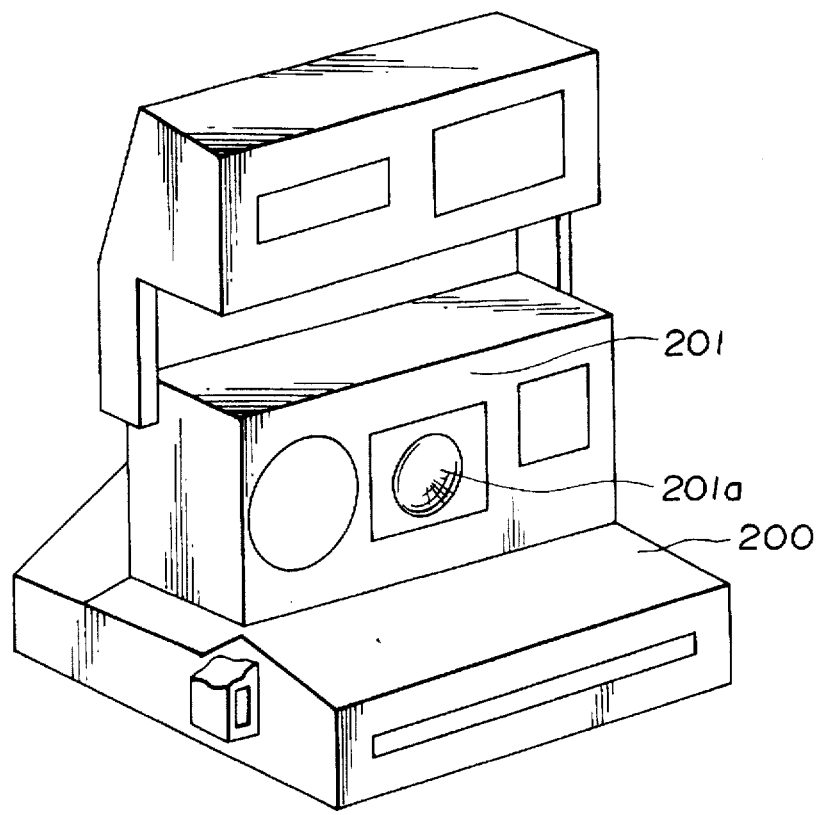
FIG. 34 is a perspective view which illustrates a conventional instant camera of a type having an optical-system unit that cannot be folded.
Figure 35:
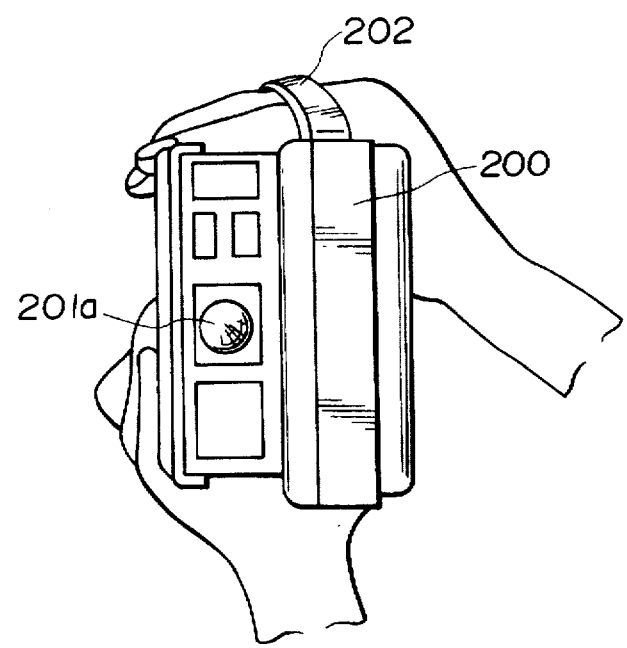
FIG. 35 is a front view which illustrates a state where the instant camera shown in FIG. 33 is held while standing erect the camera body.
Figure 36:
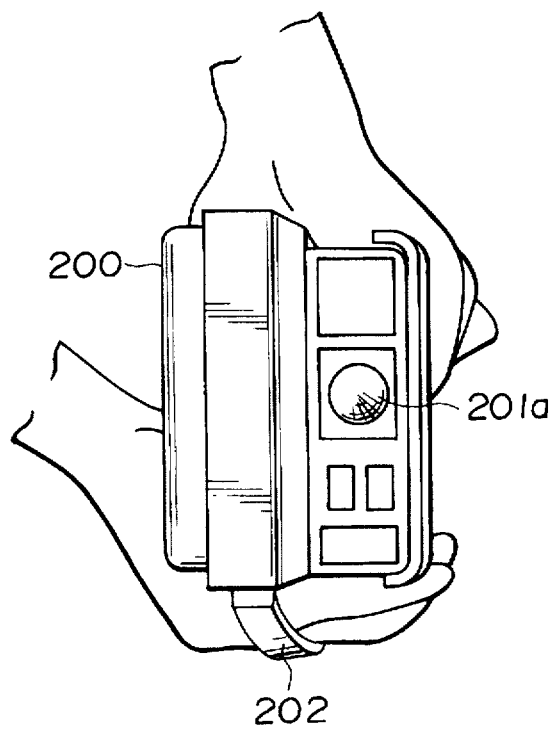
FIG. 36 is a front view which illustrates a state where the instant camera is held while reversely standing erect the camera body with respect to the state shown in FIG. 35.
Figure 37:
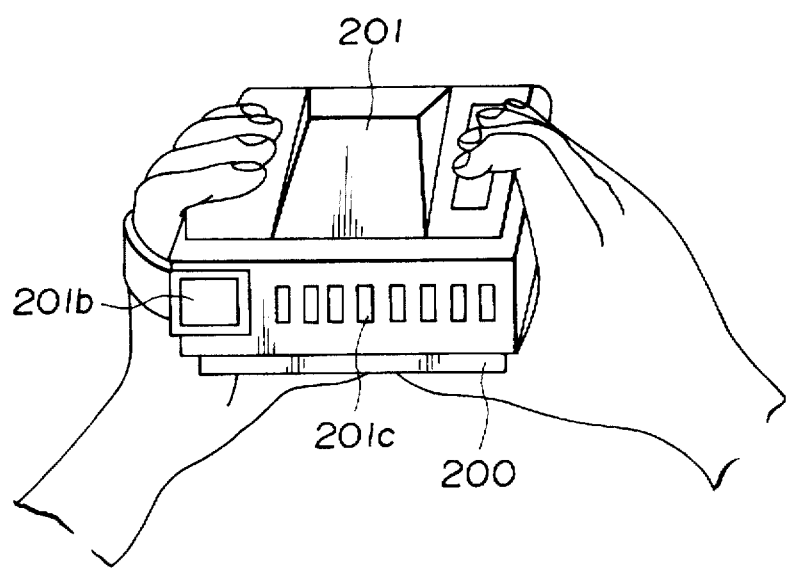
FIG. 37 is a perspective view which illustrates a state where a conventional folding-type instant camera is held when viewed from a rear position.
Figure 38:
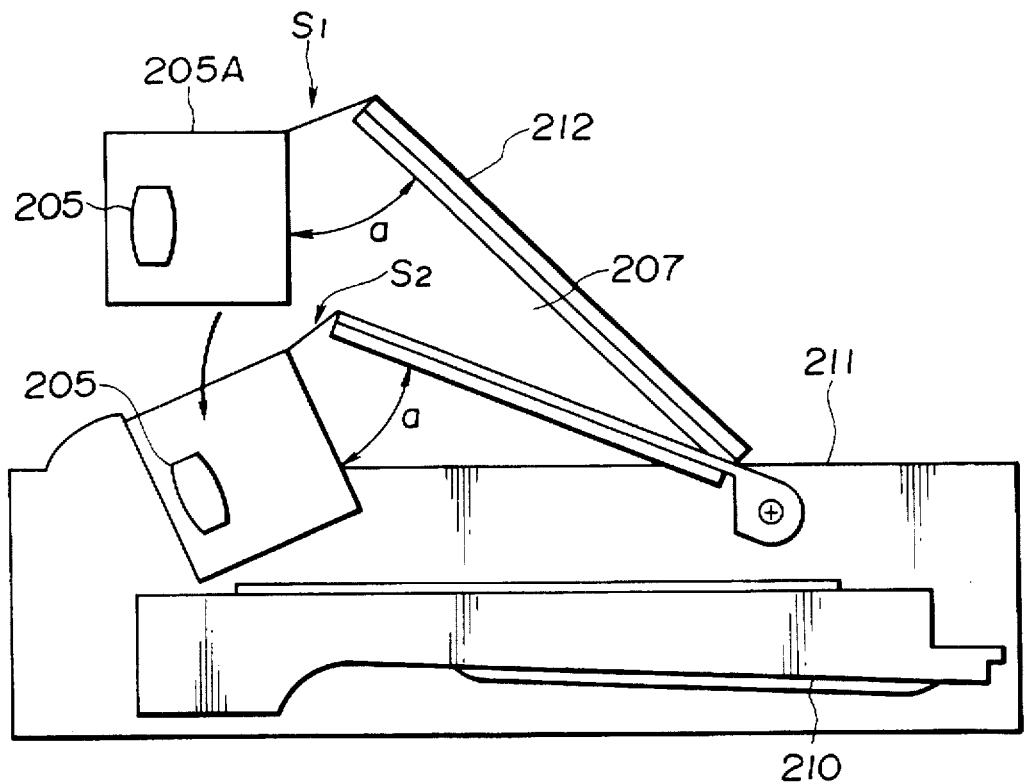
FIG. 38 illustrates a state where the optical-system unit of another conventional folding-type instant camera is folded.
Figure 39:
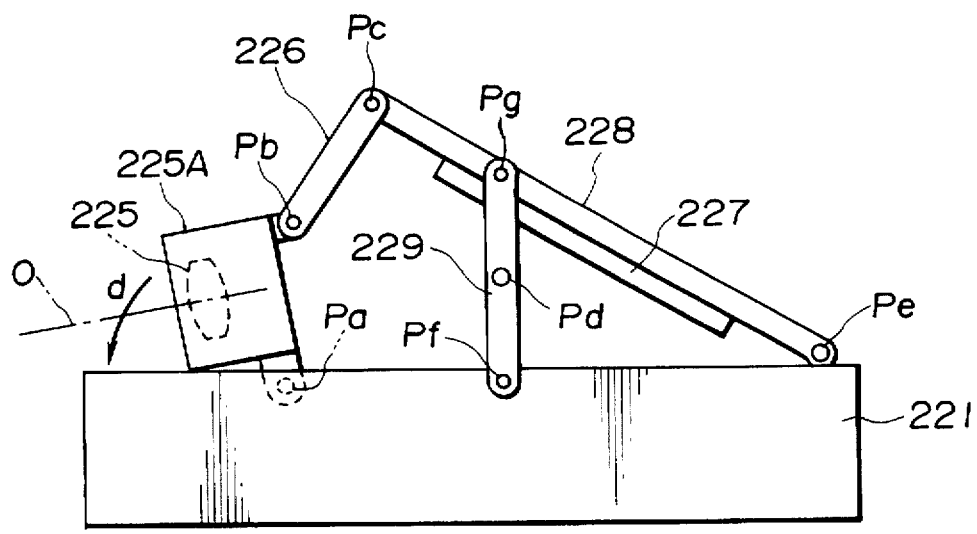
FIG. 39 illustrates the optical-system unit of another conventional folding-type instant camera in the photography standby state.
Figure 40:
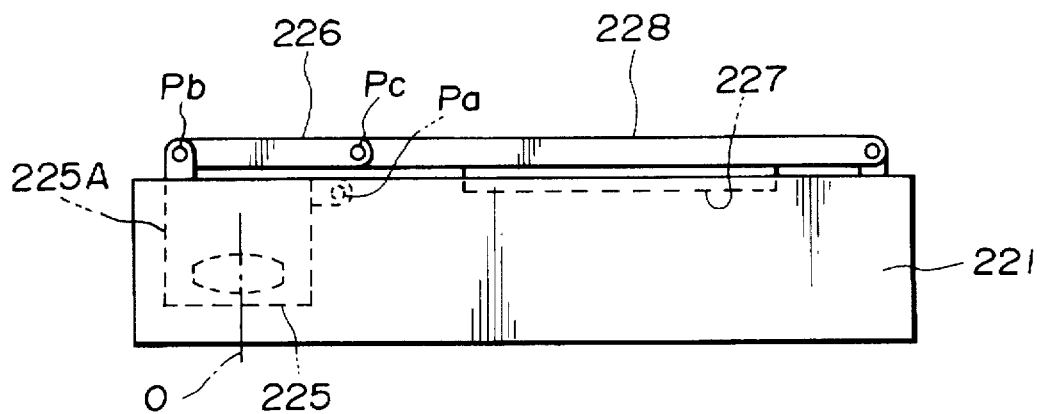
FIG. 40 illustrates a state where the optical-system unit of the conventional folding-type instant camera shown in FIG. 39 is accommodated.
Figure 41:
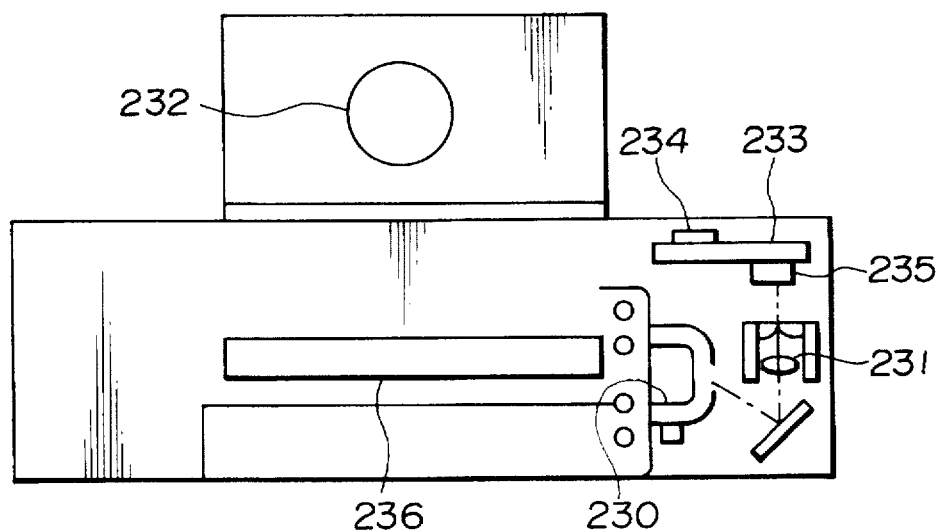
FIG. 41 illustrates the structure of another conventional instant camera including an imprinting optical system.
Figure 42A:
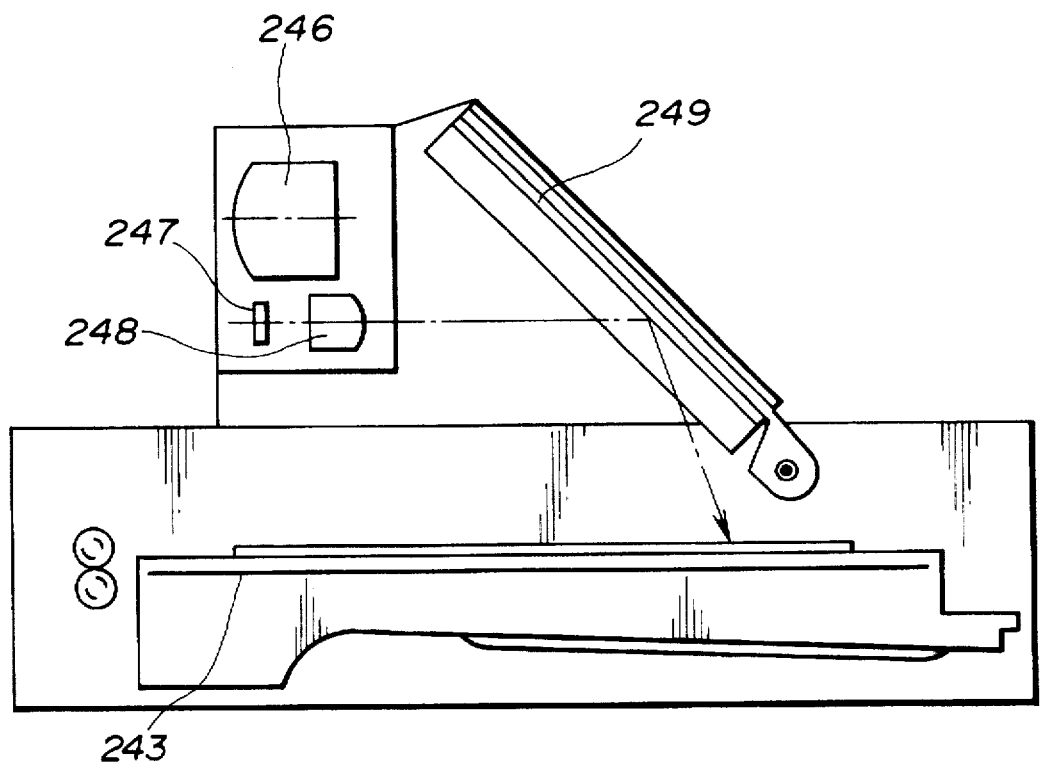
FIG. 42A illustrates another conventional instant camera including an imprinting optical system in state where the instant camera is in a photography standby state.
Figure 42B:
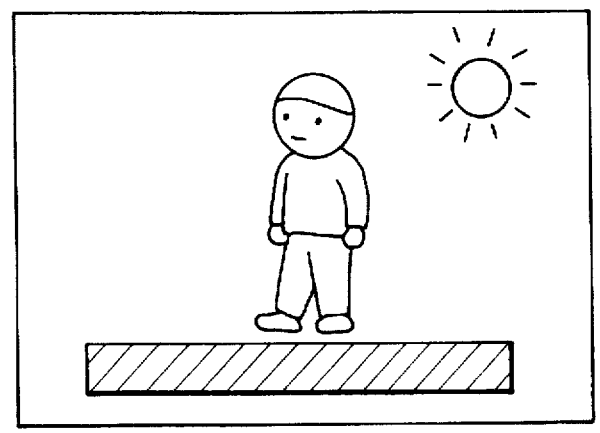
FIG. 42B illustrates a data imprinting portion on a film in the instant camera shown in FIG. 42A.
Figure 43:
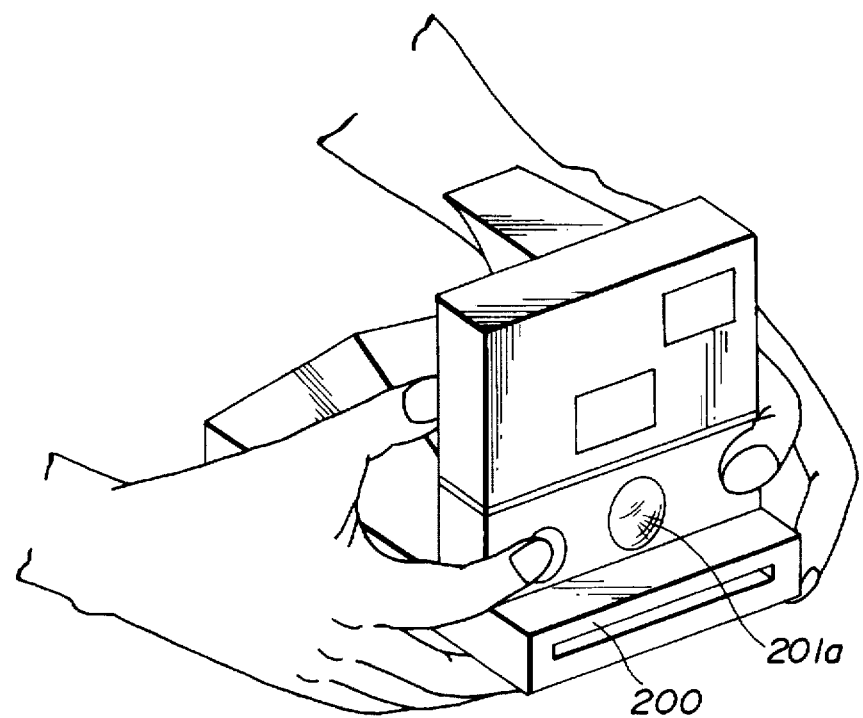
FIG. 43 is a perspective view which illustrates a state where the conventional instant camera shown in FIG. 33 is held.
Figure 44:
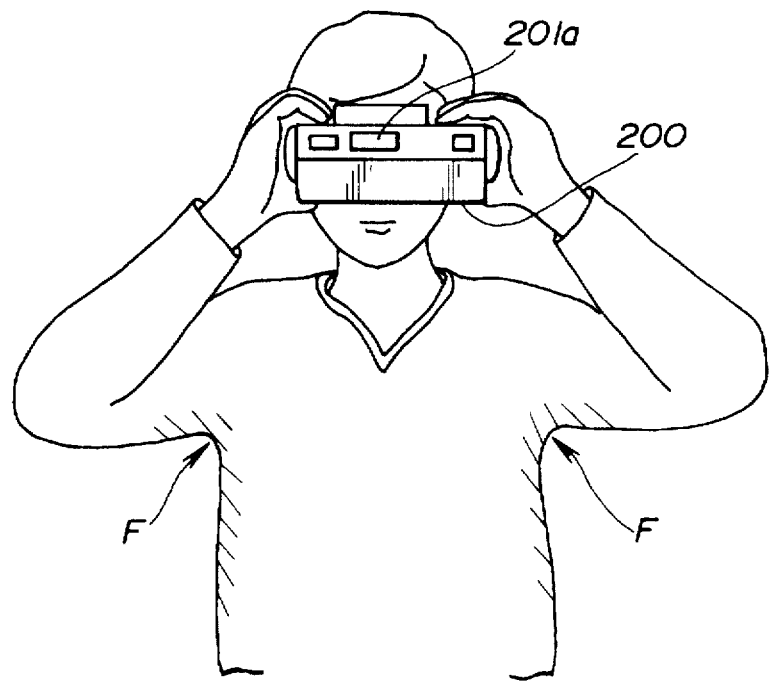
FIG. 44 illustrates a state where another conventional folding-type instant camera is held.
Figure 45:
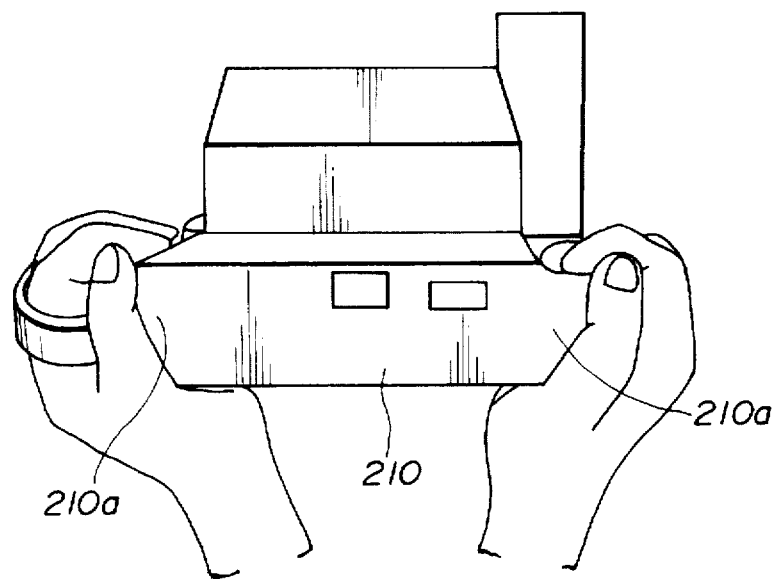
FIG. 45 illustrates a state where another conventional folding-type instant camera of a type having grip portions on the two sides thereof is held.
Figure 46:
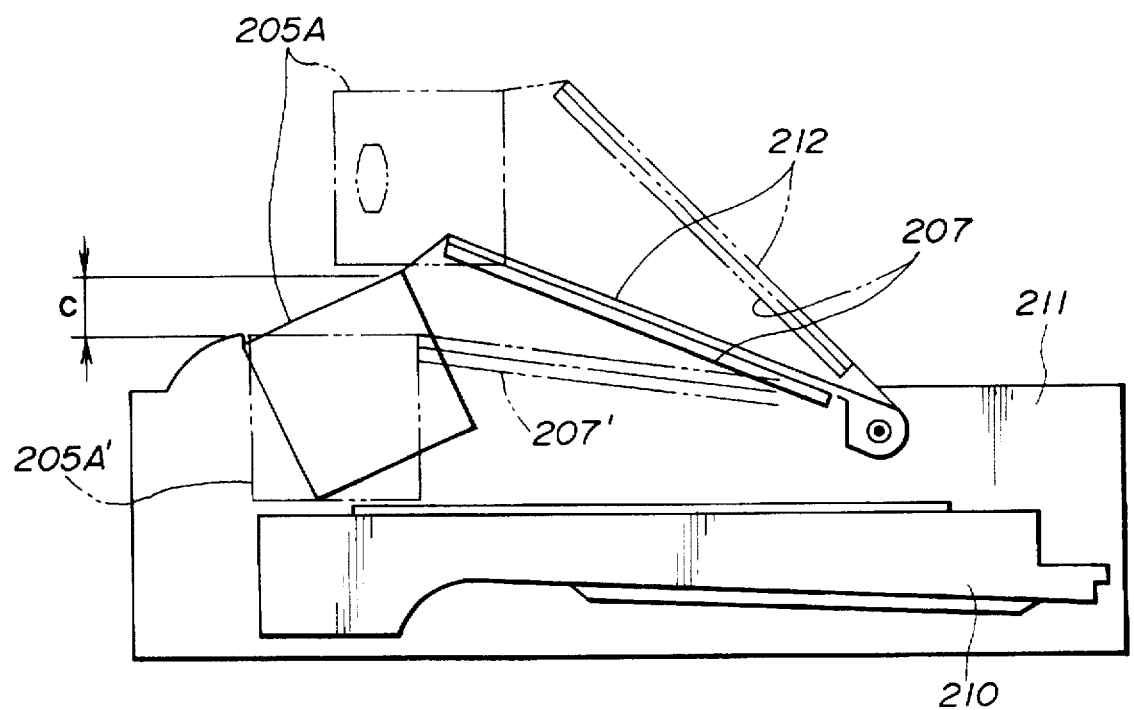
FIG. 46 illustrates the photography standby state and the accommodated state of the optical-system unit of the conventional folding-type instant camera shown in FIG. 42A.

As a modification of the instant camera capable of improving the foregoing state of irradiation with stroboscope light, an instant camera according to this modification has an arrangement that a stroboscope unit 70 is horizontally disposed as shown in FIG. 31 which is a perspective view. The lengthwise direction L0 of the stroboscope unit 70 is made to be perpendicular to the exposure surface 31f of the film 31a. FIG. 32A is a front view which illustrates the instant camera according to this modification shown in FIG. 31. FIG. 32B is a graph showing the distribution of stroboscope light of the instant camera according to this modification and FIG. 32C is a view showing the exposure surface of the film for the instant camera according to this modification. FIGS. 32A, 32B and 32C being related to one another in terms of the direction of holding.

Since the instant camera according to this embodiment causes the light distribution to be widened horizontally, the width of angle of field that causes the EV-value to be, for example, −1 corresponds to the lengthwise length of the film exposure surface 31f. Therefore, stroboscopic photography can be performed while realizing a satisfactory exposure state over the entire surface of the photographed image.

Although each of the instant cameras according to the foregoing embodiment and the modification has a structure which enables the optical-system block 4 to be moved between the photography standby position and the accommodated position, the layout of the instant camera according to the present invention can be applied to an instant camera having a structure in which the optical-system block is secured to the camera body to obtain a similar effect.

Figure 47:
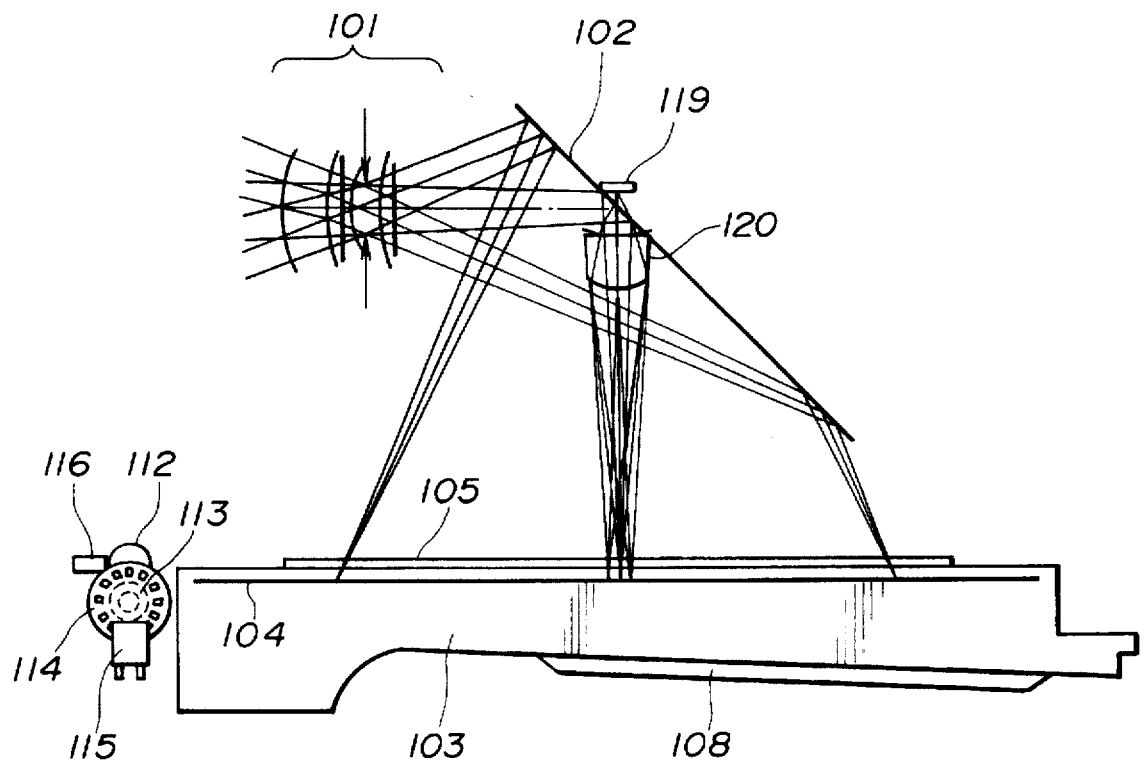
FIG. 47 is a bottom view which illustrates an essential portion of an instant camera according to a second embodiment of the present invention.

A second embodiment of the present invention will now be described. FIG. 47 is a bottom view which illustrates an essential portion of an information imprinting unit for an instant camera according to the second embodiment of the present invention.

The instant camera according to this embodiment is a self-development-type instant camera having an arrangement that the optical-system block is moved upwards to a photography standby position at the time of taking a picture.

As shown in FIG. 47, the instant camera according to this embodiment has a photographing lens group 101 at a predetermined position. In the rear of the photographing lens group 101 (in the right portion of FIG. 47), a mirror 102 for reflecting, toward a film 104, light passed through the photographing lens group 101 is disposed. A film pack 103 accommodating a self-development-type instant film can be loaded into either side of the instant camera. FIG. 47 illustrates a state where the exposure surface 107 (see FIG. 48) of the film 104 accommodated at the uppermost position in the film pack 103 faces the mirror 102. In the vicinity of the mirror 102, a data imprinting portion comprising a date imprinting LED 119 and a converging lens 120 is disposed. The data imprinting portion will be described later.

Figure 48:
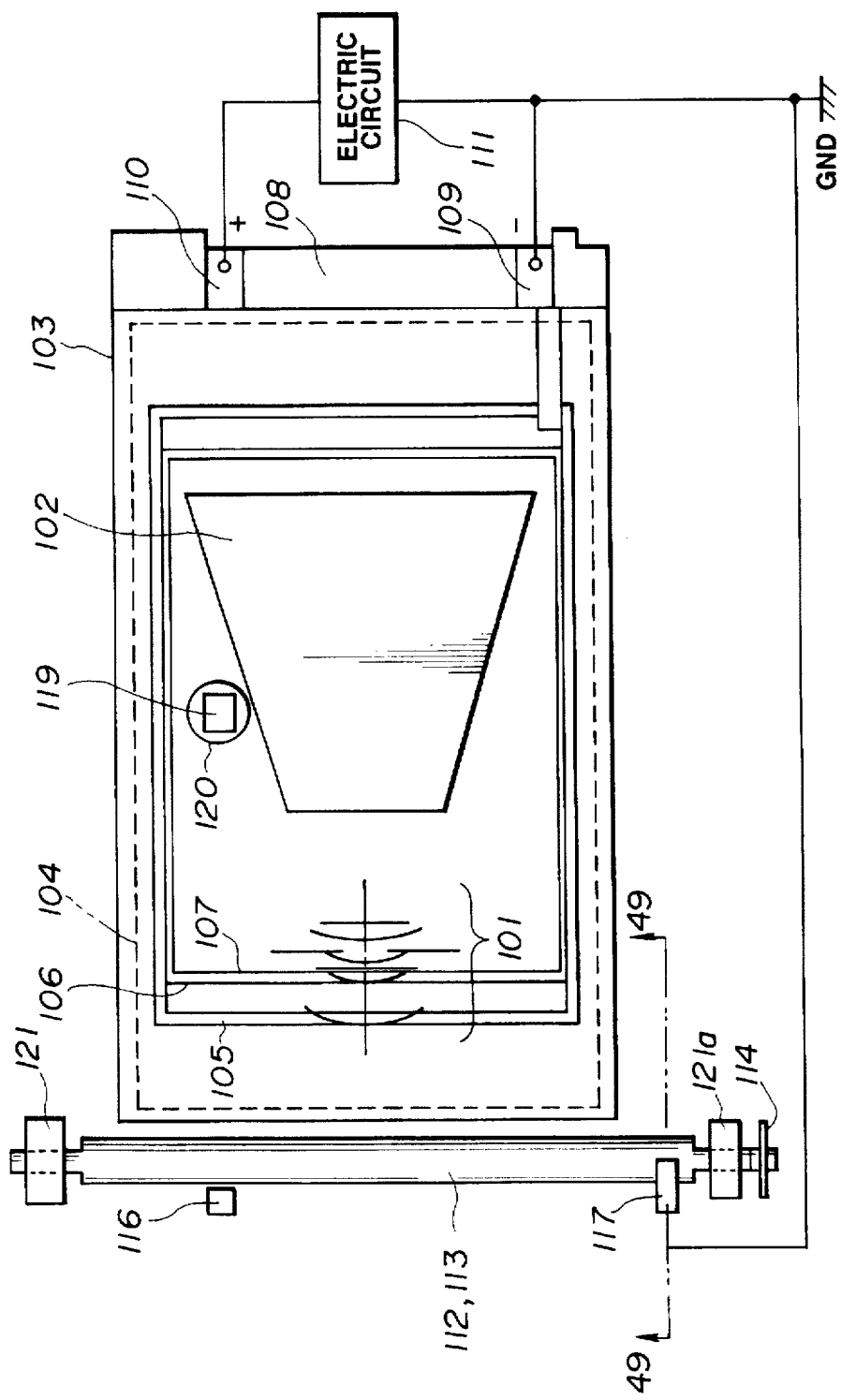
FIG. 48 is a side view which illustrates an essential portion of the instant camera according to the second embodiment.

FIG. 48 is a side view which illustrates an essential portion of the instant camera according to the second embodiment.

An opening portion 106 is formed in the top surface of the film pack 103, and a light shielding member 105 is disposed around the opening portion 106. A next film 104 to be exposed is placed at the uppermost position (in the upper portion in the film pack 103 shown in FIG. 47) in the film pack 103 in such a manner that its exposure surface 107 appears outside through the opening portion 106 so that light of a subject reflected by the mirror 102 is incident on the exposure surface 107. Referring to FIG. 48, reference numeral 107 represents a photographing surface of the film 104.

Unexposed films (not shown) are, in an overlapped manner, placed on the reverse side of the exposure surface 107 of the film 104.

Referring back to FIG. 47, a sheet-type battery 108 is included on the reverse side (in the lower portion of the film pack 103 shown in FIG. 47) of the film pack 103. The sheet-type battery 108 has, as shown in FIG. 48, a minus terminal 109 and a plus terminal 110. An electric circuit 111 for totally controlling the instant camera according to this embodiment is connected between the two terminals 109 and 110 so that electric power is supplied from the sheet-type battery 108. Although the electric circuit 111 will be described in detail, the electric circuit 111 controls exposure, photometry, range finding operation, film feeding operation, date imprinting operation, heating of a pair of spread rollers 112 and 113 and control of a stroboscope unit, to be described later.

The spread rollers 112 and 113 are pressure rollers formed into a pair that is disposed in front (in the left portion of FIG. 47) of the film pack 103, the spread rollers 112 and 113 having a nipping portion (a pressing portion) that is disposed adjacent to the leading portion of the film 104 while being perpendicular to a direction in which the film 104 is conveyed. Each of the spread rollers 112 and 113 is made of an electrically conductive material so as to, under control of the electric circuit 111 to be described later, press, convey and discharge the photographed film 104 and as well as press the film 104 to disperse the developer over the entire surface of the exposure surface 107.

As shown in FIG. 47, a spread photointerrupter (SPPI) 115 is disposed adjacent to an end (toward the surface of the drawing sheet of FIG. 47) of a rotational shaft of the lower spread roller 113 of the two spread rollers 112 and 113. Furthermore, an impeller 114 is integrally secured to the spread roller 113 at a position that corresponds to the spread photointerrupter 115 so as to pass through a slit formed in the spread photointerrupter 115.

The spread photointerrupter 115 is arranged to transmit pulse signals, the number of which is in proportion to the number of rotations of the impeller 114 so as to enable the number of rotations of the spread roller 113 to be detected. Note that the pulse signals are transmitted by the spread photointerrupter 115 to the foregoing electric circuit 111.

On the other hand, a photoreflector (PR) 116 is disposed adjacent to the front portion of the spread roller 112, that is, adjacent to the film discharge port as shown in FIG. 48 so as to detect the leading portion of the film 104 discharged from the spread rollers 112 and 113. The photoreflector 116 detects the film reference position, and then the pulse signals transmitted by the spread photointerrupter 115 are counted so as to control the date imprinting operation to be performed by the data imprinting portion (see FIG. 47) and timing at which a spread motor (an SP motor) 128 (see FIG. 55) for rotating the spread rollers 112 and 113 is turned off.

As described above, the spread rollers 112 and 113 are made of electrically conductive material, the spread rollers 112 and 113 each having an end with which is in contact a member for removing static electricity generated on the surface of the film 104 during the discharge of the film 104. That is, an electricity removing brush 117 serving as the electricity removing member is in contact with an end of the spread roller 112 as shown in FIG. 48.

Figure 49:
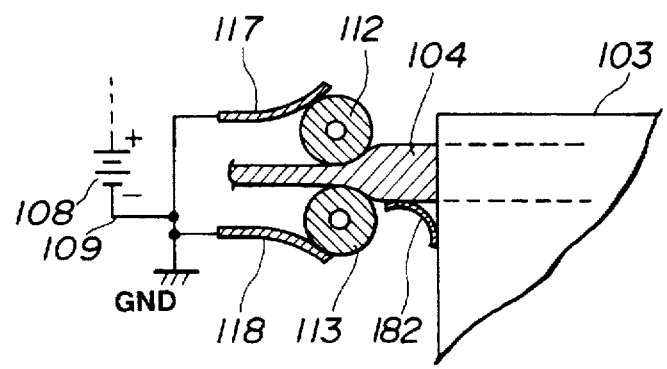
FIG. 49 is a side view which illustrates an essential portion of a static electricity removing member of the instant camera shown in FIG. 48.

FIG. 49 is a cross sectional view which illustrates the member for removing static electricity of the instant camera shown in FIG. 48.

As shown in FIG. 49, an end of the electricity removing brush 117 made of the electrically conductive material is in contact with the upper spread roller 112, while an end of an electricity removing brush 118 similar to the electricity removing brush 117 is in contact with the lower spread roller 113. The other ends of the electricity removing brushes 117 and 118 are connected in common to the minus terminal of the sheet-type battery 108 and a ground level.

The operation of the static electricity removing members will now be described.

When the film 104 is conveyed while being pressed by the pair of the spread rollers 112 and 113, static electricity is generated on the surface of the film 104. Since the spread rollers 112 and 113 and the electricity removing brushes 117 and 118 are made of the electrically conductive material as described above, the generated static electricity flows through the spread rollers 112 and 113 and the electricity removing brushes 117 and 118 to reach the minus terminal 109 of the sheet-type battery 108, that is, reach the ground level.

Note that the instant camera according to this embodiment has an arrangement that the wires between the electricity removing brushes 117, 118 and the minus terminal 109 of the sheet-type battery 108 and the ground level have the shortest possible lengths and largest possible diameters to lower the impedance.

The light shielding member 182 is disposed around the port formed in the film pack 103 for discharging the photographed film 104, so that the light shielding member 182 rubs the film 104 which is being discharged. Since the light shielding member 182 rubs the film 104 which is being discharged, it is charged with electricity, causing static electricity to be generated in the film 104.

Figure 50:
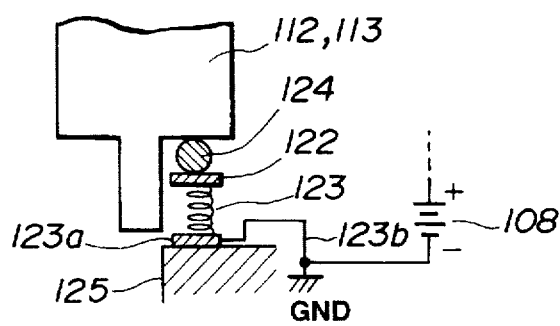
FIG. 50 is a cross sectional view which illustrates an essential portion of a modification of the static electricity removing member of the instant camera according to the second embodiment.

FIG. 50 is a cross sectional view which illustrates an essential portion of a modification of the static electricity removing member.

In this modification, an electrically conductive and electricity removing ball 124 which is in contact with an end surface of each of the spread rollers 112 and 113 and which is rotated when the spread rollers 112 and 113 are rotated is provided. The electricity removing ball 124 is pressed against an end surface of each of the spread rollers 112 and 113 by an electrically conductive spring 123 and a ball support member 122. The electrically conductive spring 123 is supported by an electrically conductive member 123a secured to an insulating portion 125 secured to the outer surface of the instant camera. Furthermore, en electrically conductive wire 123b extends from the electrically conductive member 123a, the electrically conductive wire 123b having an end that is connected to the minus terminal 109 of the sheet-type battery 108, that is, to the ground level.

As a result, static electricity generated on the surface of the film 104 is passed through the spread rollers 112 and 113 and the foregoing electrically conductive members before it reaches the minus terminal 109 of the sheet-type battery 108, that is, to the ground level.

As described above, this modification is able to eliminate a necessity of disposing an electricity removing member in front of the spread rollers 112 and 113. Thus, the size of the apparatus can be reduced.

Figure 51:
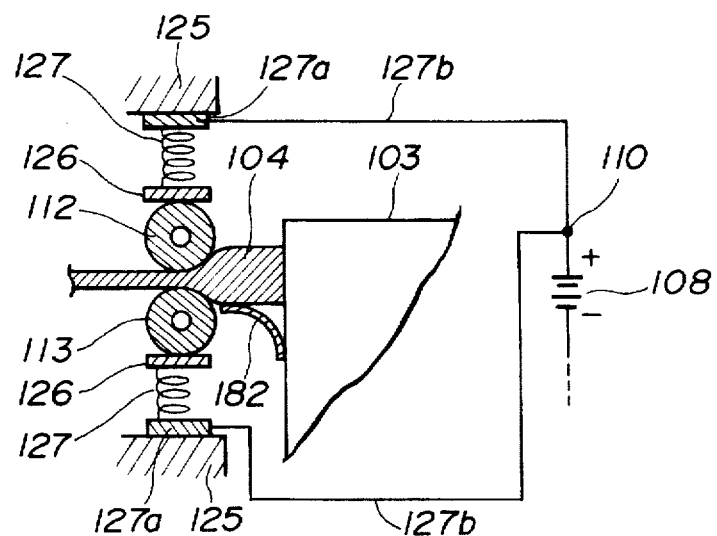
FIG. 51 a cross sectional view which illustrates an essential portion of another modification of the static electricity removing member of the instant camera according to the second embodiment.

FIG. 51 is a cross sectional view which illustrates another modification of the static electricity removing member.

In this modification, electrically conductive members 126 are disposed at positions opposing the nipping portion between the spread rollers 112 and 113 in such a manner that the electrically conductive members 126 respectively are in contact with the spread rollers 112 and 113. The electrically conductive members 126 are pressed against the spread rollers 112 and 113 by the springs 127 that are electrically conductive members. The springs 127 are supported by electrically conductive members 127a secured to insulating portions 125 fixed to the outer surface of the instant camera. Electrically conductive wires 127b extend from the electrically conductive members 127a, the electrically conductive wires 127b having ends that are connected to a plus terminal 110 of the foregoing sheet-type battery 108. Thus, the static electricity flows to the plus terminal 110 of the sheet-type battery 108.

Referring back to FIG. 48, a means for heating the spread rollers of the instant camera according to the second embodiment will now be described.

A heater 121 for heating the spread rollers 112 and 113 is disposed at ends of the rotational shafts of the spread rollers 112 and 113 while being in contact with the same. A temperature measuring circuit 121a for measuring the temperature of the spread rollers 112 and 113 is disposed at the other ends of the spread rollers 112 and 113 while being in contact with the same. The structure of the temperature measuring circuit 121a will be described later.

The foregoing heating means heats the film 104 through the spread rollers 112 and 113 when the temperature is lower than a desired level. The temperature measuring circuit 121a detects the temperature and the heater 121 is controlled so that the developing temperature is made to be a constant temperature level suitable to development. As a result, the progress of the development operation is made to be constant and the thickness of the image formed on the film 104 is made to be constant. By setting the temperature to an optimum level (that is 25° C. in this modification) at which optimum colors can be attained from a color film, color imbalance can be prevented even if the ambient temperature is low.

Figure 52:
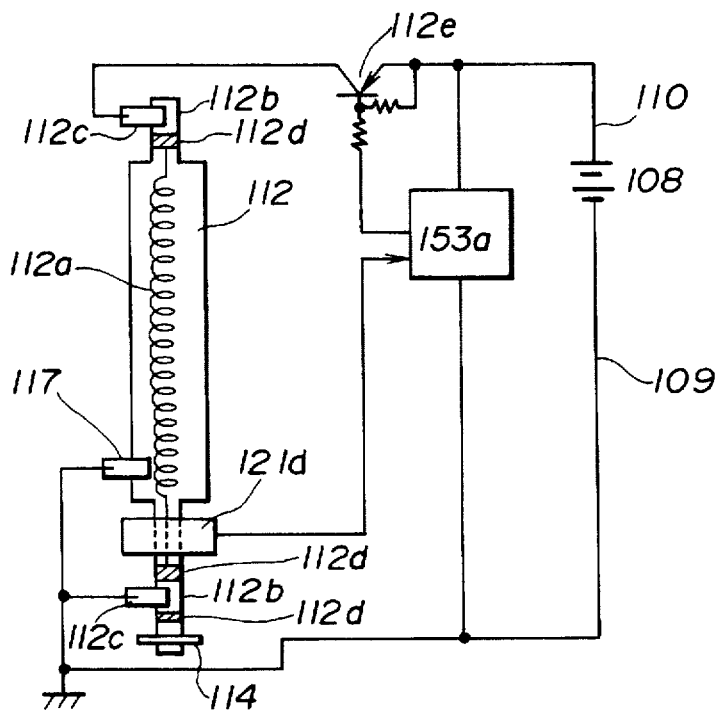
FIG. 52 is an explanatory view which illustrates a modification of a heating means of the instant camera according to the second embodiment.

FIG. 52 illustrates a modification of the heating means.

This modification is characterized in that heaters serving as the heating means are included in the spread rollers 112 and 113, respectively.

The spread rollers 112 and 113 respectively include heaters 112a arranged as shown in FIG. 52. The heaters 112a are insulated from the surfaces of the spread rollers 112 and 113 that are electrically conductive members. The spread rollers 112 and 113 have two ends respectively provided with contact portions 112b to which the terminals of the heaters 112a are connected. The insulating portions 112d insulate the contact portions 112b from the surfaces of the spread rollers 112 and 113.

An end of an electricity supply brush 112c is in contact with each of the contact portions 112b. The electricity supply brush 112c of the two electricity supply brushes 112c has another end that is connected in common to the ground level and the minus terminal 109 of the sheet-type battery 108. Another end of the residual electricity supply brush 112c is, through a transistor 112e, connected to the plus terminal 110 of the sheet-type battery 108.

Figure 55:
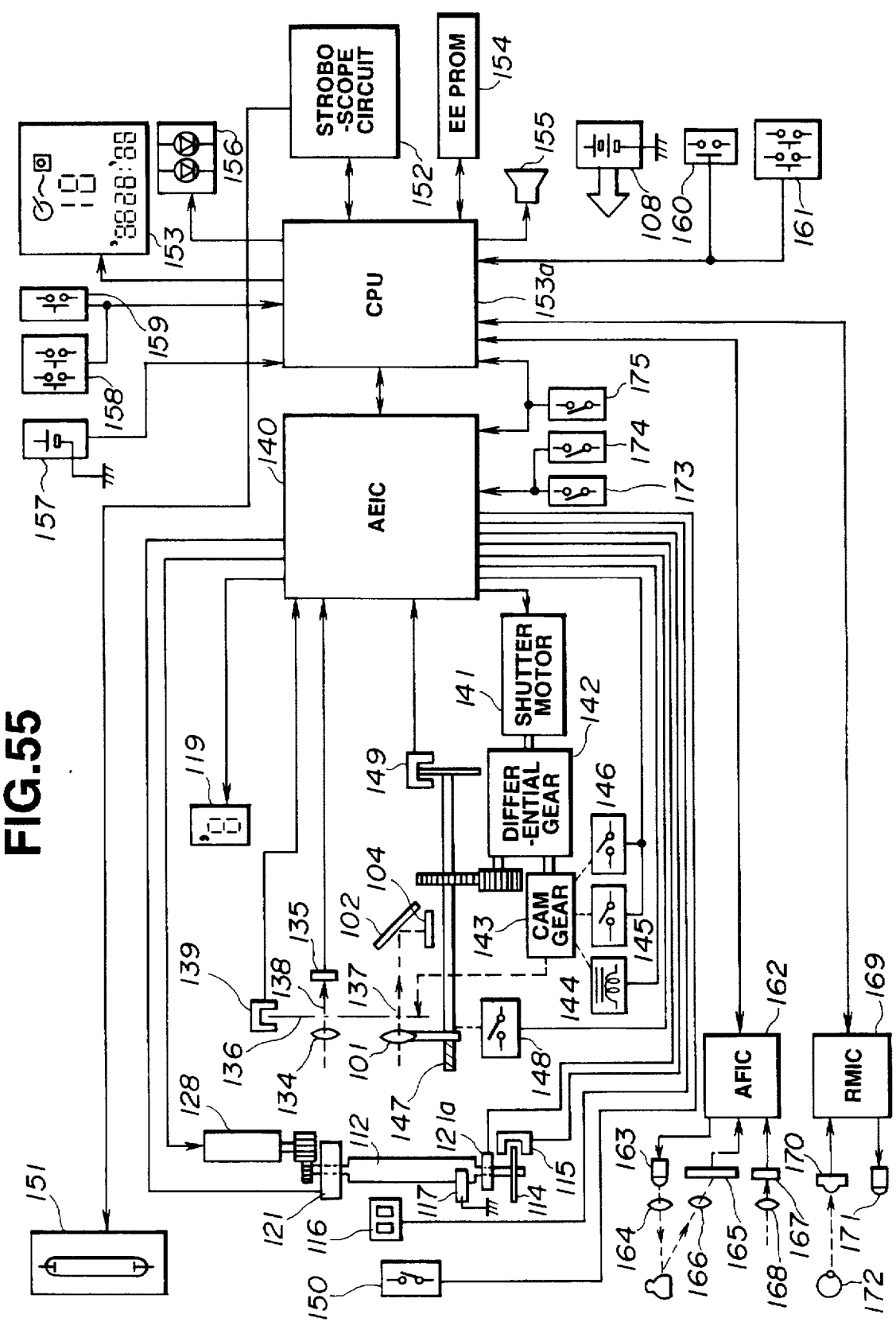
FIG. 55 is a block diagram which illustrates an electric circuit in the instant camera according to the second embodiment.

The transistor 112e is a transistor for turning on/off the supply of electric power to the heater 112a, the transistor 112e being controlled by a CPU 153a (see FIG. 55). Furthermore, the CPU 153a controls the turning on/off of the heater 112a. The spread rollers 112 and 113 are provided with the temperature measuring circuit 121a, the output from the temperature measuring circuit 121a being received by the CPU 153a.

Referring to FIG. 52, reference numeral 117 represents the electricity removing brush that removes static electricity from the spread roller 112. Reference numeral 114 represents the impeller that detects the number of rotations of the spread roller 113.

As described above, the foregoing heating means according to this modification is used in the process in which the CPU 153a initially turns on the transistor 112e so that the heater 112a is heated. Then, the temperature of the surfaces of the spread rollers 112 and 113 is measured by the temperature measuring circuit 121a. In accordance with the result of the measurement, the CPU 153a controls turning on/off of the transistor 112e. Thus, the temperature of the surfaces of the spread rollers 112 and 113 can be maintained at a constant level.

Figure 53:
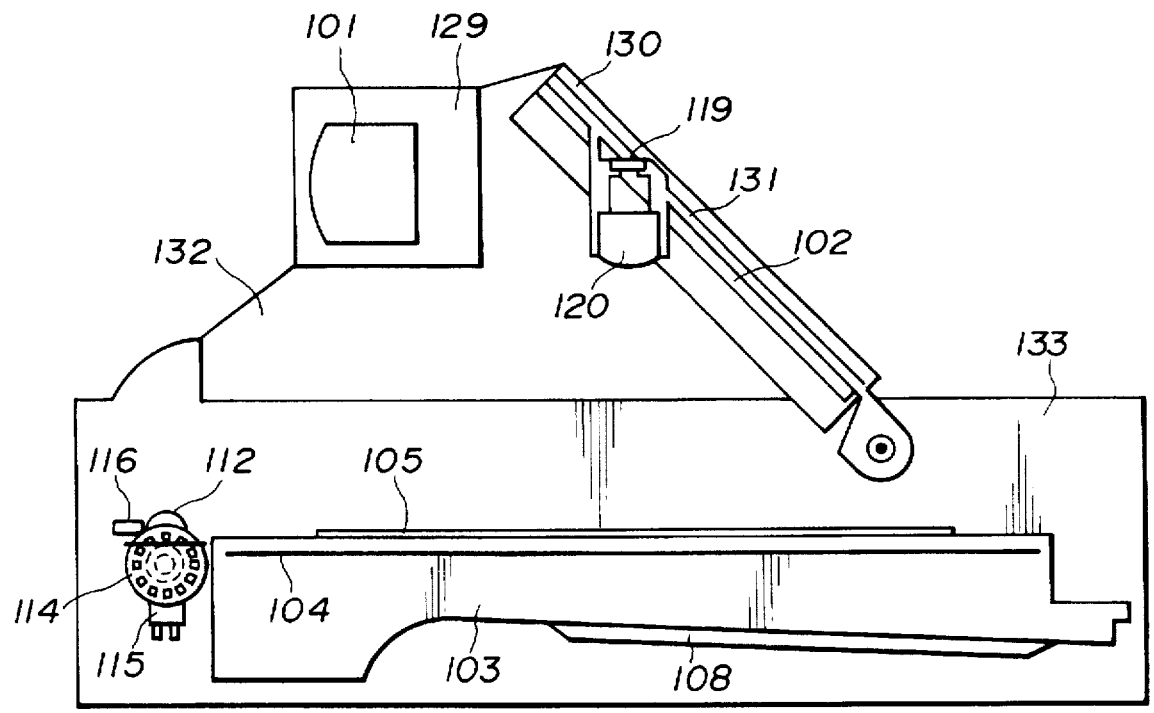
FIG. 53 is a bottom view which illustrates the external shape and the internal structure of the instant camera according to the second embodiment in a photographing state.

FIG. 53 is a bottom view which illustrates the external shape and the internal structure of the instant camera according to the second embodiment of the present invention in a photographing state.

As shown in FIG. 53, the photographing lens group 101 is included in a shutter unit 129. The mirror 102 is covered with a mirror portion cover 130. A member 131 for receiving a date imprinting portion, which consists of the mirror 102, the date imprinting LED 119 and the converging lens 120, is integrally disposed on the side of the mirror 102. Referring to FIG. 53, reference numeral 132 represents a light shielding rubber for preventing light leakage from the side portion of the mirror 102. Reference numeral 133 represents a camera body.

The instant camera according to this embodiment has the arrangement that the date imprinting portion is disposed adjacent to the side end of the mirror 102. Therefore, their receiving portions can be integrated and, thus, the cost can be reduced.

Figure 54:
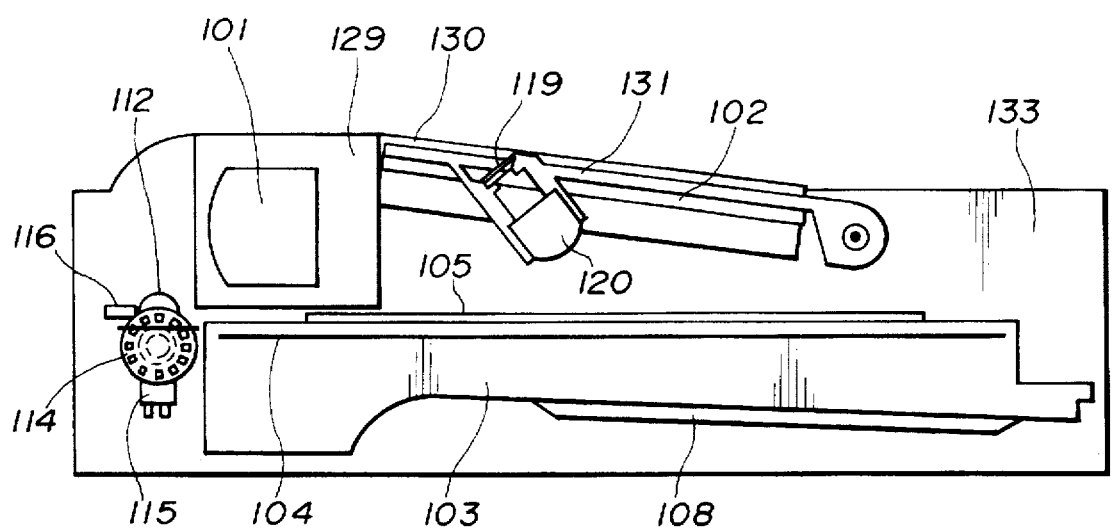
FIG. 54 is a bottom view which illustrates the external shape and the internal structure of the instant camera according to the second embodiment in a state where the optical-system block is accommodated in the camera body.

FIG. 54 is a bottom view which illustrates the external shape and the internal structure of the instant camera shown in FIG. 53 in a state where the optical-system block, that is, the shutter unit 129, the mirror 102, the date imprinting portion and their support members are accommodated in the camera body 133.

The instant camera according to this embodiment is folded as shown in FIG. 54 when it is carried or stored. When a picture is taken, the foregoing optical-system block is moved upwards to the photography standby position to perform photography.

FIG. 55 is a block diagram which illustrates the electric circuit 111 (see FIG. 48) of the instant camera according to the second embodiment. Referring to FIG. 55, the elements that have been described are given the same reference numerals and their descriptions are omitted here.

The instant camera according to this embodiment comprises an external-light-type direct photometry sensor 135, a lens 134 for the external-light-type direct photometry sensor 135, a shutter 136, a main aperture 137 for the shutter 136, a sub-diaphragm 138 for the external-light-type direct photometry sensor 135, and a photointerrupter (a shutter PI) 139 for detecting the movement of the shutter 136. The outputs from the direct photometry sensor 135 and the shutter PI 139 are arranged to be received by an AEIC 140 which is a control portion to be described later.

The AEIC 140 is the control portion for operating and/or controlling photometry and a variety of actuators, such as a shutter motor 141. The shutter motor 141 is a motor for moving forwards/rearwards a lens for focusing and is controlled by the AEIC 140. The output from the shutter motor 141 is, by a differential gear 142, switched between a lens drive mode and a shutter drive mode.

Either output from the differential gear 142 rotates a cam gear 143 for opening/closing the shutter 136. The cam gear 143 includes a shutter magnet (a shutter Mg) 144, a magnet switch (MGSW) 145 and a cam gear initial position switch (CISW) 146. The shutter magnet 144, in cooperation with the movement of the cam gear 143, opens/closes the shutter 136 and to control switching of the differential gear 142, the shutter magnet 144 being controlled by the AEIC 140. The magnet switch 145 and the cam gear initial position switch 146 are switches for detecting the status of the cam gear 143. The result of the detection is received by the AEIC 140.

Another output from the differential gear 142 drives a feeding screw 147 for moving forwards/rearwards the photographing lens. When the feeding screw 147 is rotated forwards (when the shutter motor 141 is rotated forwards), the photographing lens group 101 is moved forwards. When the feeding screw 147 is rotated reversely (when the shutter motor 141 is rotated reversely), the photographing lens group 101 is moved rearwards. The amount of the movement of the photographing lens group 101 is detected by a lens initial position switch (LISW) 148 and an automatic focusing photointerrupter (AFPI) 149 for detecting the amount of rotation of the feeding screw 147. The outputs from the lens initial position switch 148 and the automatic focusing photointerrupter 149 are received by the AEIC 140.

The AEIC 140 rotates the spread motor 128 to rotate the spread roller 112 and controls the operation for opening (the operation for shifting the state from the state shown in FIG. 54 to the state shown in FIG. 53) the instant camera. Furthermore, AEIC 140 operates the heater 121 to control heating of the spread roller 112. Note that a signal transmitted by the temperature measuring circuit 121a is supplied to the AEIC 140 so that heating of the spread rollers 112 and 113 is controlled. The data imprinting LED 119 composed of an LED for displaying one-digit figure is connected to the AEIC 140 so that the AEIC 140 controls the data imprinting LED 119.

The AEIC 140 receives signals transmitted by a variety of switches and the like. For example, a signal transmitted by a door latch switch (DLSW) 150 for detecting whether or not a latch of a door for loading/unloading the film pack 103 has been set is supplied to the AEIC 140.

Furthermore, signals transmitted by the photoreflector 116 for detecting the leading portion of the film 104, which is being discharged, and the spread photointerrupter 115 for detecting the rotations of the spread rollers 112 and 113 and the like are supplied to the AEIC 140. Referring to FIG. 55, reference numeral 117 represents an electricity removing brush for causing static electricity of the spread roller 112 to escape to the ground level. Reference numeral 114 represents the impeller attached to the rotational shaft of the spread roller 112.

The instant camera according to the second embodiment comprises a stroboscope light emitting portion 151 that is operated by a stroboscope circuit 152 which is controlled by the CPU 153a. The CPU 153a is a controller that totally controls all of the functions of the instant camera, the CPU 153a controlling the AEIC 140, the stroboscope circuit 152 and an LCD 153 and receiving signals supplied by the various switches. The LCD 153 displays the remote control mode or the self-control mode, the residual number of films, date and the like.

An EEPROM 154 storing, for example, photometry adjustment values and the like is connected to the CPU 153a. A buzzer 155 is connected to the CPU 153a so as to issue an alarm sound when no film is left. An LED 156 disposed adjacently to the finder is connected to the CPU 153a to display that electricity charging is being performed, charging has been completed, AF locking is set and the like.

Although the CPU 153a is usually operated by the sheet-type battery 108, a coin-type battery 157 for date backup supplies electric power to the CPU 153a in a case where the power supply to the instant camera is stopped. A push button switch array 158 for switching data display mode and modify the date and a push button 159 for performing switching between the remote control mode and the self-control mode are connected to the CPU 153a. Thus, signals transmitted from the foregoing push buttons 158 and 159 are supplied to the CPU 153a.

Furthermore, a power supply switch 160 is connected to the CPU 153a. When the power supply switch 160 is switched on, the instant camera is operated under total control of the CPU 153a so that the state in which the instant camera is folded (see FIG. 54) is shifted to the opened state (see FIG. 53). The foregoing camera opening operation is performed by reversely rotating the SP motor 128. The stoppage of the power supply is performed by manually folding the optical-system block of the instant camera.

A release button 161 having first and second release switches (1R/2RSW) is connected to the CPU 153a. When the first release switch is switched on, a range finding operation is performed by an AFIC 162 to be described later. When the second release switch is then switched on, the shutter 136 is opened.

The AFIC 162 is a control circuit for performing the range finding and previous photometry operation, the AFIC 162 being arranged to, under control of the CPU 153a, operate an infrared-ray emitting LED 163 for actively finding the range with infrared rays. Infrared rays emitted by the infrared-ray emitting LED 163 are used to irradiate a subject through a light emitting lens 164. Light reflected by the subject is received by a light-receiving PSD 165 through a light-receiving lens 166. Light of the subject made incident at another timing through a previous photometry lens 168 is supplied to a previous photometric sensor 167. An output from the previous photometric sensor 167 is supplied to the AFIC 162.

A remote control IC (RMIC) 169 is connected to the CPU 153a to receive a signal transmitted by a remote control sensor 170. The remote control IC 169 is arranged to operate a remote control/self-control LED 171. Referring to FIG. 55, reference numeral 172 represents a remote control beam transmitter individually provided from the camera body, a remote controlling beam emitted by the remote control beam transmitter 172 being received by the remote control sensor 170.

Furthermore, the AEIC 140 receives signals supplied by an upper cover latch switch (ULSW) 173, a camera open switch (COSW) 174 and an ISO sensitivity switch (ISOSW) 175 for detecting the ISO sensitivity of the film. The upper cover latch switch (ULSW) 173 detects a moment the camera has been completely opened. The camera open switch (COSW) 174 detects a moment the camera opening operation has started. The signal transmitted by the ISO sensitivity switch 175 is supplied to the CPU 153a as well as the AEIC 140.

Figure 56:
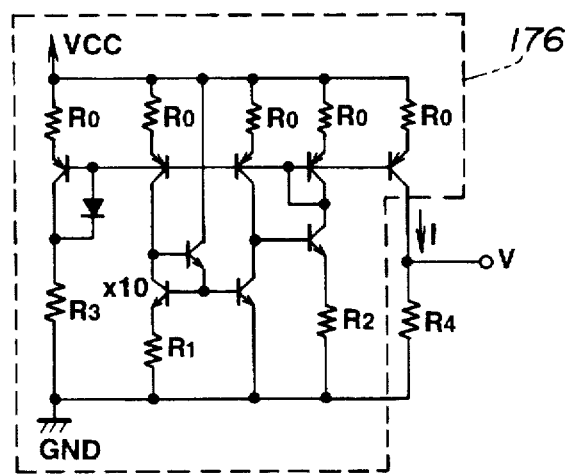
FIG. 56 is an electric circuit diagram which further illustrates the temperature measuring circuit of the instant camera according to the second embodiment.

FIG. 56 is an electric circuit diagram which illustrates the temperature measuring circuit 121a further in detail.

The temperature measuring circuit 121a has a reference electric current power supply circuit to convert, with resistor R4, output electric current I from the reference electric current power supply circuit into voltage V so as to transmit the voltage V.

Assuming that the Boltzmann's constant is k, the absolute temperature is T and the electric charge of an electron is q, the output electric current I is expressed by the following equation:

$$I=(kT\times ln10)/qR1$$

As described above, the output current I flows into the resistor R4 so that the output voltage V is made to be in proportion to the absolute temperature T as follows:

$$V=R4\times I=(R4\times kTln10)/qR1.$$

In the temperature measuring circuit 121a, the output voltage V is converted into a digital value by an analog/digital converter included in the AEIC 140; and the quantity of exposure is corrected or the spread rollers 112 and 113 are heated by the heater in accordance with the foregoing digital value. Thus, an influence of the developing temperature is canceled.

Figure 57:
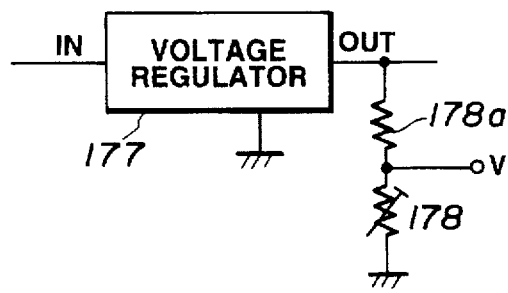
FIG. 57 is an electric circuit diagram which illustrates a modification of the temperature measuring circuit of the instant camera according to the second embodiment.

FIG. 57 is an electric circuit diagram which illustrates a modification of the temperature measuring circuit 121a.

In this modification, a voltage regulator 177 transmits a constant voltage. A fixed resistor 178a and a thermistor 178, which has a resistance value that is changed due to the ambient temperature, are connected in series to the output terminal of the voltage regulator 177. As a result, the upper end voltage V of the thermistor 178 is changed depending upon the temperature.

Figure 58:
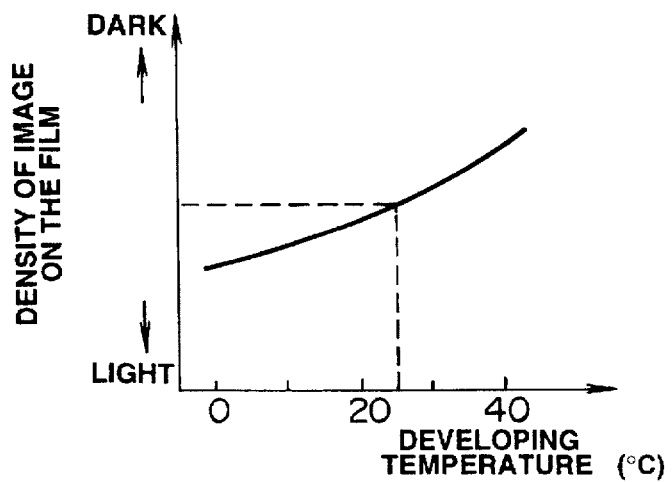
FIG. 58 is a graph showing the relationship between the developing temperature and the thickness of an image of the film realized in the developing temperature compensating unit of the instant camera according to the second embodiment.

FIG. 58 is a graph showing the relationship between the developing temperature set by the developing temperature compensating unit of the foregoing instant camera and the thickness of an image formed on the film.

As shown in FIG. 58, the developing temperature compensating unit causes the development operation to proceed in proportion to the temperature and thicken the density. At this time, the quantity of exposure is corrected in accordance with the temperature or the developing temperature is made to be constant by performing a heating operation if the temperature is too low in order to make constant the thickness of the image on the film. Although the color imbalance sometimes takes place due to the temperature in a case where a color film is used, the foregoing problem can be prevented by raising the temperature to an adequate level for realizing an optimum color balance by heating.

Figure 59:
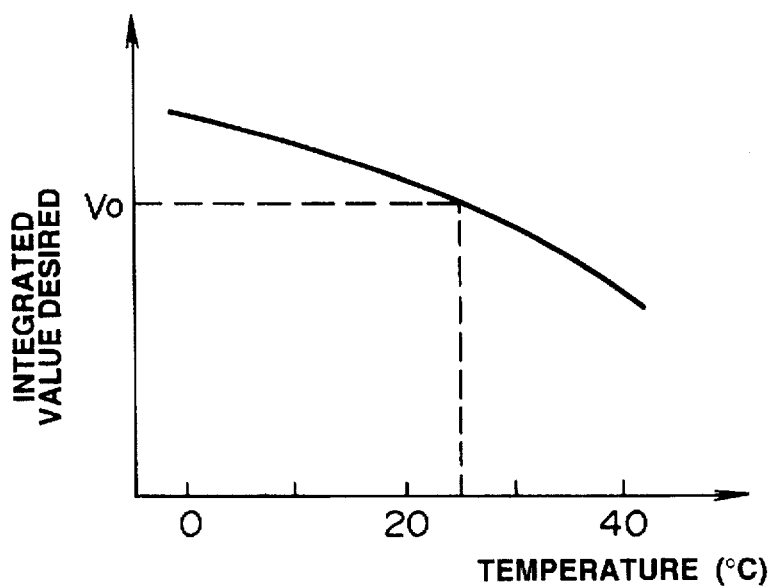
FIG. 59 is a graph showing the relationship between the temperature level, which is the output from the temperature measuring circuit, and a desired integrated value in the direction photometry realized in the developing temperature compensating unit of the instant camera according to the second embodiment.

FIG. 59 is a graph showing the relationship between the temperature, which is an output from the temperature measuring circuit 121a of the developing temperature compensating unit of the foregoing instant camera, and a desired integrated value in the direct photometry to be performed in the same.

As shown in FIG. 59, the developing temperature compensating unit controls the desired integrated value to be reduced in inverse proportion to the temperature if the temperature has not been corrected completely by the foregoing heating operation so as to make constant the thickness of the image on the film.

Figure 60:
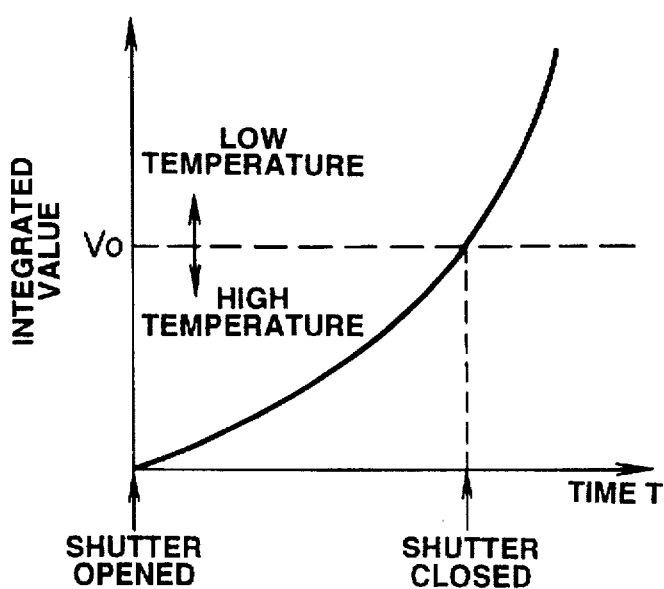
FIG. 60 is a graph showing the relationship between the integrated value during exposure and the desired integrated value to be realized in the developing temperature compensating unit of the instant camera according to the second embodiment.

FIG. 60 is a graph showing the relationship between integrated values during the exposure operation and desired integrated value V0 to be realized by the developing temperature compensating unit.

As shown in FIG. 60, the developing temperature compensating unit closes the shutter when the integrated value reaches the desired integrated value V0. The desired integrated value V0 is changed in accordance with the temperature.

Figure 61:
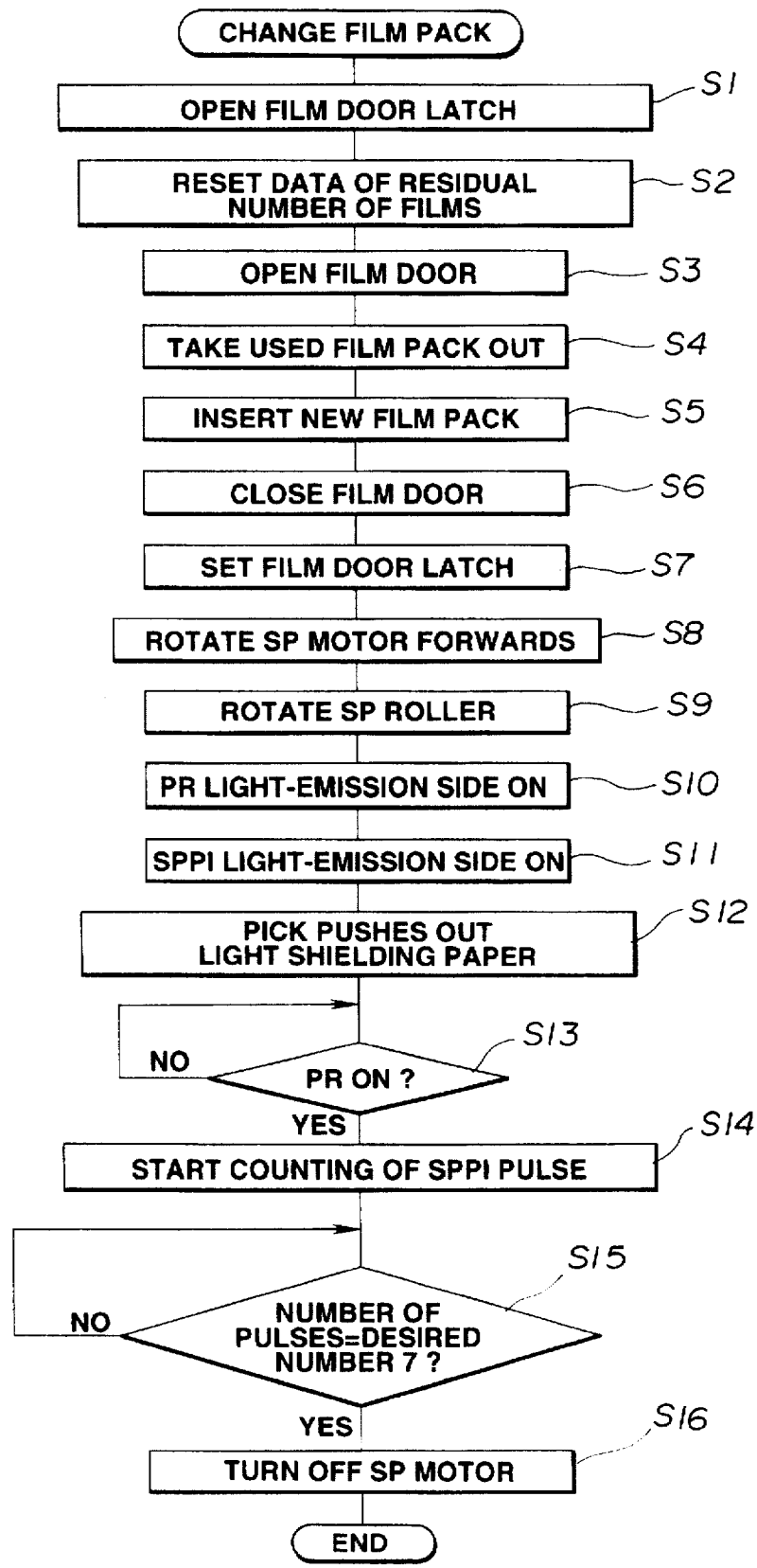
FIG. 61 is a flow chart showing the operation of the instant camera according to the second embodiment.

The operation of the instant camera according to the second embodiment of the present invention will now be described with reference to flow charts shown in FIGS. 61 to 63.

Referring to the flow chart shown in FIG. 61, the operation to be performed when the film pack 103 (see FIGS. 53 and 54) is changed will now be described.

In this embodiment, ten film sheets 104 are accommodated in one film pack 103 and one light shielding paper sheet is placed on the uppermost film 104. In step S1 the latch of a film door for introducing/discharging the film pack 103 is released by a photographer. The moment the latch has been released can be detected by the door latch switch (DLSW) 150 (see FIG. 55). In a period in which the latch is being released, the film feeding and photographing operations are inhibited. In step S2 data of the residual films to be displayed on the LCD 153 is reset to ten.

In step S3 the photographer opens the film door, and in step S4 the used film pack 103 is discharged. In step S5, a new film pack 103 is inserted, and in step S6 the film door is closed. Thus, the latch of the film door is set in step S7.

The moment the latch has been set is detected by the door latch switch (DLSW) 150, and in step S8 the spread motor (the SP motor) 128 is turned on so as to be rotated forwards.

When the spread motor 128 is being rotated forwards, the rotating force of the spread motor 128 is transmitted to a member, called a "pick", for pushing outwards the film 104 or the light shielding paper placed at the uppermost position in the film pack 103. Therefore, the spread rollers 112 and 113 are rotated in step S9.

In step S10 the light emission section of the photoreflector (PR) 116 for detecting the leading portion of the film 104 or the light shielding paper which is being discharged is turned on. In step S11 the light emission section of the spread photointerrupter (SPPI) 115 for detecting the quantity of the rotation of the spread roller 112 is turned on. In step S12 the foregoing pick pushes outwards the light shielding paper positioned at the uppermost position in the film pack 103. The leading portion of the light shielding paper that has been pushed outwards then reaches the nipping portion between the spread rollers 112 and 113 which have started rotation, thus resulting in that it is introduced between the spread rollers 112 and 113 disposed vertically. Then, the light shielding paper is discharged due to the rotation of the spread rollers 112 and 113.

In step S13 a moment the leading portion of the light shielding paper reaches the position of the photoreflector 116 and activation of the photoreflector 116 are waited for. When the photoreflector 116 has been activated, the foregoing position is used as a reference position and counting of pulse signals transmitted by the spread photointerrupter 115 is started in step S14.

In step S15 the moment the result of counting of the pulse signals reaches a "desired value of 7" is waited for. The "desired value of 7" corresponds to a position at which the rear end portion of the film 104 or the light shielding paper is separated from the spread rollers 112 and 113 due to the complete discharge of the film 104 or the light shielding paper. If the result of counting has reached the "desired value of 7" in step S15, it means that the discharge of the light shielding paper has been completed. Therefore, the spread motor 128 is turned off in step S16, and thus the operation for changing the film pack 103 is completed.

The operation to be performed when a picture is taken will now be described with reference to the flow chart shown in FIGS. 62 and 63.

Figure 62:
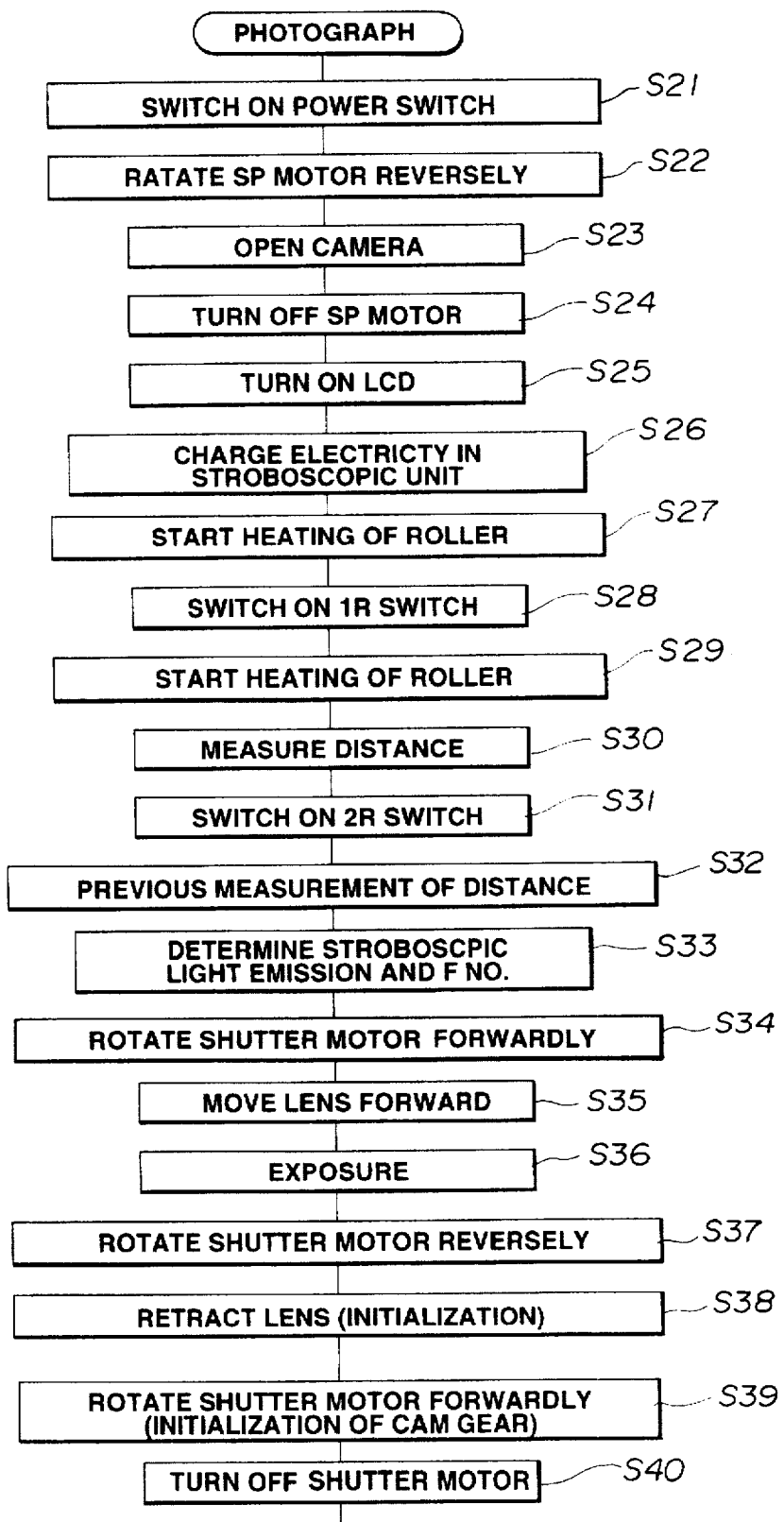
FIG. 62 is a flow chart which illustrates the operation of the instant camera according to the second embodiment.

In Steps S21 to S27 in the flow chart shown in FIG. 62, operations to be performed when the power source is turned on are performed. When the power supply switch 160 (see FIG. 55) is switched on in step S21 in a state where the instant camera is in the folded state (in the state shown in FIG. 54), the CPU 153a is activated so as to reversely rotate the spread motor 128 in step S22. Since the reverse rotational force of the spread motor 128 is transmitted to the member for opening the instant camera, the instant camera is opened in step S23. The moment the camera opening operation has been completed (the state shown in FIG. 53) is detected by the upper cover latch switch (ULSW) 173. Thus, the spread motor 128 is turned off in step S24.

In step S25 the LCD 153 is turned on to display the number of the residual films and the date. In step S26 electric power is charged into a main capacitor for the stroboscope unit to enable the stroboscope unit to emit light.

In step S27 the output from the temperature measuring circuit 121a is used to discriminate whether or not the temperature of the surfaces of the spread rollers 112 and 113 is 25° C. or lower. If it is 25° C. or lower, heating of the spread rollers 112 and 113 is commenced by turning the heater 121 on. The temperature measuring circuit 121a continues monitoring of the surface temperature of the spread rollers 112 and 113 to maintain the temperature at a level not lower than 25° C.

If the surface temperature is 25° C. or higher, heating is not performed. In the case where the heating operation is performed, the operation of the heater 121 for heating the spread rollers 112 and 113 is stopped if no operation of the instant camera has been performed for 30 seconds after the power supply because a great electric power is consumed to operate the heater 121. The foregoing heating operation can be restarted by switching on the first release switch of the release button 161.

Another example having a heating sequence, which is capable of further reducing the electric power consumption, will now be described.

If the temperature of the surfaces of the spread rollers 112 and 113, that is, the ambient temperature, is 25° C. or lower, the spread rollers 112 and 113 are heated similarly to the foregoing sequence. However, the heating operation is, in this sequence, started by only switching on the first release switch. After the heating operation has been started, the fact heating is being performed is displayed in the vicinity of the finder and on the LCD 153.

Figure 64:
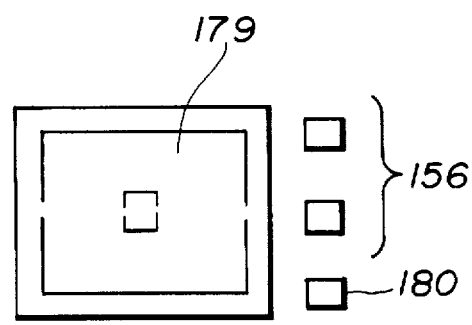
FIG. 64 is a front view which illustrates an example of display adjacent to a finder of an example of the instant camera according to the second embodiment that has a heating sequence which is capable of further reducing the electric power consumption.

FIG. 64 is a front view which illustrates an example of the display performed in the vicinity of the finder that is adaptable to the foregoing sequence.

Referring to FIG. 64, reference numeral 179 represents a finder, 156 represents an LED for displaying information about the stroboscope unit and automatic focusing, and 180 represents a red LED for displaying that the spread rollers 112 and 113 are being heated.

Figure 65:
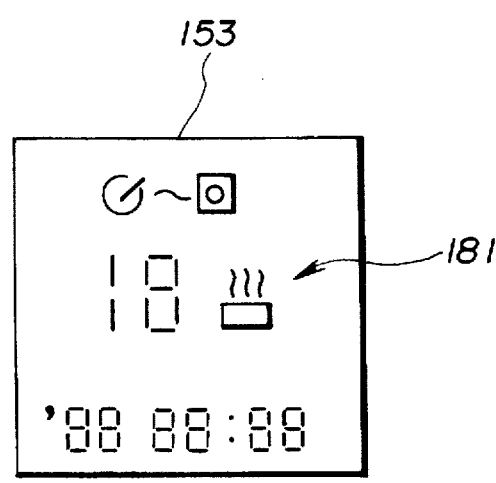
FIG. 65 is a front view which illustrates an example of display on an LCD of another example of the instant camera according to the second embodiment that has a heating sequence which is capable of further reducing the electric power consumption.

FIG. 65 is a front view which illustrates an example of display made on the LCD adaptable to the foregoing sequence.

Referring to FIG. 65, reference numeral 153 represents the LCD for the instant camera, and 181 represents a display indicating that heating is being performed. In this example, two modes are provided that consist of a mode which inhibits photography until the temperature of the surfaces of the spread rollers 112 and 113 is raised to an adequate level after heating has been commenced; and a mode which does not inhibit the photography. If the display is made which indicates that heating is being performed when the first release switch is switched on, a photographer who intends to prevent color imbalance and deterioration in the image quality, such as lowering of contrast, in a case where a color film is used is able to employ the mode which inhibits the photography during the heating operation and perform the photography after the display indicating heating is being performed is turned off. Thus, the foregoing deterioration in the image quality can be prevented.

In a case where obtaining of a good moment is given priority at the time of the photography, the mode which does not inhibit the photography may be employed to enable the photography to be performed immediately. At this time, correction is performed by the foregoing method of correcting the quantity of exposure. After the photography has been completed, the heating operation is ended (the heater is turned off).

Another example having a heating sequence, which is capable of further reducing the electric power consumption, will now be described.

This example is characterized in that a moment that a photographer holds the instant camera is detected and the heating operation is commenced. That is, a pressure sensitive switch is disposed on the grip of the instant camera to detect whether or not the grip is gripped. If the facts the camera is in the opened state and the grip has been gripped have been detected in accordance with the state of the pressure sensitive switch, the heating operation is commenced. If the fact that the camera has been closed or the hand has removed from the grip, that is, if the pressure sensitive switch has been switched off, the heating operation is ended.

Referring back to the flow chart shown in FIG. 62, steps S28 to S58 in this flow chart show the operations to be performed when one picture is taken. That is, when the release button 161 is depressed with a light pressure and reaches a first depression stage, the 1RSW (the first release switch) is switched on in step S28. In step S29 the heating operation is restarted if 30 seconds have passed and heating is required. In step S30 the range is found by the AFIC 162, the light emitting LED 163 and the PSD 165.

When the release button 161 has been further depressed to reach the second depression stage, the 2RSW (the second release switch) is switched on in step S31. In step S32 previous photometry is performed by the previous photometric sensor 167.

Since data of the distance from the subject and data of brightness of the subject have been obtained due to the foregoing operations, a reference to a table stored in the CPU 153a is made in step S33 so that the F-number for the stroboscope mode is determined.

Figure 66:
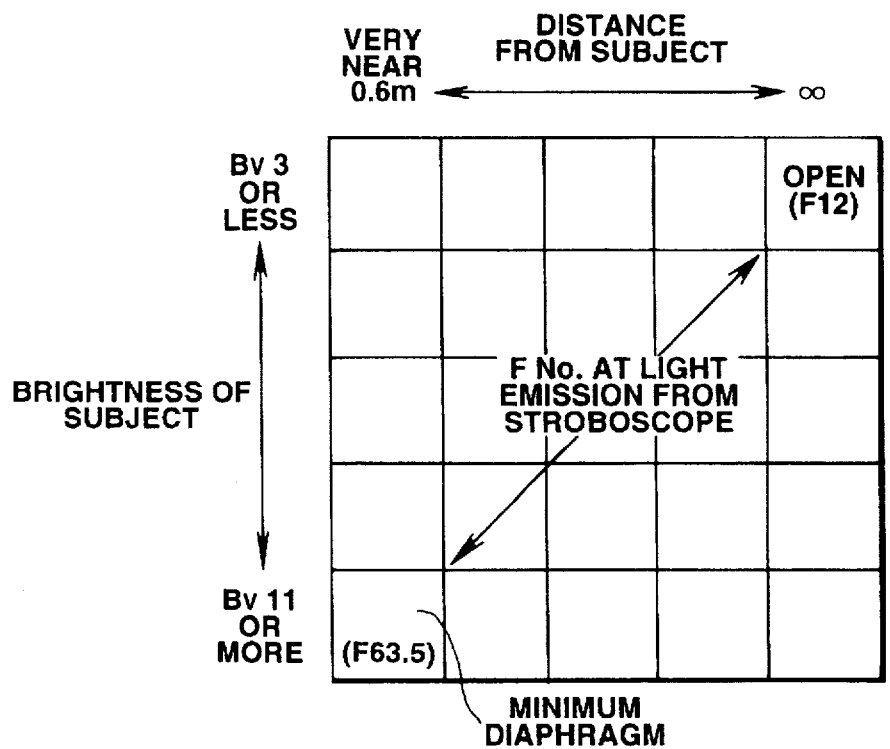
FIG. 66 is a graph showing an exposure control table possessed by a CPU of the instant camera according to the second embodiment.

FIG. 66 illustrates a table possessed by the CPU 153a of the instant camera to which an information imprinting unit for the instant camera according to this embodiment is applied, the table being used to control exposure.

Figure 67:
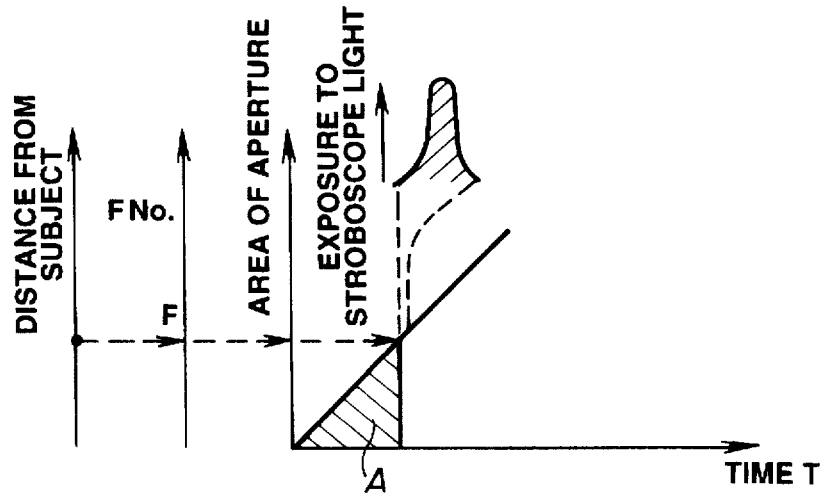
FIG. 67 is a graph showing determination of F-number at the time of the stroboscope light emission by combining data of the brightness of a subject obtained by previous photometry and data of the distance to the subject obtained by range finding.

A conventional flashmatic method encounters overexposure by a degree corresponding to portion A in the waveform of the aperture as shown in FIG. 67. With the table shown in FIG. 66, the data of the brightness of the subject obtained by the previous range finding operation and the data of the distance from the subject obtained by the range finding operation are combined and used to determine the F-number for use in the stroboscope mode. Therefore, the quantity of exposure in the portion A shown in FIG. 67 realized due to natural light can be estimated. Thus, the F-number for use in the stroboscope mode can be enlarged (the diaphragm opening is reduced).

Thus, control can be performed in such a manner that a large quantity of stroboscope light can be emitted (the stroboscope unit is caused to fully emit light) with the small diaphragm opening and an accurate exposure (free from overexposure) is realized. If a large quantity of stroboscope light is emitted with the small diaphragm opening, a major portion of the exposure is performed with the small diaphragm opening. Therefore, the depth of field can be deepened and thus the quality of the photograph can be improved. Since instant cameras cannot correct the photograph by shading that can be employed by 35 mm cameras, excellent accuracy is required in the exposure. The exposure control method according to this embodiment is able to satisfy the foregoing two requirements.

Referring back to the flow chart shown in FIG. 62, the shutter motor 141 (see FIG. 55) is rotated forwards in step S34. As a result, the cam gear 143 is locked and the differential gear 142 rotates forwardly the lens feeding screw 147 so that the photographing lens group 101 is moved forwards in step S35. The quantity of the forward movement of the photographing lens group 101 can be detected by the lens initial position switch 148 and the automatic focusing photointerrupter 149 so that the photographing lens group 101 is moved forwards by a quantity determined in accordance with the data of the distance from the subject.

After the forward movement of the photographing lens group 101 has been completed, locking of the cam gear 143 is suspended by the shutter magnet (the shutter Mg) 144 so that the cam gear 143 is rotated in a predetermined direction. As a result, the rotation of the feeding screw 147 is stopped. The rotation of the cam gear 143 causes exposure to be performed in step S36. That is, the rotation of the cam gear 143 results in that the shutter 136 is operated, causing the main aperture 137 and the sub-diaphragm 138 to be opened in synchronization with each other. The movement of the shutter 136 is detected by the shutter photointerrupter (shutter PI) 139. When the F-number for the stroboscope unit has been realized, the stroboscope light emitting portion 151 emits light.

Simultaneously, light passed through the sub-diaphragm 138 is integrated by the direct integrating photometric sensor 135. When the desired integrated value V0 has been realized, the shutter magnet (the shutter Mg) 144 is turned off to close the shutter 136. Thus, the exposure operation is completed. The desired integrated value V0 is determined in accordance with information of the sensitivity of the film obtained by the ISO sensitivity switch (ISOSW) 175 and information of the temperature obtained by the temperature measuring circuit 121a.

Although the influence of the developing temperature is also corrected by heating the spread rollers 112 and 113, the correction cannot be performed if the temperature is higher than the reference level (which is 25° C. in this embodiment). Even if heating is performed when the temperature is low, the temperature cannot always be raised to the reference level. Therefore, this embodiment has an arrangement that the influence of the difference between the reference temperature and that at the time of the photography occurring due to the foregoing causes is corrected by changing the desired integrated value V0 to change the quantity of exposure.

In step S37, the shutter motor 141 is rotated reversely so that the lens is moved rearwards in step S38 to return the lens to the initial position. The initial position can be detected by the lens initial position switch (LISW) 148. In step S39 the shutter motor 141 is rotated forwards to return the cam gear 143 to the initial position. In step S40 the shutter motor 141 is turned off. The initial state of the cam gear 143 can be detected by the cam gear initial position switch (CISW) 146.

Figure 63:
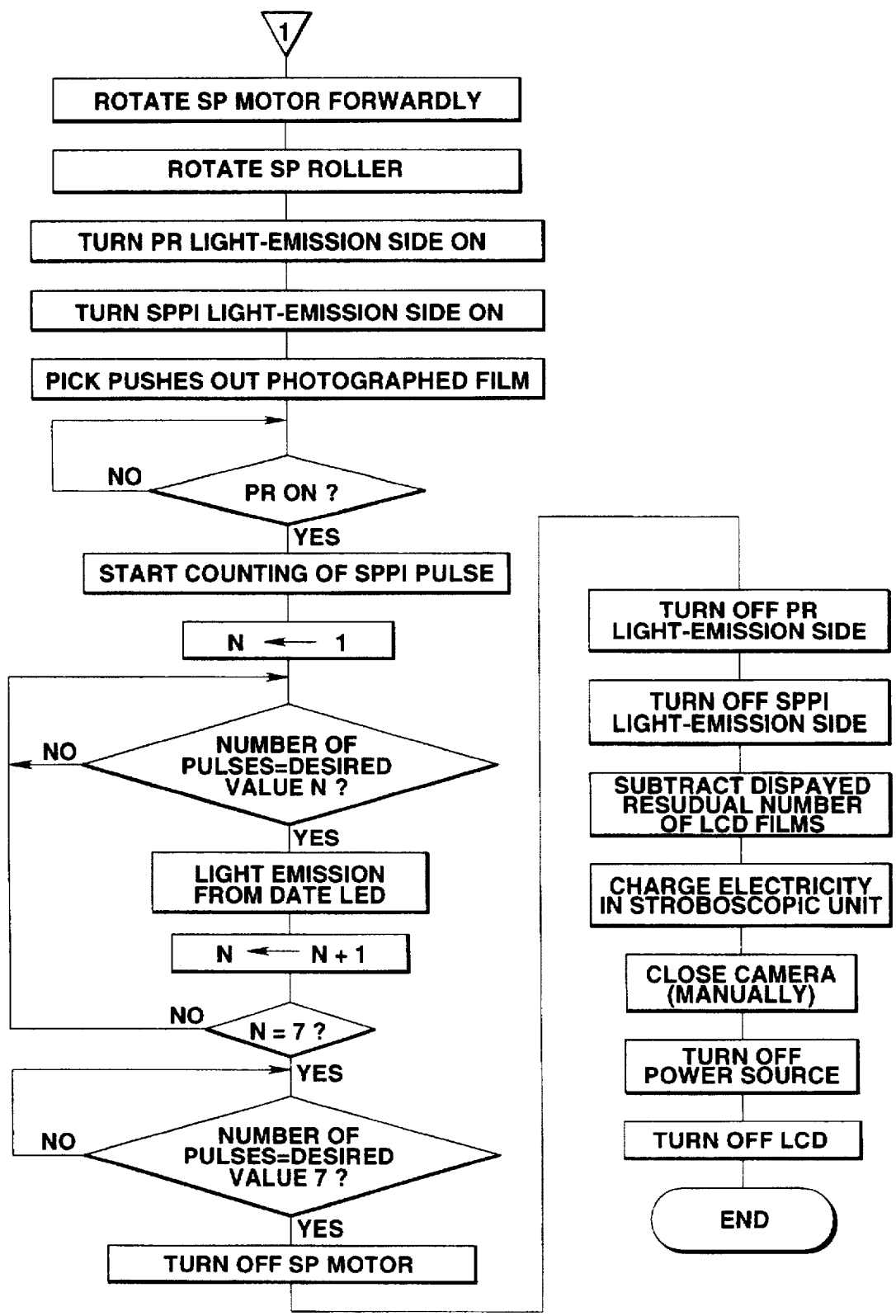
FIG. 63 is a flow chart which illustrates the operation of the instant camera according to the second embodiment.

The operation proceeds in the portion of the flow chart shown in FIG. 63, in which the spread motor 128 is, in step S41, rotated forwards to convey, discharge or develop the photographed film 104. As a result, the spread rollers 112 and 113 start rotating in step S42 so that the film 104 is conveyed while being pressed by the spread rollers 112 and 113. Thus, the developer is dispersed and the developing operation is commenced.

The instant camera according to this embodiment has an arrangement that, if the ambient temperature is low and therefore the spread rollers 112 and 113 are heated, that is, if the temperature of the surfaces of the spread rollers 112 and 113 are maintained at a predetermined level by turning on/off the heater 121, the rotational speed of the spread motor 128 is lowered to lower the speed at which the film 104 is conveyed.

As a result, a problem of an unsatisfactory heat conductivity can be overcome, the problem occurring due to the small area of contact between the rollers and the film and experienced with the conventional method in which the film is passed through the spread rollers so as to be heated. That is, the film conveyance speed is lowered to lengthen the time in which the spread rollers 112 and 113 and the film 104 are in contact with each other. Thus, the heat of the spread rollers 112 and 113 can be transmitted easily and therefore the temperature correction effect can be improved.

Another example of the temperature correction will now be described.

Figure 68:
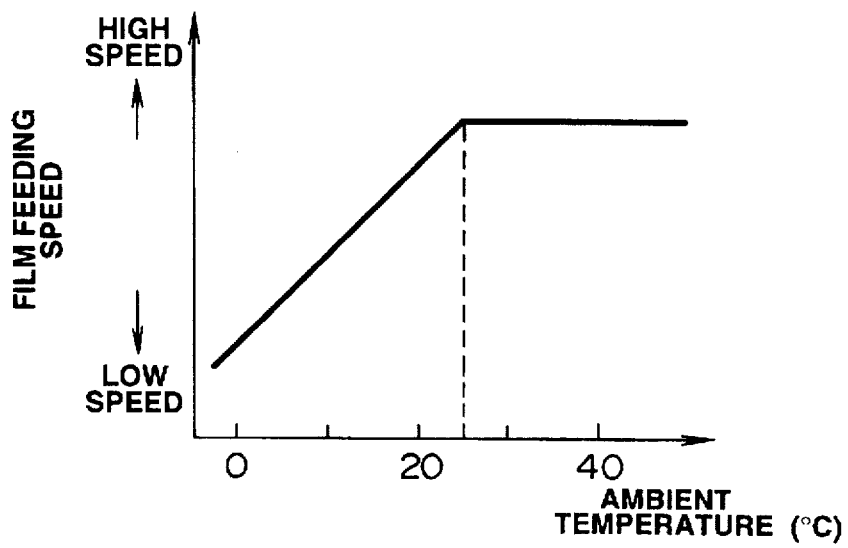
FIG. 68 is a graph showing a modification relating to the temperature correction to be performed in the developing temperature compensating unit of the instant camera according to the second embodiment.

This example is characterized in that a second temperature sensor for measuring the ambient temperature is provided individually from the sensor for measuring the temperature of the surfaces of the spread rollers 112 and 113. This example has an arrangement that the speed, at which the film 104 is conveyed, is controlled in accordance with the ambient temperature as can be understood from a characteristic graph shown in FIG. 68.

Referring back to the flow chart shown in FIG. 63, the light emitting section of the photoreflector 116 is turned on in step S43 similarly to the case where the light shielding paper is discharged. In step S44 the light emitting section of the spread photointerrupter 115 is turned on. In step S45 the pick is operated by the rotating force of the spread motor 128 so that one photographed film 104 is pushed outwards from the film pack 103. The film 104, that has been pushed outwards, is introduced between the spread rollers 112 and 113 which are being rotated so as to be pressed, the film 104 being then discharged while being pressed. In step S46 the leading portion of the film 104 reaches the position of the photoreflector 116 and a moment the photoreflector 116 is turned on is waited for. When the photoreflector 116 has been turned on (when the initial position has been detected), pulse signals transmitted by the spread photointerrupter 115 are counted in step S47.

Figure 69:
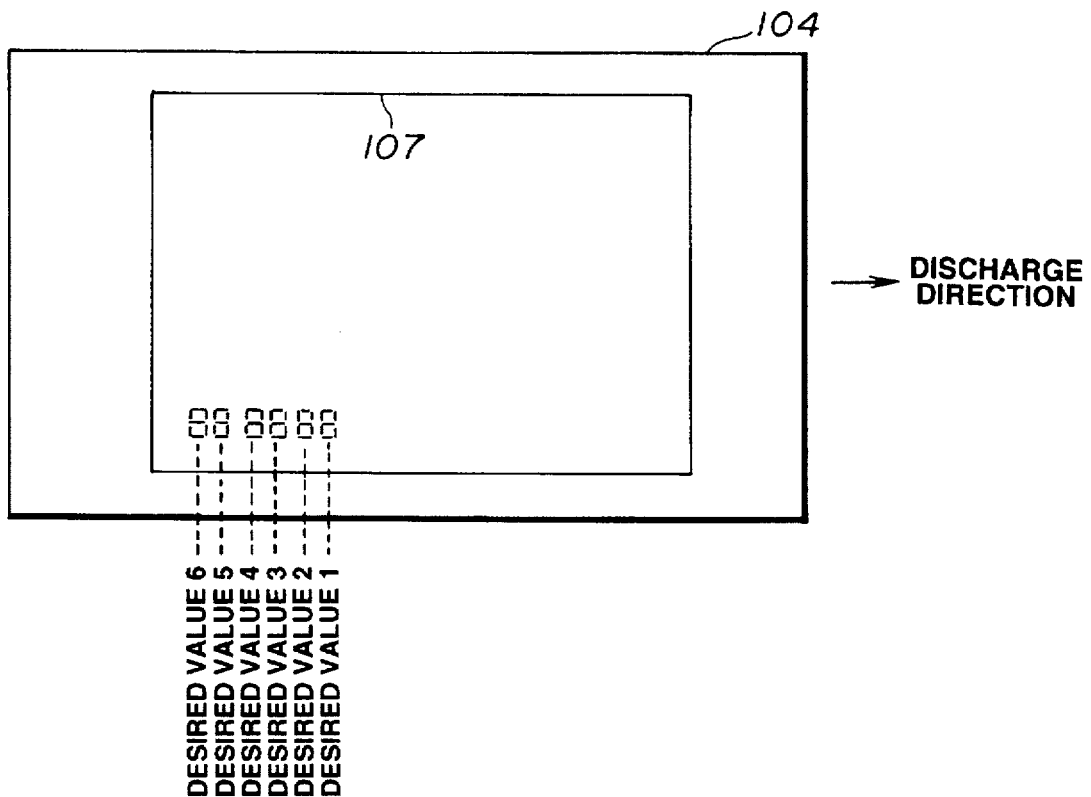
FIG. 69 is a front view which illustrates a photographed image surface of a film of the instant camera according to the second embodiment while showing desired values to which pulse signals transmitted by a spread photointerrupter correspond.

In steps S48 to S52 date is imprinted during the conveyance of the film in such a manner that six times of imprinting operations are performed because the required numerals are imprinted one by one. The date imprinting LED 119 is an LED of a type that displays one digit numeral as shown in FIG. 55. In step S48 the memory "N" in the CPU 153a is made such that N=1. In step S49 a moment the result of counting of the pulse signals supplied by the spread photointerrupter 115 is made to be a desired value of 1 (because N=1) is waited for. The desired values 1 to 6 correspond to the respective position in the photographing surface of the film 104 shown in FIG. 69.

When the film 104 has been conveyed to the imprinting position and the result of counting has been made to be the desired value of 1, the date imprinting LED 119 is caused to emit light in step S50 so that the first digit figure is imprinted. The time in which light is emitted is determined in accordance with information supplied by the ISO sensitivity switch (ISOSW) 175.

In step S51, one is added to N (thus, equation N=2 is realized). If equation N=7 is not satisfied in step S52, the operation returns to step S49. Then, the second digit to the sixth digit are imprinted similarly to the operation for imprinting the first digit. If imprinting of the sixth digit has been completed in step S50, the equation N=7 is realized in step S51. Therefore, the operation proceeds to step S53 after the operation in step S52 has been performed.

In step S53 a moment the number of pulses supplied by the spread photointerrupter 115 is made to be the desired value of seven is waited for. Since the desired value of seven corresponds to the position at which the discharge of the film 104 is completed, as described above, the spread motor 128 is turned off in step S54.

Then, the light emitting section of the photoreflector 116 is turned off in step S55. In step S56 the light emitting section of the spread photointerrupter 115 is turned off. As a result of the foregoing operations, the discharge operation in which the film 104 is discharged while being pressed simultaneously with the date imprinting operation is completed.

As a result of the foregoing operations, the number of the films has been decreased by one. Therefore, the number of the residual films displayed on the LCD 153 is decreased by one in step S57. In step S58, electric power is charged into the main capacitor for the stroboscope unit to perform the next photography.

The operations in steps S28 (see FIG. 62) to S58 are required to take one picture. If an ensuing photography is performed, the operation returns to step S28 from which similar operations are repeated.

The operations to be performed in steps S59 to S61 when the optical-system block of the instant camera is folded after the photography has been completed will now be described.

In step S59 the camera shutter unit 129 or the mirror portion case 130 shown in FIG. 53 is pressed so that the optical-system block is closed, that is, the state shown in FIG. 54 is realized. The fact that the optical-system block has been closed is detected by the camera open switch (COSW) 174. In step S60 the power source for the instant camera is turned off. Simultaneously, the LCD 153 is turned off in step S61.

As described above, the information imprinting unit for the instant camera according to the second embodiment is able to eliminate the necessity that the film movement quantity detection means, such as rollers, must be always in contact with the film. Therefore, an effect can be obtained in that the design of the apparatus can be performed further freely. In particular, the foregoing effect can be exhibited satisfactorily when the foregoing information imprinting unit is applied to the instant camera of the type using the sheet films (the instant films).

In addition to the foregoing effects, the intervals between the imprinted data items, such as characters, figures and dots, cannot be dispersed even if the film feeding speed encounters nonuniformity during imprinting of information on the film. Therefore, another effect can be obtained in that the quality of the imprinted information can be improved.

As described above, the instant camera according to the second embodiment enables information to accurately be imprinted on the film during the travel of the film while requiring a simple structure.

In this invention, it is apparent that working modes different in a wide range can be formed on this basis of this invention without departing from the spirit and scope of the invention. This invention is not restricted by any specific embodiment except as may be limited by the appended claims.

What is claimed is:

1. An instant camera having an arrangement that a film is discharged to a side of the camera facing toward a subject after a picture has been taken, said instant camera comprising:

a holding means formed on a right portion of a camera body when viewed in a normal photography state and from a position of a photographer operating the camera;

an optical system disposed on a left portion of said camera body when viewed from the said photographer's position and including at least a photographing lens foldable into said camera body for storage;

a film cartridge loading portion for loading a film cartridge into a position between said holding means of said camera body and said optical system in such a manner that an exposure surface of the film accommodated in said film cartridge faces said optical system; and a holding strap mounted and overlying said holding means on said camera for receiving an operator's hand between said strap and said holding means, a release button positioned on the camera body for operation by a finger of the operator's hand that is positioned between said grip portion and said strap to permit both operation and holding of the camera by one hand.

2. An instant camera according to claim 1, wherein said optical system further includes a shutter mechanism and a reflecting member for reflecting light of a subject.

3. An instant camera according to claim 1 or 2, wherein said film cartridge loading portion is structured in such a manner that said film cartridge can be loaded/unloaded from a position adjacent to said holding means.

4. An instant camera according to claim 1 wherein an optical system includes a photographing lens, a shutter mechanism and a reflecting member for reflecting light of a subject in such a manner that said optical system can be folded, said photographing lens and said shutter mechanism forming an integrated shutter unit; and a connection portion for providing a moveable connection between said reflecting member for reflecting light of the subject and a support member.

5. An instant camera according to claim 4 wherein said connection portion enables said reflecting member and support member to rotate relative to one another.

6. An instant camera according to claim 4, further comprising a photometry means having an optical system arranged above the photographing optical system when the camera is in a normal photographing position and is directed toward a subject when the camera is in the normal photographing position.

7. An instant camera according to claim 4, further comprising at least one operating member provided on a surface of said camera facing away from a subject when the camera is in a normal photographing position.

8. An instant camera according to claim 7, wherein said operating member is at least one of a release switch, a mode changeover switch and a power source switch of said camera.

9. An instant camera according to claim 8, wherein said operating member is used for moving a photographing optical system to a position which is capable of photographing.

10. An instant camera according to claim 7, wherein said operating member serves as a power source switch and a switch for moving a photographing optical system to a position which is capable of photographing.

11. An instant camera according to claim 4, further comprising a display member provided on a rear surface of said camera.

12. An instant camera according to claim 11, wherein said display member serves as at least one displaying a film number, displaying an operation mode of said camera, and displaying an indication corresponding to data photographed on a film.

13. An instant camera according to claim 4, further comprising an ocular lens of a finder optical-system, said ocular lens provided on a rear surface of said camera.

14. An instant camera according to claim 4, further comprising a subject distance detecting means turned towards a side of the subject.

15. An instant camera according to claim 14, wherein said subject distance detecting means has two optical systems.

16. An instant camera according to claim 15, wherein said two optical systems are arranged at spaced intervals along a surface of the camera directed toward a subject when the camera is oriented in a normal photographing position, so that a line extending between said two optical systems is aligned in a vertical direction.

17. An instant camera according to claim 15, wherein one of said two optical systems is arranged above an objective lens of a photographing optical system and the other of said two optical systems is arranged below the objective lens of said photographing optical system.

18. An instant camera according to claim 17, wherein said two optical systems are arranged at spaced intervals along a surface of the camera directed toward a subject when the camera is oriented in a normal photographing position, so that a line extending between said two optical systems is aligned in a row in a horizontal direction.

19. An instant camera according to claim 4, further comprising a holding strap provided on said camera and overlying a side surface of the camera to enable a user's had to be inserted between said holding strap and said side surface.

20. An instant camera according to claim 4, wherein said holding means consists of a belt-like member having opposite ends of thereof mounted on said camera and overlying a side surface of the camera enabling a user's hand to be inserted between said belt-like member and the side surface of the camera.

21. An instant camera according to claim 20, wherein said holding means restrains the hand engaging the holding means restricted in such a manner that a thumb lies on said side surface near a rear surface of said instant camera.

22. An instant camera according to claim 21, wherein a release switch for operating the camera is arranged on said rear surface in a range which is capable of being operated by a users thumb when the users hand rests on a side surface having the holding means.

23. An instant camera having an arrangement that a film is discharged from said camera in a direction toward a subject after a picture has been taken, said instant camera comprising:

a holding means formed on a right portion of a camera body when viewed in a normal photography state and from a position of a photographer operating the camera;

an optical system disposed on a left portion of said camera body when viewed from the photographer's position and including at least a photographing lens foldable into said camera body for storage;

a film cartridge loading portion for loading a film cartridge into a position between said holding means of said camera body and said optical system in such a manner that an exposure surface of the film accommodated in said film cartridge faces said optical system; and a stroboscope light emitting portion disposed on a surface of said camera body adjacent to a subject to face the subject, said stroboscope light emitting portion being disposed on a right side of an optical axis of said photographing lens when viewed from said photographer's position, said light emitting portion further being disposed between said optical axis and a top of said camera body.

24. An instant camera according to claim 23, wherein said optical system further includes a shutter mechanism and a reflecting member for reflecting light of a subject toward a film surface.

25. An instant camera accommodating a film cartridge in such a manner that an exposure surface of a planar film sheet accommodated in said film cartridge is parallel to a first side surface of a camera body and an optical axis of a taking lens arranged on the camera body along a second side surface opposite and parallel to said first side surface, and movably outwardly and away from said second side surface to a photographing position, said exposure surface being aligned with a vertical direction of said camera body when said taking lens is moved relative to the camera body to a photographing position and when said camera body is properly oriented for a normal photographing operation; and an optical system for directing light reflected from a subject and passing along the optical axis of the taking lens along an optical path perpendicular to said exposure surface and said optical axis.

26. An instant camera according to claim 25, further comprising at least a flash emitting surface a stroboscope disposed on said camera body and arranged adjacent to a side of the film opposite the exposure surface, said film being positioned between the flash emitting surface and said photographing optical system.

27. An instant camera according to claim 26, wherein said flash emitting surface is disposed in a position which is above the optical axis of the taking lens when the camera is operated with the film surface vertically aligned.

28. An instant camera according to claim 25, wherein the film is discharged in a direction parallel to the exposure surface of the film.

29. An instant camera according to claim 28, wherein the film is discharged from an opening in a surface of said camera facing an object being photographed when said camera is held in a normal photographing position, said opening arranged between said first and second side surfaces.

30. An instant camera according to claim 29, further comprising a rotatable roller driven about an axis extending front and rear directions of said camera in an upper surface part of said camera in order to discharge film.

31. An instant camera according to claim 29, wherein film is discharged from a front surface of said camera.

32. An instant camera according to claim 31, further comprising a rotatable roller driven about an axis extending in a vertical direction of said camera in a front surface part of said camera in order to discharge film.

33. An instant camera according to claim 28, wherein film is discharged from a surface of said camera which faces downwardly when the camera is in the normal photographing position.

34. An instant camera according to claim 33, further comprising a rotatable roller driven about an axis extending in a direction parallel to said optical axis and arranged in a lower part of said camera when said photographing optical system is in the photographing position and the camera is oriented in the normal photographing position in order to discharge the film.

35. An instant camera comprising:
a camera body;
a film cartridge accommodating room in said camera body for accommodating a film, said film cartridge exposing a film in said cartridge;
a photographing optical system provided adjacent to a first side of said cartridge accommodating room and turning an objective lens towards the subject;
an optical axis of said lens being parallel to a plane of said film when the lens is in a photographing position, said film being aligned in a vertical direction when the camera is in a normal photographing position;

a stroboscope disposed on a second side of said camera opposite said photographing optical system, said cartridge being arranged between photographing optical system and said stroboscope; and
a holding means provided on a third side surface of said camera body to facilitate holding of the camera by a user's hand.

36. An instant camera according to claim 35, wherein said photographing optical system has a reflecting mirror for bending a luminous flux from a subject passing through an objective lens towards an exposure surface of the film.

37. An instant camera according to claim 35, wherein an optical axis is arranged in a position above an optical axis of an objective lens in said photographing optical system when the camera is held so that the film surface is vertically aligned.

38. An instant camera according to claim 35, wherein the film is discharged in a direction parallel to a spreading surface of the film.

39. An instant camera according to claim 38, wherein the film is discharged from an opening in a surface of said camera facing an object being photographed wherein said camera is held in a normal photographing position, said opening being arranged between said first and second side surfaces.

40. An instant camera according to claim 39, further comprising a rotatable roller driven about an axis extending in front and rear directions of said camera on an upper surface of said camera in order to discharge the film.

41. An instant camera according to claim 38, wherein the film is discharged from a front surface of said camera.

42. An instant camera according to claim 41, further comprising a rotatable roller driven about an axis extending in vertical direction of said camera in a front part of said camera to discharge the film.

43. An instant camera according to claim 38, wherein the film is discharged from a surface of said camera which faces downwardly when the camera is in the normal photographing position.

44. An instant camera according to claim 43, further comprising a rotatable roller driven about an axis extending a direction parallel to said optical axis and arranged in a lower part of said camera when said photographing optical system is in the photographing position and the camera is oriented in the normal photographing position to discharge the film.

45. An instant camera according to claim 35, further comprising a photometry means having an optical system arranged above the photographing optical system when the camera is in a normal photographing position and is directed toward a subject when the camera is in the normal photographing position.

46. An instant camera according to claim 35, further comprising at least one operating member provided on a surface of said camera for operation of a operator's hand inserted between the holding strap and the side of the film opposite the photographing optical system.

47. An instant camera according to claim 46, wherein said operating means is at least one of a release switch, a mode changeover switch and a power source switch of said camera.

48. An instant camera according to claim 46, including means responsive to said operating member for moving a photographing optical system to a position which is capable of photographing.

49. An instant camera according to claim 46, wherein said operating member serves as a power source switch and a switch for moving said photographing optical system to a position which is capable of photographing.

50. An instant camera according to claim 35, further comprising at least a display member provided on a rear surface of said camera.

51. An instant camera according to claim 50, wherein said display member displays is at least one of a film number, an operation mode of said camera, and an indication corresponding to data photographed on a film.

52. An instant camera according to claim 35, further comprising an ocular lens of a finder optical system, said ocular lens provided on a rear surface of said camera.

53. An instant camera according to claim 35, further comprising a subject distance detecting means turned to a side of the subject.

54. An instant camera according to claim 53, wherein said subject distance detecting means has two optical systems.

55. An instant camera according to claim 54, wherein said two optical systems are arranged in a vertical direction of said camera.

56. An instant camera according to claim 54, wherein said two optical systems are arranged above and below an objective lens of said photographing optical system.

57. An instant camera according to claim 54, wherein said two optical systems are arranged in a row in a horizontal direction of said camera.

58. An instant camera according to claim 35, wherein said holding means consists of a band-like member having opposite ends of thereof mounted on said camera enabling a user's hand to be inserted between said band-like member and the side surface of the camera.

59. An instant camera according to claim 58, wherein said holding means restrains the hand restricted in such a manner that a thumb lies along a side surface adjacent to a rear surface of said instant camera.

60. An instant camera according to claim 59, wherein a release switch is arranged on said rear surface in a range which is capable of being operated by a thumb of an operator's hand resting on a side surface.

* * * * *